July 21, 1959 A. E. BACHELET ET AL 2,896,072

MOBILE RADIO TELEPHONE SYSTEM

Filed April 26, 1954 12 Sheets-Sheet 1

INVENTORS A. E. BACHELET
L. A. DORFF
D. MITCHELL

BY R. O. Covell

ATTORNEY

MOBILE RADIO TELEPHONE SYSTEM

Filed April 26, 1954 12 Sheets-Sheet 2

INVENTORS A. E. BACHELET
L. A. DORFF
D. MITCHELL
BY R. O. Covell
ATTORNEY

July 21, 1959 A. E. BACHELET ET AL 2,896,072

MOBILE RADIO TELEPHONE SYSTEM

Filed April 26, 1954 12 Sheets-Sheet 3

INVENTORS A.E. BACHELET
L.A. DORFF
D. MITCHELL

BY R.O. Covell
ATTORNEY

INVENTORS A. E. BACHELET
L. A. DORFF
D. MITCHELL
BY R. O. Covell
ATTORNEY

July 21, 1959 A. E. BACHELET ET AL 2,896,072

MOBILE RADIO TELEPHONE SYSTEM

Filed April 26, 1954 12 Sheets-Sheet 5

INVENTORS A. E. BACHELET
L. A. DORFF
D. MITCHELL
BY
R. O. Covell
ATTORNEY

INVENTORS A. E. BACHELET
L. A. DORFF
D. MITCHELL
BY R. D. Covell
ATTORNEY

July 21, 1959 A. E. BACHELET ET AL 2,896,072

MOBILE RADIO TELEPHONE SYSTEM

Filed April 26, 1954 12 Sheets-Sheet 7

INVENTORS A.E. BACHELET
L.A. DORFF
D. MITCHELL

BY R.D. Covell

ATTORNEY

MOBILE RADIO TELEPHONE SYSTEM

INVENTORS A. E. BACHELET
L. A. DORFF
D. MITCHELL
BY R. O. Covell
ATTORNEY

INVENTORS A. E. BACHELET
L. A. DORFF
D. MITCHELL
BY R. D. Covell
ATTORNEY

INVENTORS A. E. BACHELET
L. A. DORFF
D. MITCHELL
BY R. D. Covell
ATTORNEY

July 21, 1959 A. E. BACHELET ET AL 2,896,072

MOBILE RADIO TELEPHONE SYSTEM

Filed April 26, 1954 12 Sheets-Sheet 11

INVENTORS A. E. BACHELET
L. A. DORFF
D. MITCHELL

BY R. O. Covell

ATTORNEY

MOBILE RADIO TELEPHONE SYSTEM

INVENTORS A. E. BACHELET
L. A. DORFF
D. MITCHELL
BY R. D. Covell
ATTORNEY

United States Patent Office 2,896,072

Patented July 21, 1959

2,896,072

MOBILE RADIO TELEPHONE SYSTEM

Albert E. Bachelet, New York, N.Y., and Louis A. Dorff, Glen Ridge, and Doren Mitchell, Martinsville, N.J., assignors to Bell Telephone Laboratories, Incorporated, New York, N.Y., a corporation of New York Application April 26, 1954, Serial No. 425,386

19 Claims. (Cl. 250—6)

This invention relates to mobile radio telephone systems and particularly to mobile radio telephone systems which serve highways or routes of travel of mobile units equipped with radio communicating sets; and the invention has for an object the provision of more efficient means of coordinating and handling a greater number of simultaneous calls between mobile units and fixed stations of the system over a single frequency channel without causing interference.

Mobile radio telephone systems now in use employ a plurality of fixed radio transmitters spaced apart at control points along a highway or route of travel of the mobile units so that the service area of each fixed radio transmitter overlaps that of the adjacently located fixed radio transmitters. In this way, complete transmitting coverage of the entire route of travel is assured. Each of the fixed radio transmitters has associated with it a plurality of fixed radio receivers which also are spaced apart along the route of travel. Like the fixed radio transmitters, the fixed radio receivers also are located so that the service area of each overlaps that of the adjacently located fixed radio receivers thereby assuring complete receiving coverage along the entire route of travel. Each fixed radio transmitter and each group of fixed radio receivers associated with a control point are connected by means of wire lines to remote control and terminal equipment and from there to a switchboard position.

Each switchboard position which serves a control point has access to standard telephone switching facilities for completing connections to telephone subscribers in local telephone exchanges and over toll lines to telephone subscribers in distant exchanges. In this manner, the operator at a switchboard position of any control point of the system may remotely control the fixed radio transmitter thereat and complete connections for a call between a mobile unit located in the area served by this transmitter and telephone subscribers in local or distant telephone exchanges.

In such systems, the calls are all completed over a single radio frequency channel and because all of the fixed radio transmitters of the system operate on a single frequency, the overlapping portion of the area of coverage between two adjacently located fixed radio transmitters becomes an area of interference whenever the two adjacent transmitters are on the air simultaneously. This difficulty was recognized in the early systems and to prevent the probability of causing interference between adjacent transmitters, when a transmitter is on the air, the adjacent transmitters are kept off the air. This is accomplished in systems now in use by providing a busy lamp in the switchboard of each control point which lights whenever the transmitter at an adjacent control point is on the air. The lighting of these busy lamps is a visual signal to the operators that the transmitter at an adjacent control point is on the air and the operators have been instructed not to handle any calls through their control points while this busy lamp is lighted because of the possibility of causing interference. This method of operation does theoretically prevent all interference should the mobile unit be in the overlap area between two control points, but it also prevents many calls from being placed in situations where the mobile units are not located in this overlap area of interference. It is well known that at the frequency at which these mobile radio telephone systems operate, it is quite feasible to carry on simultaneous calls on the same frequency if the mobile units are sufficiently separated. It has been found that simultaneous calls may be carried on through two adjacent control points without causing interference providing that neither mobile unit is located in the overlap interference area between the adjacent control points.

A general object of the invention is to improve mobile radio telephone systems of the general type described above. A more particular object of this invention is to enable and facilitate the establishment of the maximum number of non-interfering calls in such systems.

Another of the difficulties encountered in the mobile radio telephone systems in use today is that when a mobile unit located in the overlap area of interference between two adjacent control points originates a call, the operators at the switchboards of the two adjacent control points will both be signaled. Only one of these operators can, however, handle the call and each time the mobile unit operates its transmitter, the operator at the control point not handling the call will receive an unwanted signal. In the present day practice, the operator at the adjacent control point who is not supervising the call will insert a plug into a monitoring jack which gives her access to all of her receivers. By monitoring the receivers associated with her control point, the operator can determine that she is picking up the transmission from a mobile unit located in the area of an adjacent control point whose call is already being handled by the adjacent control point operator. To prevent a new and unwanted signal from coming in on her switchboard each time the mobile unit transmits, the operator has been instructed to leave the switchboard cord in the monitoring jack until the call handled through the adjacent control point is completed.

It is an object of this invention to provide an automatic means for preventing unwanted signals in the switchboard at a control point when a mobile unit is carrying on a call through an adjacent control point while located in the area of interference between the two adjacent control points.

It is another object of this invention to provide a means for signaling the operator at the switchboard of a control point only when a call can be handled through the control point without causing interference.

It is still a further object of this invention to provide an artificial busy signal at the switchboard of each control point to indicate when a call cannot be handled because of interference considerations.

Another of the difficulties experienced in the mobile radio telephone systems presently in use is that the transmission from a mobile unit originating a call while located in an interference area between two adjacent control points will be picked up by receivers associated with the two adjacent control points which in turn will cause the two adjacent operators to be signaled. No means have been heretofore available for determining which of the two control points should assume control of the call.

It is another object of this invention to provide an automatic means for determining which of two adjacent control points simultaneously receiving a carrier transmitted from a mobile unit located in the overlap interference area between the two adjacent control points is receiving the more desirable signal and to automatically route the call to that control point and to prevent the carrier being received at the control point receiving the less desirable signal from signaling the operator thereat.

Another of the difficulties experienced with the present day radio telephone systems is that after the establishment of a call from a mobile unit through a particular control point, the operator who established the call and who is supervising the call has no means of determining the direction of travel of the mobile unit. Furthermore, this operator has no way of telling when the mobile unit may run into an area of interference and in addition, in the present day operations, no means are provided for transferring a mobile unit's call from one control point to an adjacent control point when the mobile unit leaves the coverage of the first and enters the coverage of the second.

It is another object of this invention to provide a means in the switchboard position at each control point for enabling the operator thereat to determine the direction of travel of a mobile unit. This is accomplished by lighting receiver indicator lamps, each of which is associated with each of the receivers located at a control point. In this manner, as a mobile unit moves through the area served by a control point, his progress may be followed by observing the lighting of the receiver indicator lamps of the receivers which pick up his carrier signal.

Another object of this invention is to provide a visual signal at each of the switchboard positions to warn the operators thereat when a mobile unit is approaching an area of interference.

Still another object of this invention is to provide an automatic means for determining when transmission from a mobile unit becomes better at an adjacent control point than at the local control point where the call is being handled and to provide a means for transferring the control of the call from the first control point to the adjacent control point.

A further object of this invention is to provide means to permit the reception of an emergency call at a control point when a call cannot ordinarily be handled due to interference considerations.

The manner in which the foregoing objects and features of the invention are realized may be best understood from the following description when considered in conjunction with the accompanying drawings in which:

Fig. 1 is a block schematic diagram of a highway mobile radio telephone system in which the present invention may be incorporated and shows typical patterns for the transmitter service areas and receiver service areas of each fixed receiver and fixed transmitter of the system. The system includes three control points, Control Point A, Control Point B and Control Point C, with block diagram representations of the circuits and equipment employed at each;

Figure 7:
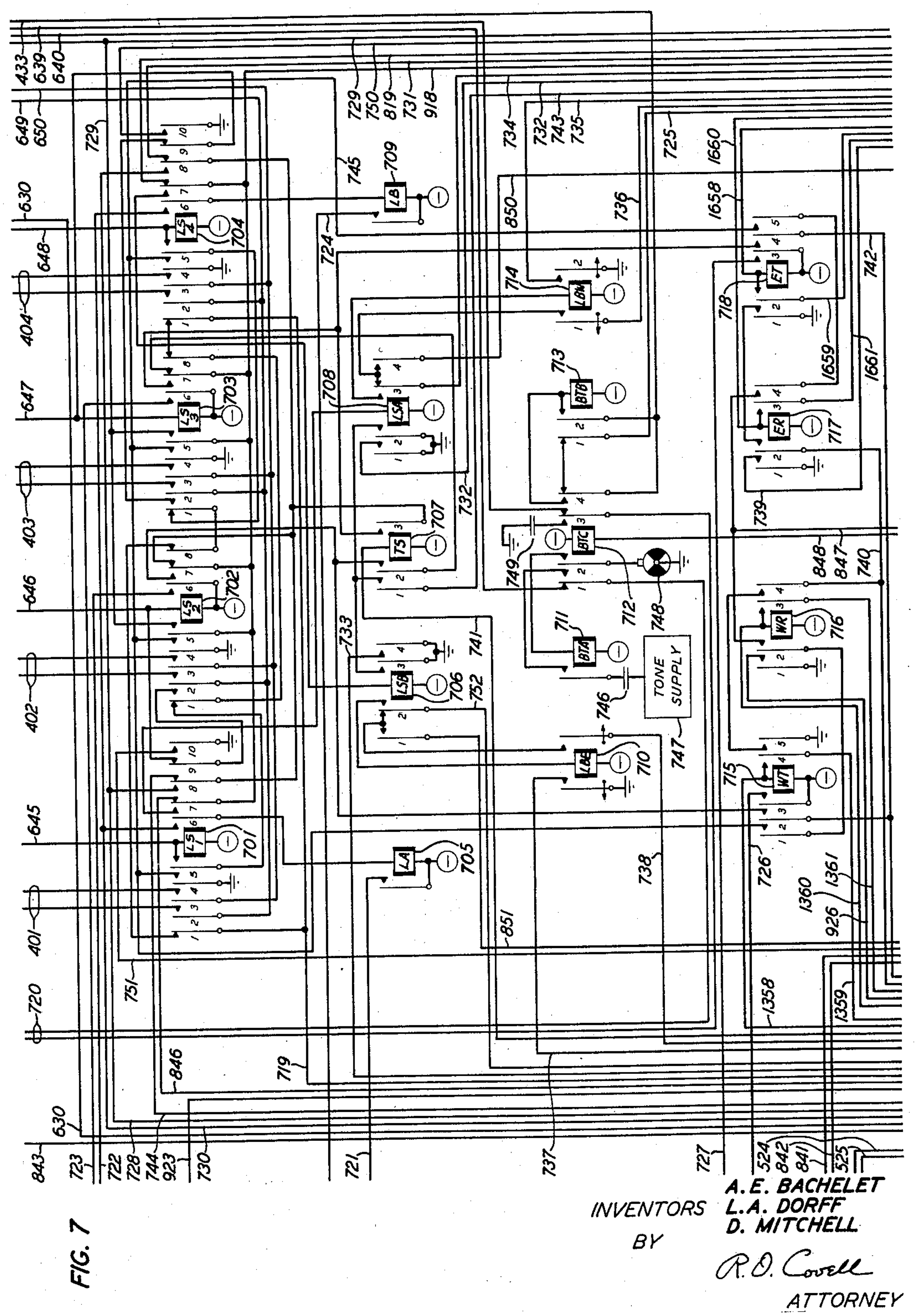
Figure 8:
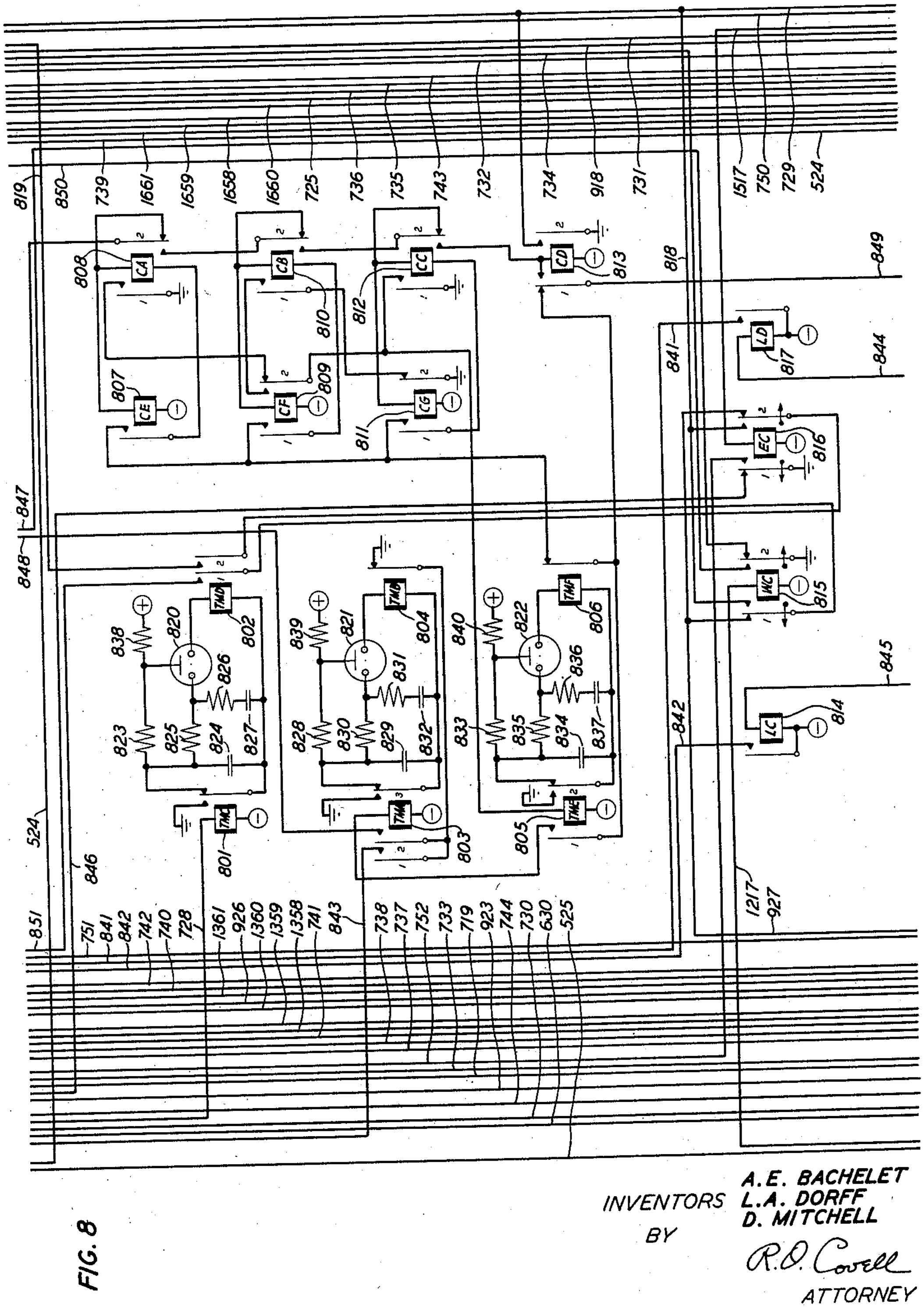
Figures 9, 10:
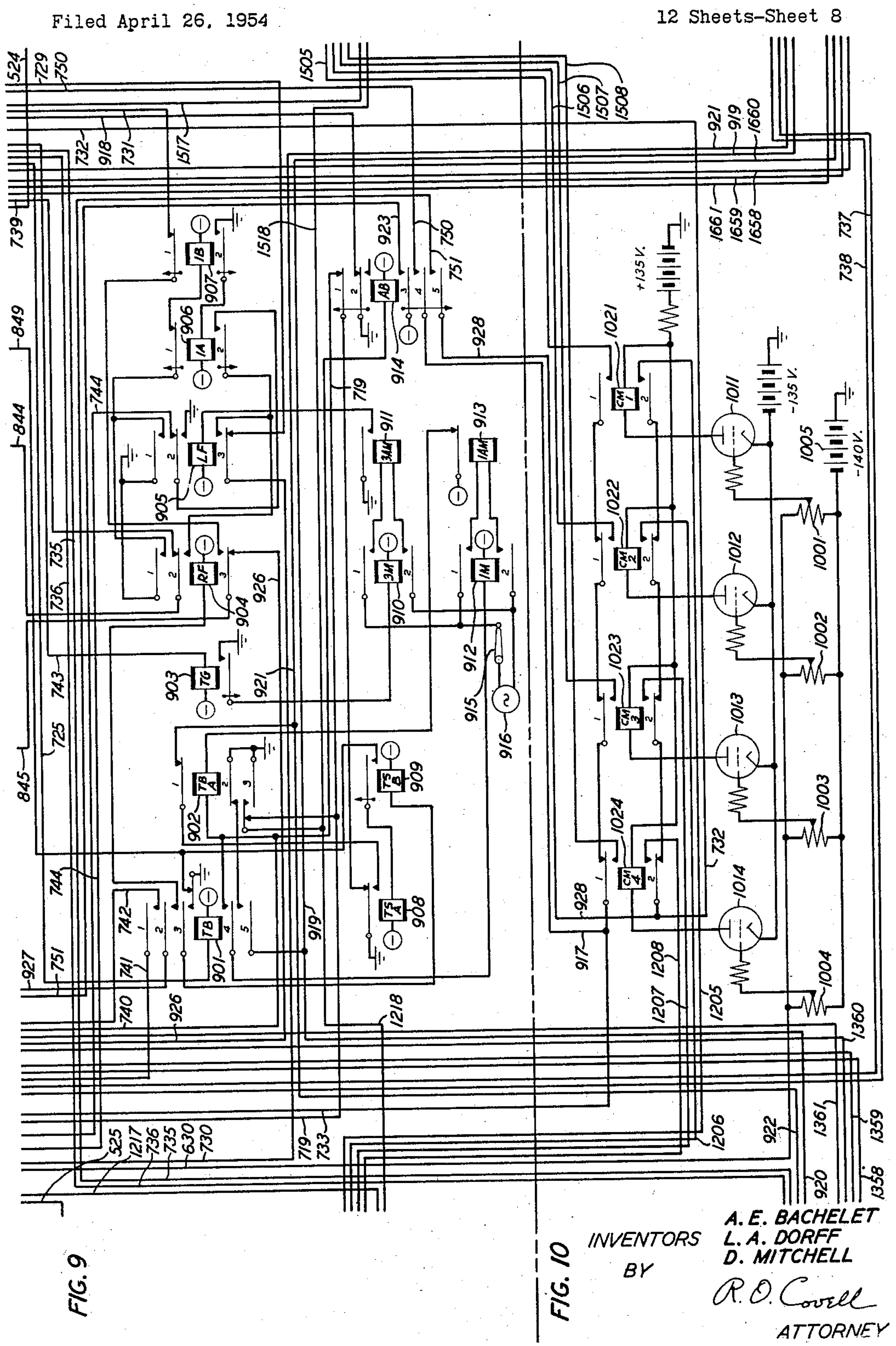
Figure 11:
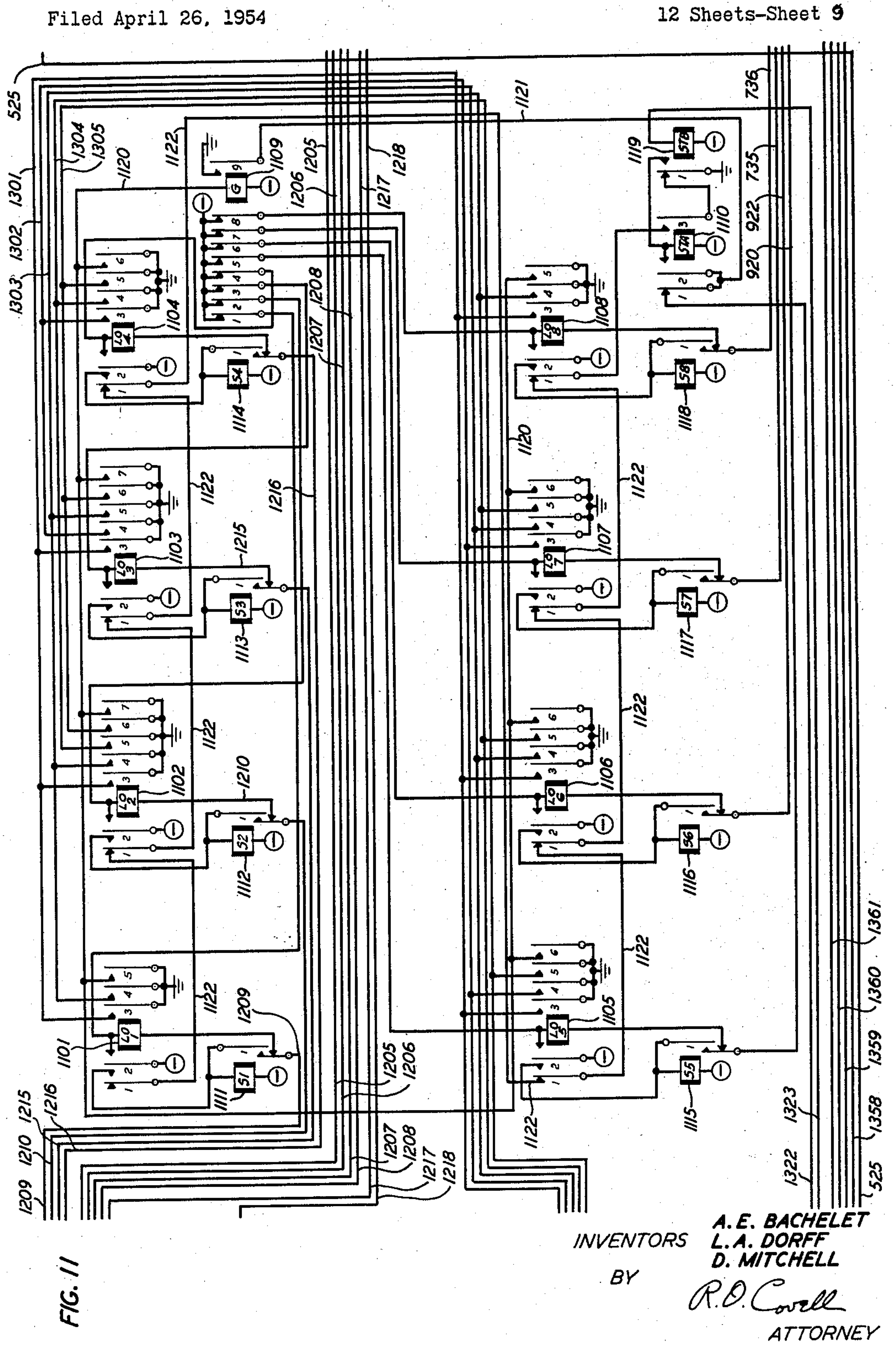
Figures 12, 13:
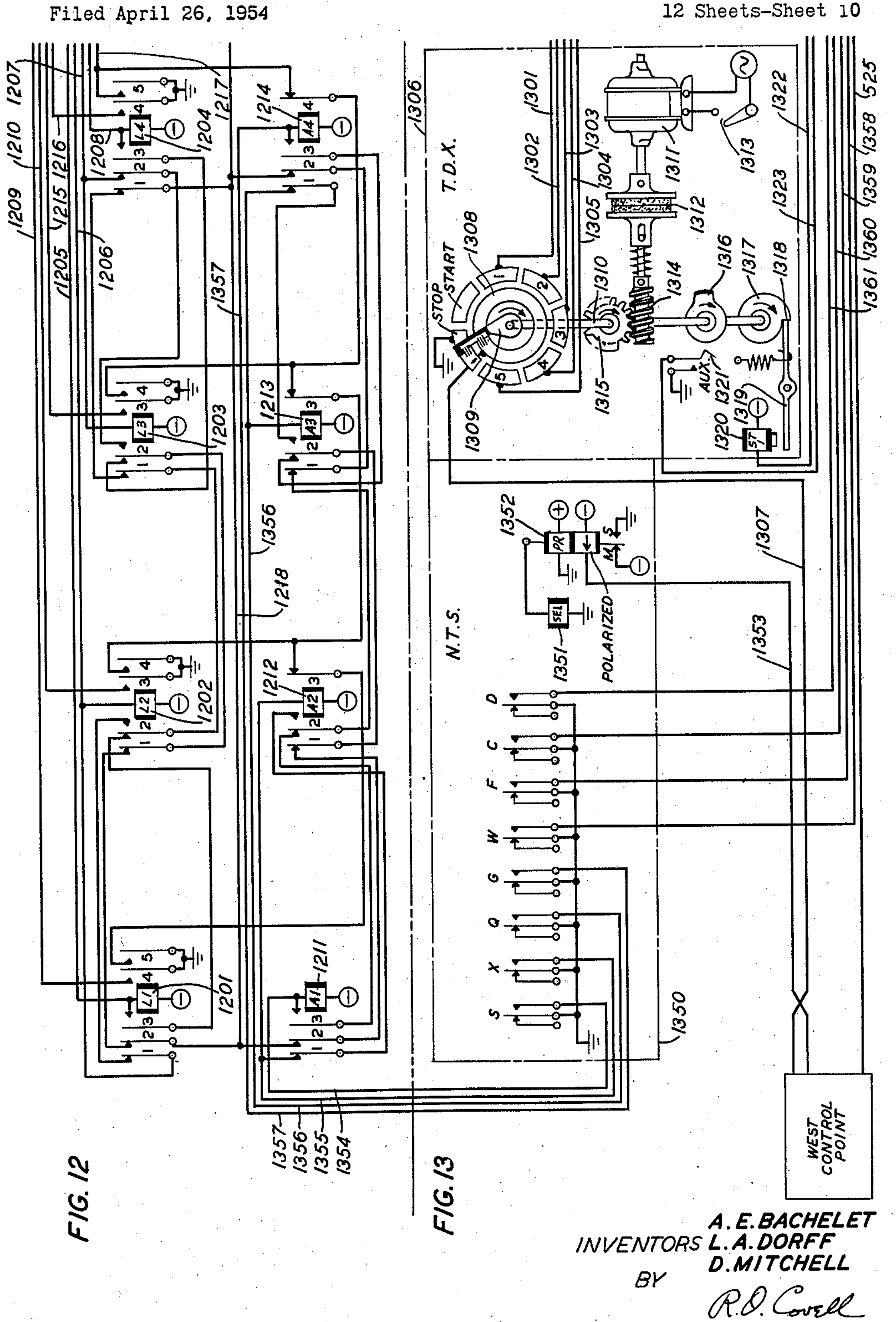
Figure 14:
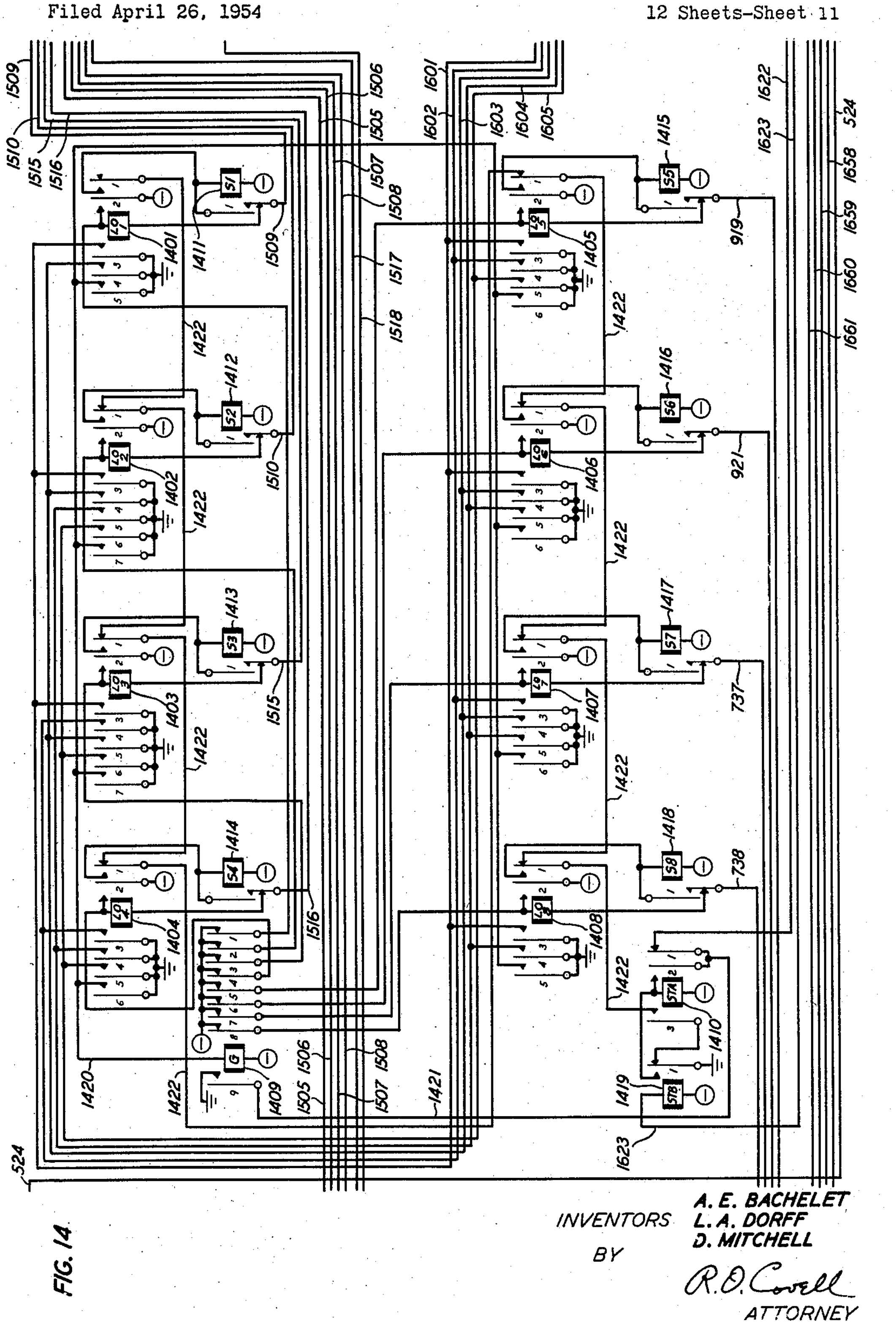
Figures 15, 16:
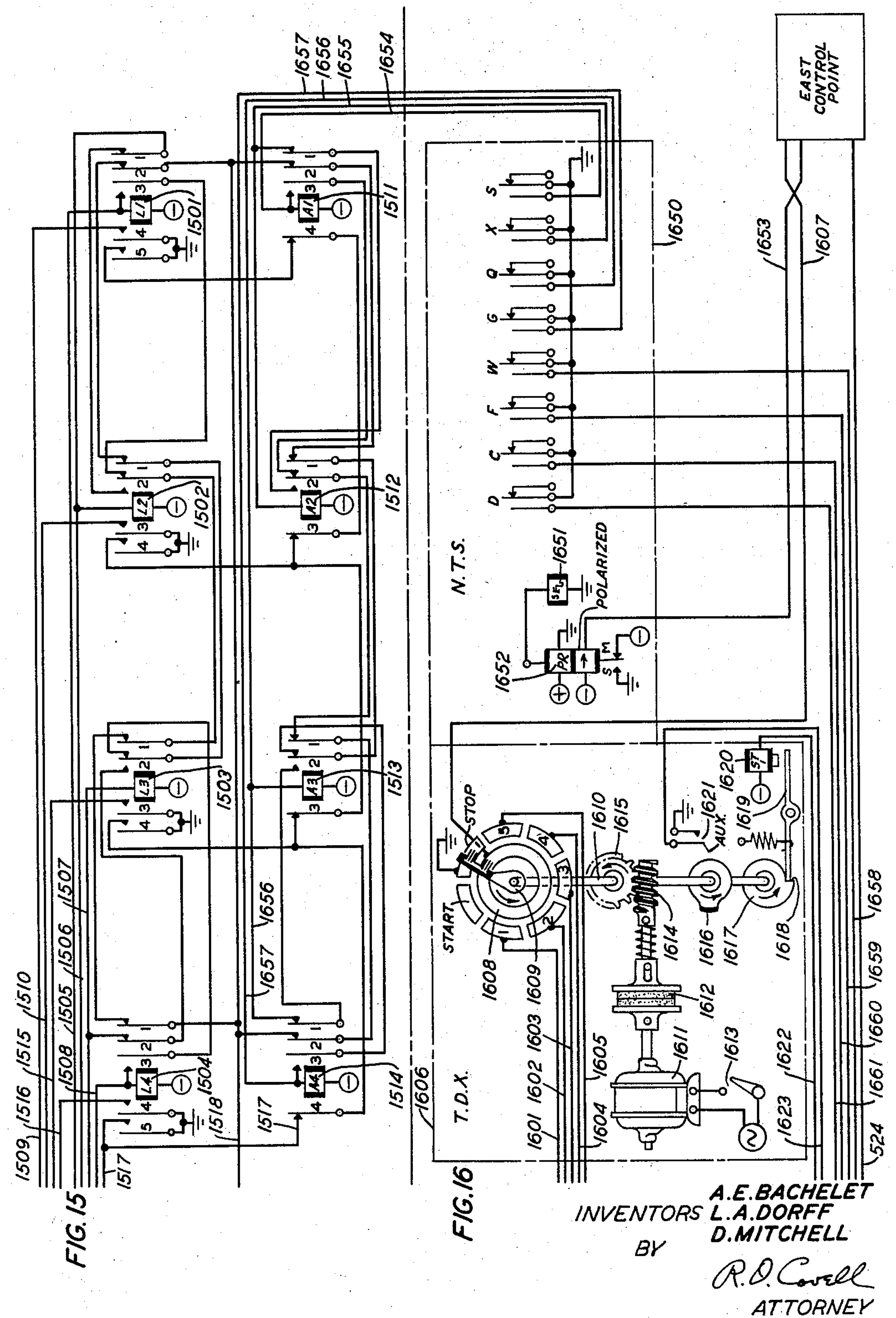

Fig. 7, Fig. 8 and Fig. 9 disclose in schematic form the switching and control circuits employed at a control point;

Fig. 10 is a schematic diagram of the signal merit decider circuit employed at a control point for assigning merit ratings to signals received over the terminal receivers at the control point;

Fig. 11 discloses in schematic form the code relays employed at a control point which are controlled by the switching and control circuits of Figs. 7, 8 and 9 and the comparison circuit of Fig. 12 to control the distributor at the control point shown in Fig. 13 to cause this distributor to transmit teletypewriter signals to the adjacent west control point;

Fig. 12 shows in schematic form the comparison circuit employed at a control point for comparing the merit rating of a signal received by the west terminal receiver thereat with the merit rating of a signal simultaneously received by the east terminal receiver at the west adjacent control point;

Fig. 13 discloses in simplified schematic form the distributor and the non-typing selector at a control point which transmits teletypewriter signals to the adjacent west control point and receives teletypewriter signals from the adjacent west control point, respectively;

Fig. 14 discloses in schematic form the code relays employed at a control point which are controlled by the switching and control circuits of Figs. 7, 8 and 9 and the comparison circuit of Fig. 15 to control the distributor at the control point shown in Fig. 16 to cause this distributor to transmit teletypewriter signals to the adjacent east control point;

Fig. 15 shows in schematic form the comparison circuit employed at a control point for comparing the merit rating of a signal received by the east terminal receiver thereat with the merit rating of a signal simultaneously received by the west terminal receiver at the east adjacent control point; and Fig. 16 discloses in simplified schematic form the distributor and the non-typing selector at a control point which transmits teletypewriter signals to the adjacent east control point and receives teletypewriter signals from the adjacent east control point, respectively.

*General description*

Figure 1:
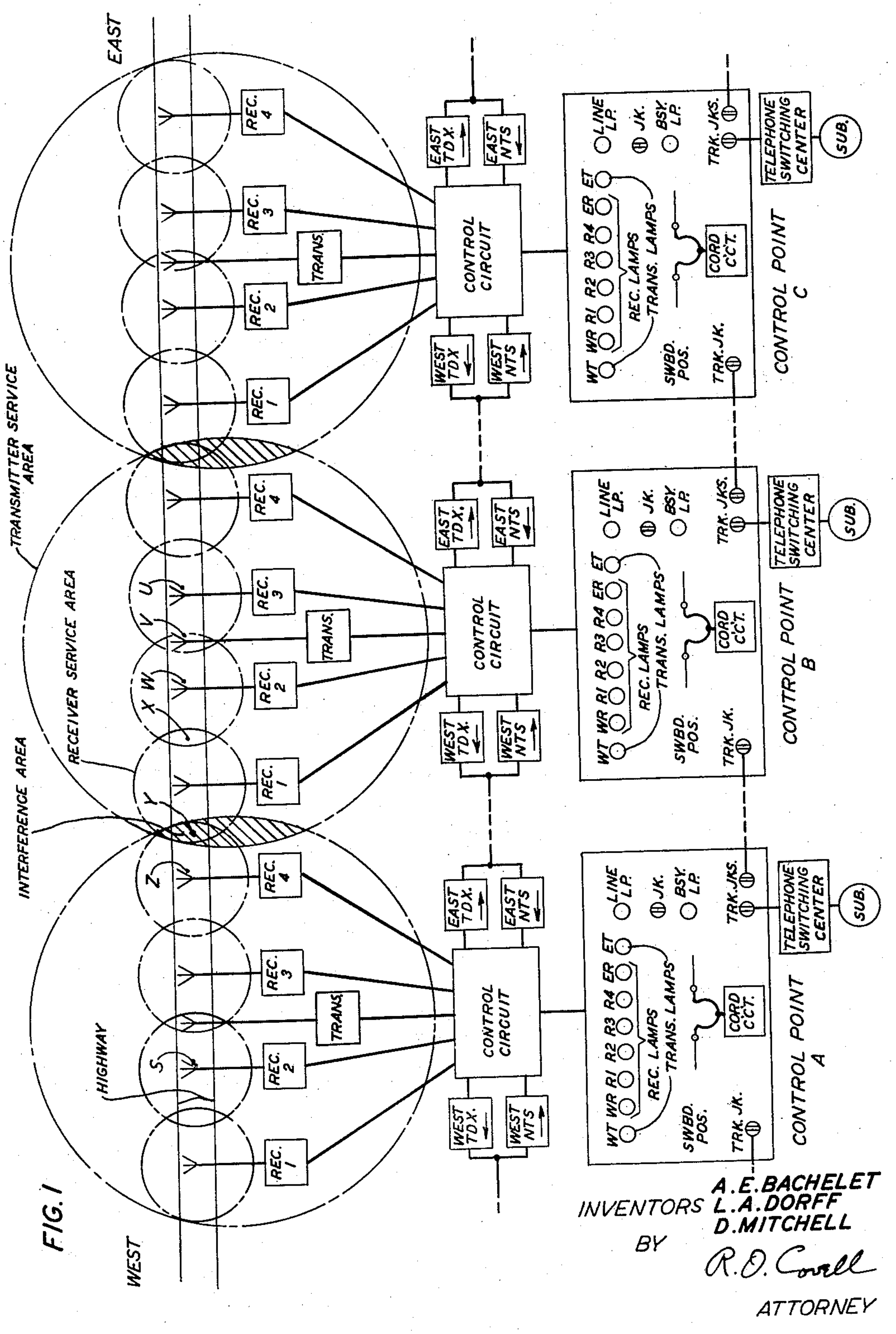

The invention will now be generally described as incorporated in the highway mobile radio telephone system shown in block diagram form in Fig. 1. Fig. 1 shows three control points, A, B and C, spaced apart along a highway which extends from west to east. Each control point has a fixed radio transmitter and four fixed radio receivers, numbered 1 through 4, inclusive. The fixed radio transmitters of the three control points are located in such a way that the service area of each overlaps that of the adjacently located transmitters, thus assuring complete transmitting coverage along the entire highway. The fixed radio receivers of the entire system are located in a similar fashion so that the service area of each overlaps that of the adjacently located receiver, thus assuring complete receiving coverage along the entire highway. The transmitter service areas are indicated by the large dotted circles in Fig. 1 and the receiver service areas are indicated by the smaller dotted circles in Fig. 1. The shaded area between control points is the overlapping portion of the service area of two adjacently located fixed radio transmitters and is the area of interference when the two adjacent transmitters are on the air simultaneously. It is to be understood that the relative location of the fixed transmitters and fixed receivers shown in Fig. 1 and their respective service areas is typical because in actual practice their location and respective service areas will vary depending upon factors of terrain and other transmission considerations.

The four receivers and the transmitter associated with each control point are connected by wire lines to a control circuit individual to each control point. The equipment and circuits in the box labeled "control circuit" at each of the three control points in the block diagram shown in Fig. 1 includes the circuits and equipment shown in more detailed schematic form in Figs. 4, 6–12, 14 and 15 of the drawings. The control circuit at each of the control points is connected to a switchboard position having trunk circuits which extend via wire lines to a telephone switching center. The switching center may be either a manual or dial system including toll switching systems which in turn have connections to telephone subscribers' stations in local telephone exchanges. Each of the switchboard positions of the system is equipped with trunks which extend via wire lines to the switchboard positions at both adjacent control points. These trunks are utilized by the operators at the switchboard positions to transfer the control and supervision of calls to adjacent control points.

Each of the three control points of the highway mobile radio telephone system shown in block diagram form in Fig. 1 has two distributors, one designated West TDX and one designated East TDX. Each of the control points also has two non-typing selectors, one designated West NTS and one designated East NTS. These non-typing selectors and distributors are utilized for the reception and transmission, respectively, of teletypewriter codes between adjacent control points and control, and are controlled by the respective control circuits at adjacent control points. For example, the control circuit at Control Point A will control the east distributor (East TDX) thereat to cause it to transmit teletypewriter codes over the wire line to Control Point B where these codes are in turn received by the west non-typing selector (West NTS) at Control Point B which in turn controls the control circuit thereat.

The switchboard position at each of the three control points is equipped with a group of indicating lamps designated WT, WR, R1, R2, R3, R4, ER and ET. Lamps R1, R2, R3 and R4 are associated, respectively, with the receivers 1 through 4 at the control point. Lamps WT and WR are associated, respectively, with the transmitter and the east terminal receiver (receiver 4) at the adjacent west control point. Similarly, lamps ET and ER are associated, respectively, with the transmitter and west terminal receiver (receiver 1) at the adjacent east control point. The lighting of any of these indicator lamps in the switchboard position at a control point gives the operator thereat a visual indication that the transmitter or receiver associated with this indicator lamp is in use. In addition, the switchboard position at each of the control points is also equipped with a line lamp, a line jack and a busy lamp. The line jack is connected to the control circuit which functions to permit the operator at the switchboard position to complete connections between telephone subscribers and mobile subscribers. The lighting of the line lamp in the switchboard position at a control point gives a visual indication to the operator thereat that a mobile subscriber in the area served by the control point is originating a call over one of the receivers at the control point. The busy lamp in the switchboard position at a control point is lighted for supervision purposes when the transmitter at the control point is on the air or when the transmitter and terminal receiver at an adjacent control point are engaged and it is necessary to keep the local transmitter off the air because of the possibility of causing interference. The control circuit at each of the three control points controls the lighting of the indicator lamps, the line lamp and the busy lamp in the switchboard at its associated control point in a manner which will be described in detailed hereinafter.

The manner in which the objects of the present invention are accomplished will be understood in a general way from the following description for a few specific examples of the functions of the various circuits of the highway mobile radio telephone system shown in the block diagram schematic of Fig. 1 of the drawings.

*Call originated by a mobile subscriber at point U on highway of Fig. 1, circuits at all control points idle*

If a mobile subscriber, located at point U on the highway shown in Fig. 1 originates a call, his carrier signal will be picked up by receiver 3 associated with Control Point B and the control circuit at Control Point B will function to light the R3 indicator lamp in the switchboard at Control Point B. Furthermore, if the circuits at Control Point B are idle, the control circuit will function and light the line lamp in the switchboard at Control Point B. The lighting of the line lamp in the switchboard at Control Point B is a signal to the operator that a mobile subscriber in the area served by Control Point B is originating a call. The operator will know that the mobile subscriber's carrier is being received over receiver 3 by observing that the R3 indicator lamp is lighted. When the operator inserts a plug of one of the cord circuits of her switchboard into the line jack to answer the call from the calling mobile subscriber, the control circuit at Control Point B functions and turns on the transmitter. The operator may then determine the identity of the called subscriber from the calling mobile subscriber and complete the connection over the trunk circuit to the telephone switching center and from there to the called telephone subscriber. The control circuit at Control Point B also functions at this time to cause the west distributor (West TDX) and the east distributor (East TDX) at Control Point B to transmit a teletypewriter code to the adjacent west and east control points, Control Point A and Control Point C, respectively. At Control Point A, this teletypewriter code is received by the east non-typing selector (East NTS) which in turn causes the control circuit at Control Point A to function and light the ET indicator lamp in the switchboard at Control Point A. Similarly, the reception of this teletypewriter code by the west non-typing selector (West NTS) at Control Point C will cause the control circuit at Control Point C to function and light the WT indicator lamp in the switchboard at Control Point C. The lighting of the ET indicator lamp in the switchboard at Control Point A and the WT indicator lamp in the switchboard at Control Point C gives a visual signal to the operators at these two control points that the transmitter at Control Point B is on the air. When the call from the mobile subscriber is answered by the operator at Control Point B, the control circuit at Control Point B functions to extinguish the line lamp in the switchboard at Control Point B and to light the busy lamp thereat for supervision purposes. When the call which originated from the mobile subscriber over receiver 3 at Control Point B is terminated and the operator thereat removes the plug from the line jack, the control circuit at Control Point B functions to turn off the transmitter at Control Point B and to cause the east and west distributors at Control Point B to transmit another teletypewriter code to Control Point A and to Control Point C. The reception of this code by the east non-typing selector (East NTS) at Control Point A will cause the control circuit at Control Point A to function and extinguish the ET indicator lamp in the switchboard at Control Point A. The reception of this teletypewriter code by the west non-typing selector (West NTS) at Control Point C will, in a similar fashion, cause the control circuit at Control Point C to function and extinguish the WT indicator lamp in the switchboard at Control Point C. The extinguishing of the ET indicator lamp in the switchboard at Control Point A and the WT indicator lamp in the switchboard at Control Point C gives a visual indication to the operators at Control Point A and Control Point C that the transmitter at Control Point B is no longer on the air. The control circuit at Control Point B also functions to extinguish the R3 receiver lamp and the busy lamp in the switchboard at Control Point B and the circuits are then returned to normal.

*Call originated by mobile subscriber at point X on highway of Fig. 1, circuits at all control points idle*

If a mobile subscriber, located at point X on the highway shown in Fig. 1 originates a call, his carrier signal will be picked up by receiver 1 and receiver 2 associated with Control Point B. The control circuit at Control Point B will function to determine which of these two receivers is receiving the most desirable signal and will then complete a connection from this receiver to the control circuit and reject the other receiver. Assume now that receiver 1 is receiving the most desirable signal. The control circuit at Control Point B will function and cause the R1 indicator lamp in the switchboard at Control Point B to light and, if the circuits at Control Point B are idle, light the line lamp. The control circuit at Control Point B also functions to cause the west distributor (West TDX) at Control Point B to transmit a teletypewriter code to Control Point A. This code is received by the east non-typing selector (East NTS) at Control Point A which in turn causes the control circuit at Control Point A to function and light the ER indicator lamp in the switchboard at Control Point A. This gives a visual indication to the operator at Control Point A that a signal is being received over the west terminal receiver, that is, receiver 1 at Control Point B. When the operator at Control Point B answers the call from the mobile subscriber, the control circuit at Control Point B functions as stated above to turn on the transmitter at Control Point B and to cause the west and east distributors at Control Point B to transmit a teletypewriter code to Control Point A and Control Point C, respectively. The reception of this code by the east non-typing selector (East NTS) at Control Point A will cause the control circuit at Control Point A to function and light the ET indicator lamp in the switchboard at Control Point A. Similarly, the reception of this teletypewriter code by the west non-typing selector (West NTS) at Control Point C will cause the control circuit at Control Point C to function and light the WT indicator lamp in the switchboard at Control Point C. The control circuit at Control Point B also functions as stated above to extinguish the line lamp and light the busy lamp in the switchboard at Control Point B. Because the mobile subscriber is originating a call over the west terminal receiver (receiver 1) at Control Point B and because the service area of this receiver covers a part of the interference area between Control Point A and Control Point B, the transmitter at Control Point A must be kept off the air so as to prevent the probability of causing interference with the conversation being carried on over receiver 1 at Control Point B. The reception of the two teletypewriter codes by the east non-typing selector (East NTS) at Control Point A indicating that receiver 1 at Control Point B is engaged and that the transmitter at Control Point B is on the air, causes the control circuit at Control Point A to function to light the busy lamp in the switchboard at Control Point A. This is an indication to the operator at Control Point A that she should not originate a call, that is, place her transmitter on the air, because of the possibility of causing interference with the call that is being handled through receiver 1 at Control Point B. In addition, to prevent the lighting of the line lamp in the switchboard at Control Point A when this condition exists, the control circuit at Control Point A operates and establishes a blocking condition which prevents the lighting of the line lamp in the switchboard at Control Point A when a call from a mobile subscriber is received thereat.

*Call originated by mobile subscriber at point S on highway of Fig. 1, Receiver 1 at Control Point B is engaged and transmitter at Control Point B is on the air*

With the previously described conditions existing, that is, with receiver 1 at Control Point B engaged and the transmitter at Control Point B on the air, assume that another mobile subscriber located at point S on the highway of Fig. 1 originates a call. His carrier signal will be picked up by receiver 2 at Control Point A which in turn will cause the control circuit at Control Point A to function. Because Control Point A may not handle a call now due to possibly interfering with the call being handled over receiver 1 at Control Point B, the control circuit at Control Point A functions and turns on the transmitter thereat momentarily to transmit a short busy tone signal to the mobile subscriber, thus telling him that he may not originate a call. The control circuit at Control Point A prevents the line lamp in the switchboard at Control Point A from lighting. The operator at Control Point A knows that she should not handle an incoming or outcoming call because the ET and ER indicator lamps and the busy lamp in her switchboard are lighted as stated previously. When the call handled over receiver 1 at Control Point B terminates, the control circuit thereat causes the west distributor (West TDX) at Control Point B to transmit teletypewriter codes to Control Point A indicating that receiver 1 at Control Point B is no longer engaged and that the transmitter at Control Point B is off the air. The reception of these codes by the east non-typing selector (East NTS) at Control Point A causes the control circuit thereat to function and extinguish the ET and ER indicator lamps and the busy lamp in the switchboard at Control Point A. The circuits at Control Point A are now capable of functioning in the manner previously stated to accept a call from the mobile subscriber located at point S on the highway shown in Fig. 1.

*Call originated by mobile subscriber at point Y on the highway of Fig. 1—Circuits at all control points idle*

If a mobile subscriber located at point Y on the highway shown in Fig. 1 originates a call, his carrier signal will be picked up by receiver 1 associated with Control Point B and receiver 4 associated with Control Point A. The control circuit at Control Point B will function to determine the merit rating of the signal being received over receiver 1. This rating will be one of four possible ratings, one, two, three or four, and the particular one of these merit ratings will depend upon the desirability of the received signal, the higher the merit rating, the more desirable the signal. The control circuit at Control Point B functions to cause the west distributor (West TDX) at Control Point B to transmit a teletypewriter code to Control Point A which represents the particular merit rating of the signal received over receiver 1 at Control Point B. Assume now that the merit rating of the signal being received over receiver 1 at Control Point B is three. This information is then transmitted to Control Point A. In a similar fashion, the control circuit at Control Point A will function to determine the merit rating of the signal being received over receiver 4 at Control Point A and will cause the east distributor (East TDX) thereat to transmit a teletypewriter code representing this merit rating to Control Point B. Assume that the signal being received over receiver 4 at Control Point A has a merit two rating. This information is then transmitted to Control Point B. The west non-typing selector (West NTS) at Control Point B, upon receiving the teletypewriter code for a merit two rating from Control Point A, will cause the control circuit at Control Point B to compare this merit two rating with the merit three rating of the signal being received over receiver 1 at Control Point B. Because the signal being received over receiver 1 at Control Point B has a higher merit rating, the call should be handled through Control Point B and the control circuit at Control Point B functions to light the R1 indicator lamp and the line lamp in the switchboard at Control Point B. The control circuit at Control Point B also causes the west distributor (West TDX) to transmit a teletypewriter code to Control Point A to indicate that receiver 1 at Control Point B is engaged. When the east non-typing selector at Control Point A receives the merit three rating from Control Point B, it causes the control circuit at Control Point A to make a comparison between this merit three rating and the merit two rating of the signal being received over receiver 4 at Control Point A. Because the signal being received over receiver 1 at Control Point B is stronger, that is, has a higher merit rating than the signal being received over receiver 4 at Control Point A and because the call will be handled through Control Point B as stated above, the control circuit at Control Point A functions to prevent the lighting of the R4 receiver indicator lamp and the line lamp in the switchboard at Control Point A. When the operator at Control Point B answers the call in response to the lighting of the line lamp in her switchboard, the control circuit at Control Point B functions to turn on the transmitter at Control Point B, to extinguish the line lamp and light the busy lamp in the switchboard at Control Point B, and to cause the teletypewriter codes to be transmitted to the adjacent east and west control points indicating that the transmitter at Control Point B is on the air. The control circuit at Control Point A functions in the manner previously stated in response to these teletypewriter codes indicating that receiver 1 at Control Point B is engaged and that the transmitter at Control Point B is on the air to light the ER and ET indicator lamps and the busy lamp in the switchboard at Control Point A.

*Transfer of a mobile subcriber's call to an adjacent control point*

With the previously described conditions existing, that is, with a call from the mobile subscriber located at point Y on the highway shown in Fig. 1 being handled over receiver 1 at control point B, assume that the mobile subscriber moves in a westerly direction towards Control Point A. This represents a movement from point Y on the highway shown in Fig. 1 to point Z. As the mobile subscriber moves in a westerly direction the strength of the signal being received over receiver 1 at Control Point B will diminish while the strength of the signal being received over receiver 4 at Control Point A will increase. Each time the merit rating of the signal received over receiver 4 at Control Point A changes, the control circuit at Control Point A functions to cause the transmission of a new teletypewriter code representing this new merit rating to Control Point B. Similarly, each time the merit rating of the signal received over receiver 1 at Control Point B changes, the control circuit at Control Point B functions to cause the transmissions of a new teletypewriter code representing this new merit rating to Control Point A. Each time new merit ratings are received by the control circuits at Control Point A and Control Point B, each will function to make a new comparison. A point will be reached during the progress of the mobile subscriber where the signal received over receiver 4 at Control Point A will have a higher merit rating than the signal received over receiver 1 at Control Point B. At this time, the control circuit at Control Point B functions to extenguish the R1 indicator lamp and to repeatedly flash the WR indicator lamp in the switchboard at Control Point B. The flashing of the WR indicator lamp gives a visual signal to the operator at Control Point B, who is handling and supervising the call, that the mobile subscriber's signal is now stronger through Control Point A and that she should take immediate steps to transfer the supervision and control of the call to Control Point A. The operator at Control Point B will interrupt the conversation and request the mobile subscriber to halt his westerly progress until he completes the call or to continue his westerly progress and complete the call after a slight delay while the transfer of the supervision and control of the call is made. If the mobile subscriber elects to continue his westerly progress, the operator at Control Point B will contact the operator at Control Point A over the wire trunk lines which connect the two switchboards and advise her that a call will be coming in on her switchboard which was originally controlled and supervised through Control Point B. The operator will extend the connection from the called subscriber over this trunk line to the switchboard at Control Point A so that the operator at Control Point A may then reestablish the connection at the calling mobile subscriber. When the operator at Control Point B has done this, she will remove the plug from the line jack in her switchboard which will cause the control circuit at Control Point B to function and turn off the transmitter at Control Point B. The control circuit at Control Point B functions as previously stated to cause the west distributor (West TDX) thereat to transmit teletypewriter codes to Control Point A indicating that receiver 1 at Control Point B is no longer engaged and that the transmitter at Control Point B is off the air. The reception of these codes by the east non-typing selector (East NTS) at Control Point A causes the control circuit thereat to function and extinguish the ER and ET indicator lamps and the busy lamp in the switchboard at Control Point A. The control circuit at Control Point A, in response to the signal being received over receiver 4 at Control Point A, will then function to cause the line lamp in the switchboard at Control Point A to light. The operator at Control Point A, in response to the lighting of the line lamp in her switchboard, may then reestablish the connection between the called subscriber and the calling mobile subscriber. The circuits at Control Point A then function in a manner similar to that previously stated for Control Point B to cause the WT and WR indicator lamps and the busy lamp in the switchboard at Control Point B to be lighted.

*Call originated by mobile subscriber at point W on the highway of Fig. 1, mobile subscriber then moves in a westerly direction to point X while transmitter at Control Point A is on the air.*

Assume that after originating a call from point W on the highway shown in Fig. 1 over receiver 2 at Control Point B in the manner previously stated, the mobile subscriber moves in a westerly direction towards Control Point A. Assume further that the transmitter at Control Point A is on the air so that if the mobile subscriber should move into the interference area between Control Point A and Control Point B he would encounter interference difficulties with transmission from the transmitter at Control Point A. As previously stated, as the mobile subscriber moves from point W to point X on the highway shown in Fig. 1, the control circuit at Control Point B functions to transfer the call from receiver 2 to receiver 1 at Control Point B. The control circuit at Control Point B also functions at this time to extinguish the R2 indicator lamp and to light the R1 indicator lamp in the switch board at Control Point B. This gives the operator at Control Point B a visual indication of the direction of travel of the mobile subscriber. The control circuit at Control Point B also functions as previously stated, to cause the transmission of the teletypewriter code indicating that receiver 1 at Control Point B is engaged to Control Point A. When the call has been transferred to receiver 1 at Control Point B, the control circuit thereat functions to start a timing circuit which operates for a predetermined time interval. If the mobile subscriber has not completed his call during this predetermined timing interval, the control circuit at Control Point B will function to cause the R1 indicator lamp in the switchboard at Control Point B to change from a steady lamp to a flashing lamp. The operator at the switchboard of Control Point B, upon observing the flashing of the R1 indicator lamp and that the WT indicator lamp is lighted, will know that the mobile subscriber is approaching the interference area between Control Point A and Control Point B. The operator at Control Point B will thereupon interrupt the call and advise the mobile subscriber that if he continues any further in a westerly direction he will run into interference and the operator will request the mobile subscriber to halt until he has completed the call.

*Emergency call*

Assume that a mobile subscriber located at point Z on the highway shown in Fig. 1 is carrying on a call through Control Point A. In the manner previously stated, the WT and WR indicator lamps and the busy lamp in the switchboard at Control Point B will be lighted. Furthermore, the control circuit at Control Point B has been operated so as to prevent any calls from mobile subscribers in the area served by Control Point B from being received. Assume now that a mobile subscriber located at point U on the highway shown in Fig. 1 desires to make an emergency call to the operator at Control Point B. The mobile subscribers have been instructed that under emergency conditions they may make calls by operating and releasing the push-to-talk key on their sets four times in succession. Therefore, when the mobile subscriber at point U operates the push-to-talk key the first time in order to originate a call, he will hear a short busy tone signal as previously stated. Since he desires to make an emergency call, he will then release and operate his push-to-talk key three more times in succession. The control circuit at Control Point B, in response to the four successive operations of the mobile subscriber's push-to-talk key, will function to extinguish the busy lamp and light the line lamp in the switchboard at Control Point B. When the operator answers this call, the control circuit at Control Point B functions to time the duration of the emergency call and if the emergency call exceeds a predetermined interval, the control circuit functions to cause the transmission of teletypewriter codes to the adjacent east and west control points to indicate that the transmitter at Control Point B is on the air. The operator at Control Point B will determine whether or not the emergency call she is handling interferes with the call that is being handled through Control Point A by monitoring on the channel for a moment. If the emergency call causes interference, the operator at Control Point B will then contact the operator at Control Point A over the wire trunk lines which connect the two switchboards and request that the transmitter at Control Point A be turned off until the emergency call has been completed.

*Detailed description*

Figure 2:
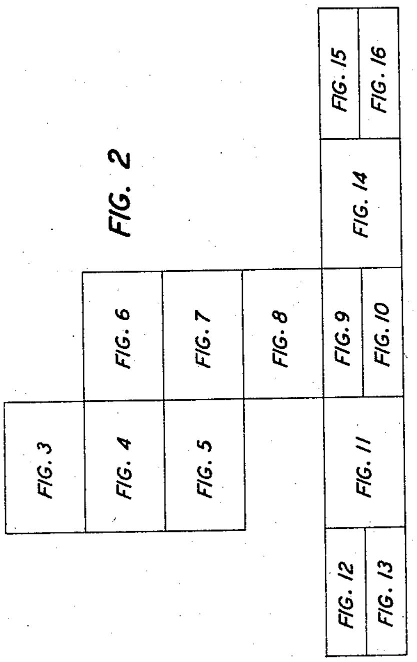
Fig. 2 shows how Figs. 3 through 16 may be arranged to disclose in schematic form the particular circuits and apparatus employed at a single control point of a highway mobile radio telephone system such as shown in block diagram form in Fig. 1.

The features of the present invention as incorporated in a mobile radio telephone system will now be described in detail. Fig. 3 through 16, when arranged adjacent to one another as shown in Fig. 2, show in schematic form the typical circuits and apparatus required at one control point in the mobile radio telephone system shown in block diagram form in Fig. 1. Each of the Control Points A, B and C shown in Fig. 1 will have circuits and equipment similar to that shown in Figs. 3 through 16. It is to be understood that although the invention is described as being incorporated in a mobile radio telephone system having three control points each controlling a transmitter and four receivers, this number does not constitute a limitation on the invention and any number of control points may be utilized in the system and each of the control points may control any reasonable number of receivers.

To simplify the drawings, Control Points A and C are indicated merely in block form (see Figs. 13 and 16) as being the adjacent west control point and adjacent east control point to Control Point B. It is to be understood that in the mobile radio telephone system to be described herein, each of the Control Points A, B and C is equipped with circuits and apparatus similar to that shown in Figs. 3 through 16. Therefore, if the circuits and equipment of Control Point B shown in Figs. 3 through 16 are substituted for the boxes representing the adjacent west control point (Control Point A) and the adjacent east control point (Control Point C), the detailed description of the invention as incorporated in the mobile radio telephone system will be clearly understood.

*Operation of receiver selector circuit*

Figure 6:
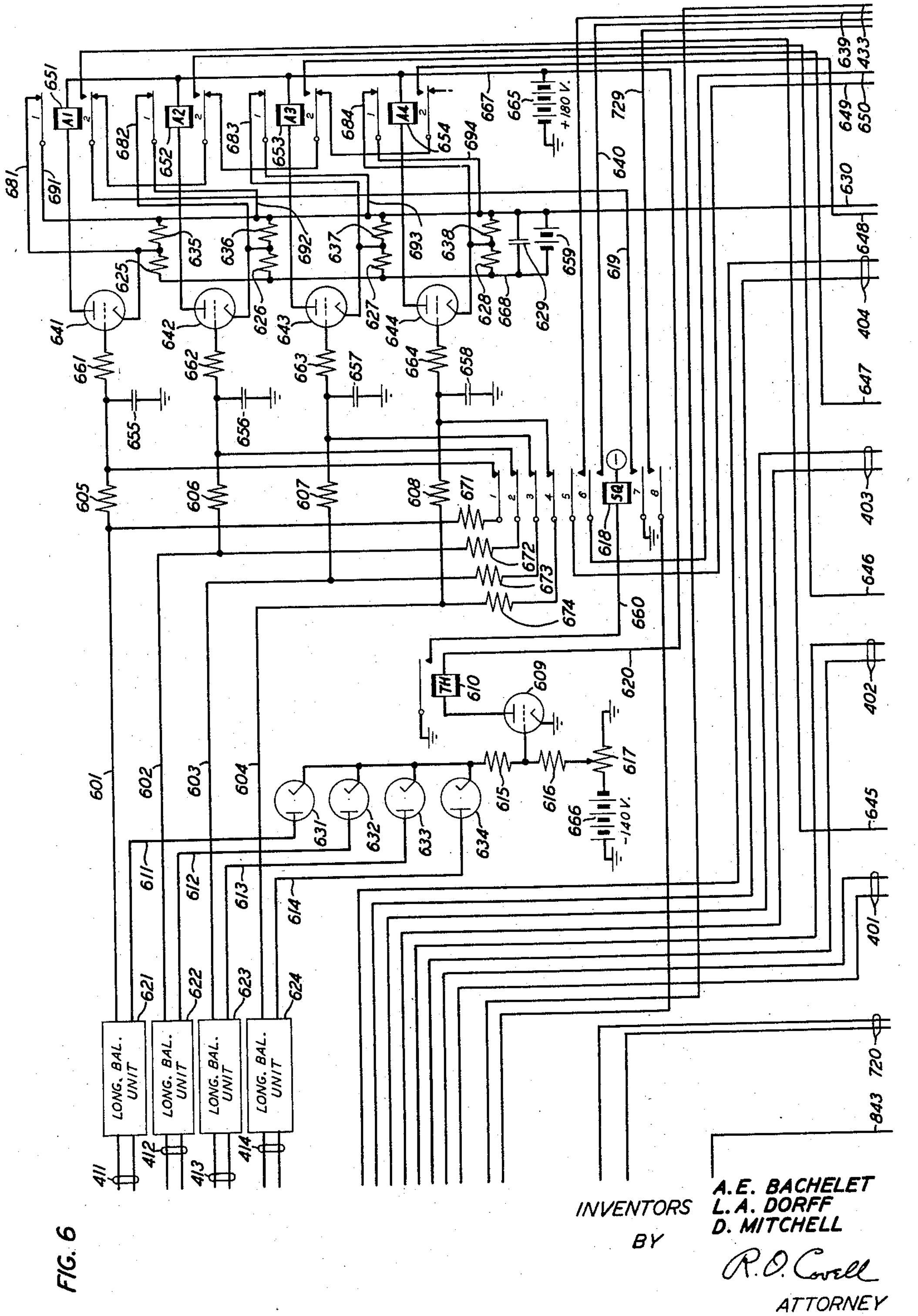
Fig. 6 is a schematic diagram showing the receiver selector circuit employed at a control point for selecting the particular one of the receivers simultaneously receiving signals at the control point which at any instant is judged to be receiving the most desirable signal.

The receiver selector circuit shown in Fig. 6 provides a means for selecting from a plurality of received message signals the train of message signals which, at any instant, is judged to be the most desirable. The manner in which the receiver selector circuit shown in Fig. 6 operates is described in detail in Patent 2,636,982 which issued April 28, 1953, to W. R. Young, Jr., and a portion of the description as it relates to the present invention will be repeated herein in abbreviated form.

Figure 3:
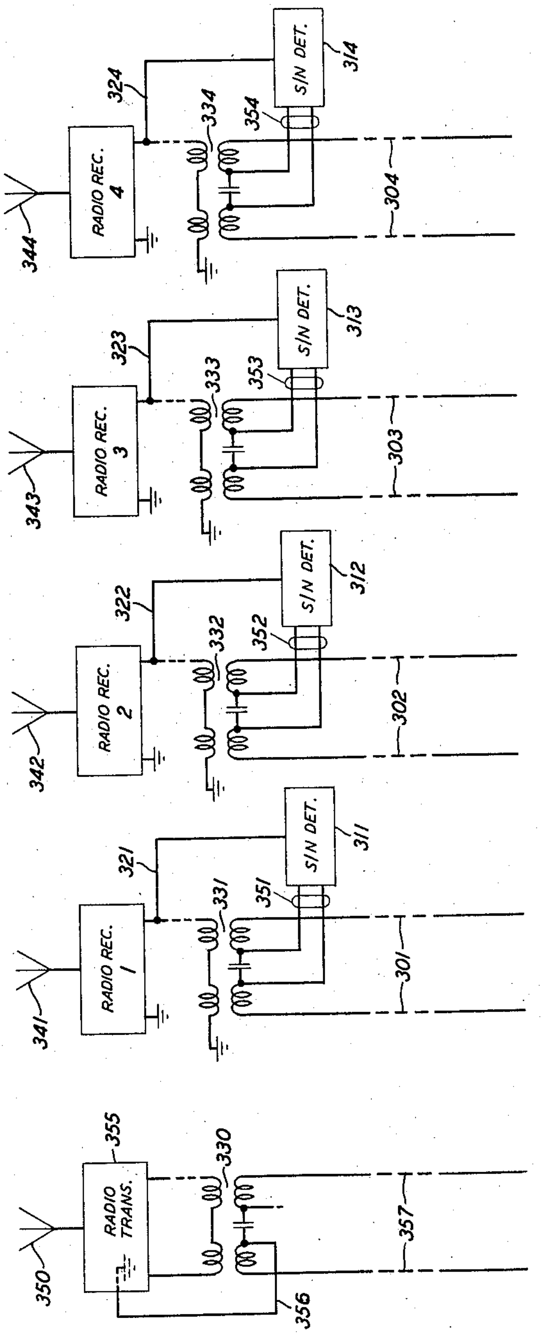
Fig. 3 illustrates in block diagram schematic form the radio receivers and associated noise detectors and the radio transmitter employed at a control point.

Referring to Fig. 3, receivers 1, 2, 3 and 4 are the four receivers associated with and under control of circuits at Control Point B as indicated in the block diagram of Fig. 1. The same message signal waves are received on the geographically separated antennas 341, 342, 343, and 344 associated with these receivers. Each of the receivers is substantially alike and may be adapted for the reception of either amplitude modulated, phase modulated or frequency modulated signal waves. Each receiver is preferably arranged such that the volume of its audio frequency output signal is substantially independent of the level of its received radio frequency signal waves, if the energy level of these waves exceeds a predetermined minimum value and is determined principally by the intensity of the modulating signal, or level of modulation at the transmitter. Under these circumstances, the level of the audio frequency message signal waves is substantially the same in the output of each receiver 1, 2, 3 and 4 at any instant, if the received radio frequency signals exceed this minimum level. Noise interference energy, which may be received by any one of the antennas 341, 342, 343 and 344, will be added to or included in the received message signal waves and such interference energy will be more prominent in the receiver output product as its ratio to the audio frequency message signal energy in the receiver output is increased.

Figure 4:
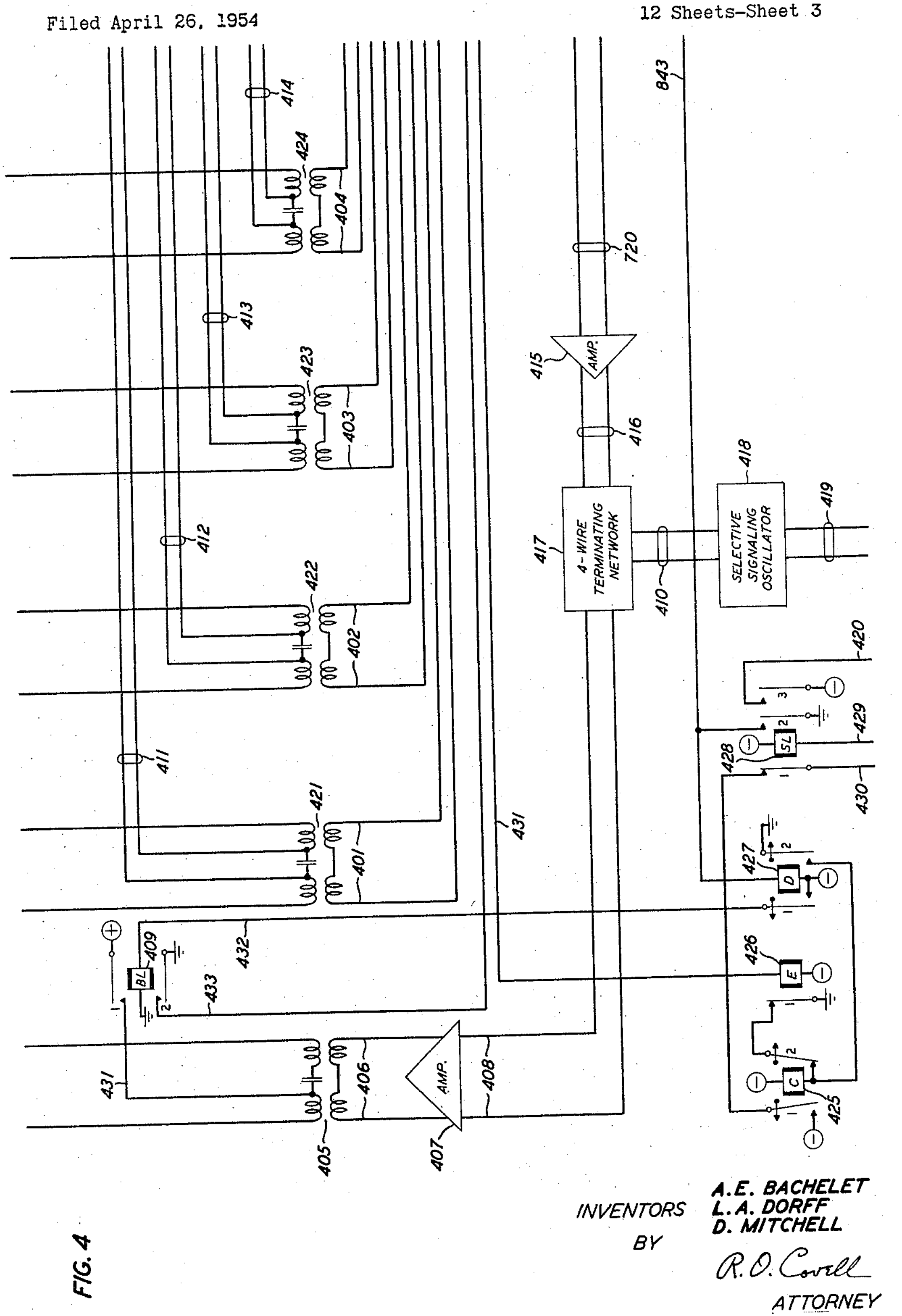
Fig. 4 shows in simplified schematic form the control and terminal equipment used at a control point.

The audio frequency output of each receiver 1, 2, 3 or 4 is divided and one portion of this output energy from each receiver is transmitted over a pair of conductors from each receiver to the control terminal equipment shown in Fig. 4 and thence to the control and switching circuits shown in Fig. 7. This constitutes the message channel for the received audio frequency signal. A second portion of the output from each receiver is transmitted to a noise detector shown in block form in Fig. 3 and from there through a longitudinal balancing unit to the receiver selector circuits shown in Fig. 6. This second portion of the output of each receiver through the associated noise detector and longitudinal balancing unit constitutes the signal merit channel. For example, the audio frequency message signals from the output of receiver 1 are transmitted through transformer 331, over conductor-pair 301 through transformer 421, over conductor-pair 401 to front contacts of LS1 relay 701 shown in Fig. 7. The signal merit portion of the output of receiver 1 is transmitted over conductor 321 to detector 311. The output of detector 311 is then transmitted over conductor-pair 351, conductor-pair 301 and conductor-pair 411 to the longitudinal balancing unit 621 shown in Fig. 6.

Noise detectors 311, 312, 313 and 314 which are associated with receivers 1, 2, 3 and 4, respectively, operate on the portion of the output energy from their respective receivers to extract from it only the noise energies that exist in the frequency spectrum immediately above and below, but not within, the message signal band. The output of each of the detectors 311 through 314, inclusive, consists of a unidirectional voltage, the amplitude of which is indicative of the level of the interfering noise waves that are received with the message signals at each receiver location. Noise detectors 311, through 314, inclusive, are disclosed in detail in Fig. 2 of the above-cited W. R. Young, Jr., patent and in the manner in which the portion of the output of each of the receivers is converted to a unidirectional voltage, the amplitude of which is indicative of the level of the interfering noise waves that are received with the message signals, is described in detail in the said W. R. Young, Jr., patent. The unidirectional merit-indicating voltage signals from the noise detectors 311, 312, 313 and 314, associated with the receivers 1 through 4, respectively, are transmitted to the receiver selector circuit of Fig. 6 through longitudinal balancing units 621 to 624, respectively.

The receiver selector circuit shown in Fig. 6 will generally be, but need not necessarily be, geographically separated from the location of the receivers 1 through 4 and their associated noise detectors 311 through 314. The unidirectional merit-indicating signal from each noise detector 311 through 314 is received at the receiver selector circuit by a respective longitudinal balancing unit 621 through 624. These longitudinal balancing units provide a means for eliminating longitudinal noise currents which may be added to the unidirectional merit-indicating signal in its transmission path from the noise detector to the receiver selector circuit. The longitudinal balancing units, such as units 621 through 624 shown in Fig. 6, are shown in detail in Fig. 3 of the above-cited W. R. Young, Jr., patent and the manner in which these units operate to eliminate these longitudinal currents is fully described in the said W. R. Young, Jr., patent.

Each of the longitudinal balancing units 621 through 624 has two outputs, one which is connected to the threshold branch of the receiver selector circuit which comprises unidirectional devices 631, 632, 633 and 634, electronic discharge device or triode 609, TH relay 610 and SQ relay 618. The other output from each of the longitudinal balancing units is supplied to the input of the channel selection branch of the receiver selector circuit shown in Fig. 6, which branch includes electronic discharge devices 641, 642, 643 and 644 and A1 relay 651, A2 relay 652, A3 relay 653 and A4 relay 654. The output voltages from the longitudinal balancing units 621 through 624 will be applied to the threshold branch and channel selecting branch of the receiver selector circuit shown in Fig. 6 each time a carrier signal is received from a mobile subscriber's transmitter. In other words, each time a mobile subscriber operates the push-to-talk button at his mobile set, the output voltages which indicate the signal merit of the received signal will be applied to the threshold branch and the channel selecting branch of the receiver selector circuit.

The output voltages from longitudinal balancing units 621 through 624 for the channel selection branch of the receiver selector circuit are supplied to the inputs of the channel selection branch of the receiver selector circuit over conductors 601 to 604, respectively. For example, the noise-indicating signal output from longitudinal balancing unit 621 is supplied over conductor 601 to triode 641. In this circuit, resistors 605 or 671 and capacitor 655 constitute an integrating network for adding a predetermined delay to the voltage changes that are supplied to the control electrode of triode 641. Whether resistor 605 or resistor 671 forms a component of this integrating network depends upon whether SQ relay 618 is operated. Resistor 671 is smaller than resistor 605 by any desirable amount in order to provide a faster selection by triode 641 at the beginning of a transmission interval. In its non-conduction state, the anode-cathode circuit of triode 641 includes source 665 of anode potential, conductor 667, winding of A1 relay 651, space discharge path of triode 641, conductor 681, back contact and armature 1 of A1 relay 651, conductor 691, conductor 630, which extends through Figs. 7, 8 and 9, to resistors 1001 to 1004 in parallel in Fig. 10 and to negative source of potential 1005. Resistors 625 and 635 are connected over conductors 668 and 630 to form the voltage divider across the biasing source 659 and its filter capacitor 629. The cathode of triode 641 is connected to the junction of these two resistors. It is, therefore, apparent that if the output signal on conductor 601 from longitudinal balancing unit 621 is of sufficient magnitude to overcome the bias on triode 641 a discharge will be initiated through tube 641. When a discharge is initiated through triode 641, A1 relay 651 will be operated and, in the manner which will be presently described, will extend a ground through front contact and armature 7 of SQ relay 618 (if this relay is operated) over conductor 619, front contact and armature 2 of A1 relay 651, over conductor 645, through the winding of LS1 relay 701 to battery. When LS1 relay 701 is operated, the message signal channel pair 401 from the output of receiver 1 is connected through front contacts and armatures 2 and 3 of LS1 relay 701, over conductors 649 and 650, through front contacts and armatures 5 and 6 of SQ relay 618, over conductors 639 and 640, through back contacts and armatures 1 and 3 of BTC relay 712, over conductor-pair 720, through amplifier 415, over conductor-pair 416 to the four-wire terminating network 417 of the control terminal equipment shown in Fig. 4.

The unidirectional output voltages from each of the longitudinal balancing units 621 through 624, inclusive, for the threshold branch of the receiver selector circuit are supplied to the inputs of the threshold branch of the receiver selector circuit over conductors 611 through 614, respectively. For example, the noise-indicating signal output from longitudinal balancing unit 621 is supplied over conductor 611 to unidirectional device 631. The cathodes of these unidirectional devices 631 through 634 are connected in parallel and their circuit includes load resistors 615, 616 and a portion of potentiometer 617. The control electrode of an electronic discharge device or triode 609 is connected to the common point of resistors 615 and 616. The lower end of resistor 616 is connected to the movable contact of potentiometer 617 which forms the voltage divider across source 666 of negative potential. The anode-cathode circuit of triode 609 includes the source 665 of positive potential, conductor 620, the winding of TH relay 610, the space discharge path of triode 609 and a ground connection which is common to the source 665. The operation of TH relay 610 connects the operating ground through its front contact and armature over conductor 660 to one terminal of the winding of SQ relay 618, the other terminal of which is connected to negative potential. It is, therefore, apparent that if the output signal on conductor 611 from longitudinal balancing unit 621 is of sufficient magnitude to overcome the bias on triode 609, a discharge will be initiated through tube 609.

It will be noted from Fig. 6 of the drawings that the receiver selector comprises four channels, one for each receiver 1 through 4, and each of these channels include a selecting branch and a threshold branch. The circuit details of each of these channels are substantially identical with those of the first or upper channel which has been described.

The operation of the receiver selector circuit of this system which has just been described, can best be understood from the following description of the operation, Assume that a mobile subscriber is located along the highway which the mobile radio telephone system described herein is serving at a point somewhere between receivers 2 and 3 associated with Control Point B. This corresponds to position V between receivers 2 and 3 of Control Point B shown in Fig. 1 of the drawings. Assume that the mobile subscriber desires to place a call to the operator at Control Point B. The mobile subscriber will remove the handset from his switchhook and depress the push-to-talk button thereon. His local mobile transmitter will transmit the carrier frequency which will be picked up by antennas 342 and 343 connected to receivers 2 and 3. In the manner above described and described in detail in the above-cited W. R. Young, Jr., patent, the message signal from each of these two receivers will be extended through transformers 332 and 333, over conductor-pairs 302 and 303, through transformers 422 and 423, over conductor-pairs 402 and 403 to front contacts of LS2 relay 702 and LS3 relay 703, respectively. A portion of the carrier signal received by receivers 2 and 3 will be operated on in the manner described above by the respective noise detectors 312 and 313. Noise detectors 312 and 313 will in turn supply unidirectional voltage indicative of the noise level of the received signal in their respective receivers over conductor-pairs 352 and 353, conductor-pairs 302 and 303, conductor-pairs 412 and 413, to longitudinal balancing units 622 and 623, respectively.

Assume now that the signal which is received by receiver 2 is stronger than the signal received by receiver 3, therefore, it is desirable to utilize receiver 2 and to exclude receiver 3. Assume further that the signal received by receiver 2 is above the minimum or "just usable" commercial grade.

As described hereinbefore, the output of longitudinal balancing units 622 and 623 consists of unidirectional voltages, the magnitude of which varies inversely as the level of the noise energy varies in the output of their associated receivers. The output of longitudinal balancing unit 622 associated with receiver 2 (which, under the above-assumed conditions has the most desirable signal and which is above the minimum or "just usable" value), is applied via conductor 612 to unidirectional device 632. When the voltage on conductor 612 is increased due to the unidirectional voltage obtained from the longitudinal balancing unit 622, the negative bias on the control electrode of threshold tube 609 is counteracted by the potential developed across the rectifier load comprising resistors 615 and 616 and the potential of this electrode is raised to the value where the resulting anode current flow is sufficient to operate TH relay 610. This condition corresponds to the reception of a usable or commercial grade of signal by receiver 2. It will be readily seen that this same action will occur if the commercial usable signal was used by receiver 3 or any of the other receivers. TH relay 610, in operating, connects ground over conductor 660 through the winding of SQ relay 618 and causes this latter relay to operate. SQ relay 618, in operating, connects a ground through its front contact and armature 7 over conductor 619 through back contact and armature 2 of A1 relay 651 to armature 2 of A2 relay 652. SQ relay 618, in operating, also completes a circuit from four-wire terminating network 417 over conductor-pair 416, through amplifier 415, over conductor-pair 720, through front contacts and armatures 1 and 3 of BTC relay 712, over conductors 639 and 640, through front contacts and armatures 5 and 6 of SQ relay 618 over conductors 649 and 650 to the LS relays 701 through 704 shown in Fig. 7. The operation of one of the LS relays such as LS2 relay 702 or LS3 relay 703 will then complete the circuit for connecting the output of the selected receiver 2 or 3 to the four-wire terminating network 417. SQ relay 618, in operating, also completes a portion of the operating circuit for E relay 426 which may be traced from battery through the winding of E relay 426, over conductor 431, through front contact and armature 8 of SQ relay 618 over conductor 729. The object of extending the operating circuit for E relay 426 through SQ relay 618 will be described in detail hereinafter.

The manner in which receiver 2 is selected and receiver 3 is rejected will now be explained. As assumed above, both receivers 2 and 3 are receiving the transmission from the mobile subscriber and receiver 2 is receiving the stronger of the two signals. The unidirectional voltage outputs from the longitudinal balancing units 622 and 623 on conductors 602 and 603 are applied to triodes 642 and 643, respectively. These voltages applied to the control elements of triodes 642 and 643 will cause anode current to flow in both of these tubes. It will be noted that the parallel combination of resistances 1001 through 1004 in Fig. 10 are connected in the cathode circuit of each triode 641 through 644 over conductor 630. The voltage that is developed across this parallel resistor combination by the combined current flow in triodes 642 and 643 exerts a degenerative feedback effect which tends to bias the cathode of each tube positive with respect to the potential of its control electrode. Therefore, if the same potential exists on the control electrode of tubes 642 and 643, the cathode of each of these triodes will be at the same potential. However, if the potential of the control electrode of one triode, for example, triode 642, exceeds that of the control electrode of any other triode, the current flow through the triode having the highest potential on its control electrode will establish the potential at all of the cathode electrodes of tubes 641 through 644. Therefore, because, as assumed above, the unidirectional voltage in the output of the longitudinal balancing unit 622, which is associated with receiver 2, is greater than that in the output of longitudinal balancing unit 623, more anode current will flow through triode 642. Under this condition, triode 642 will conduct and triode 643 will be cut off. This condition will continue unless some one of the longitudinal balancing units 621 through 624 supplies to its associated selection branch of the receiver selector a potential which is substantially equal to that existing on the control electrode of triode 642. If such a condition prevailed, the receiver selector might connect the output of two receivers, for example, receivers 1 and 2, to the control terminal equipment shown in Fig. 4 or it might be subjected to undesirable indecision by switching from the output of one to that of another of the receivers as the noise energy in the output circuit of these receivers fluctuates one above the other by a slight amount. To prevent these conditions, a preferential biasing arrangement is provided such that when a usable signal has been chosen by the receiver selector it will continue to be chosen until it is supplanted by a more desirable signal which exceeds the chosen signal by a predetermined amount. As described above, the anode current flowing through triode 642 will complete a circuit for the operation of A2 relay 652. The operation of A2 relay 652 opens the circuit which was formerly closed through its back contact and armature 1 and removes a short-circuit connection across resistor 636, resistor 636 being short-circuited by conductor 682 through the back contact and armature 1 of A2 relay 652 and conductor 692. This action removes the short-circuit connection which formerly existed across resistor 636 and produces across the combined resistors 626 and 636 a voltage drop which is equal to the potential of source 659. The effect of this action is to lower the potential of the cathode electrode of triode 642 with respect to the potential of the cathode electrodes of triodes 641, 643 and 644 by a predetermined amount which is controlled by the relative values of resistors 626 and 636 and the potential source 659. Under these circumstances then, before any other channel of the receiver selector can connect the output of its associated receiver to the control terminal shown in Fig. 4 and in so doing bias triode 642 to its non-conduction state, the potential on the control grid electrode of its associated discharge device must exceed the potential on the control grid electrode of triode 642 by at least the amount of the voltage drop across resistor 636.

As described above, a discharge being initiated through triode 642 will cause the operation of A2 relay 652. The operation of A2 relay 652 will complete a circuit which may be traced from ground through front contact and armature 7 of SQ relay 618, conductor 619, back contact and armature 2 of A1 relay 651, front contact and armature 2 of A2 relay 652, conductor 646 through the winding of LS2 relay 702 to battery. LS2 relay 702, in operating, completes the circuit for the connection of the output of the selected receiver 2 to the control terminal circuits shown in Fig. 4. This connection may be traced from conductor-pair 402, through front contacts and armatures 2 and 3 of LS2 relay 702, over the previously traced circuit through conductors 649 and 650, front contacts and armatures 5 and 6 of SQ relay 618, conductors 639 and 640, back contacts and armatures 1 and 3 of BTC relay 712, over conductor-pair 720 through amplifier 415, over conductor-pair 416 to the four-wire terminating network 417 in Fig. 4.

It will, therefore, be observed that when a signal is received from a mobile subscriber over more than one of the radio receivers associated with Control Point B, the receiver selector circuit of Fig. 6 will operate to cause the receiver receiving the best signal to be connected to the control terminal equipment of Fig. 4. If receiver 1 is judged to be receiving the strongest signal, A1 relay 651 will be operated to close a connection from ground over conductor 645 to cause the operation of LS1 relay 701. If receiver 2 is judged to be receiving the strongest signal, A2 relay 652 will be operated and a ground will be connected to conductor 646 to operate LS2 relay 702. Similarly, if receivers 3 or 4 are judged to be receiving the strongest signal, A3 relay 653 or A4 relay 654 will be operated and apply a ground to conductor 647 or 648 to cause the operation of LS3 relay 703 or LS4 relay 704, respectively. The receiver selector circuit of Fig. 6 assures that one and only one of the receivers associated with Control Point B is connected through to the four-wire terminating network and it further assures that only the receiver which is receiving the best signal is connected through. Furthermore, the receiver selector circuit of Fig. 6 assumes that none of the receivers will be connected through to the four-wire terminating network 417 unless they are receiving a signal which is as strong or stronger than a predetermined minimum which is the usable or commercial grade signal. In addition, if, during the progress of a call, the merit of a signal being received over a particular receiver decreases and the merit of the signal being received over an adjacent receiver should increase, the receiver selector circuit of Fig. 6 will cause the automatic transfer from the receiver receiving the weaker signal to the receiver receiving the stronger signal.

Figures 5, 5A, 5B:
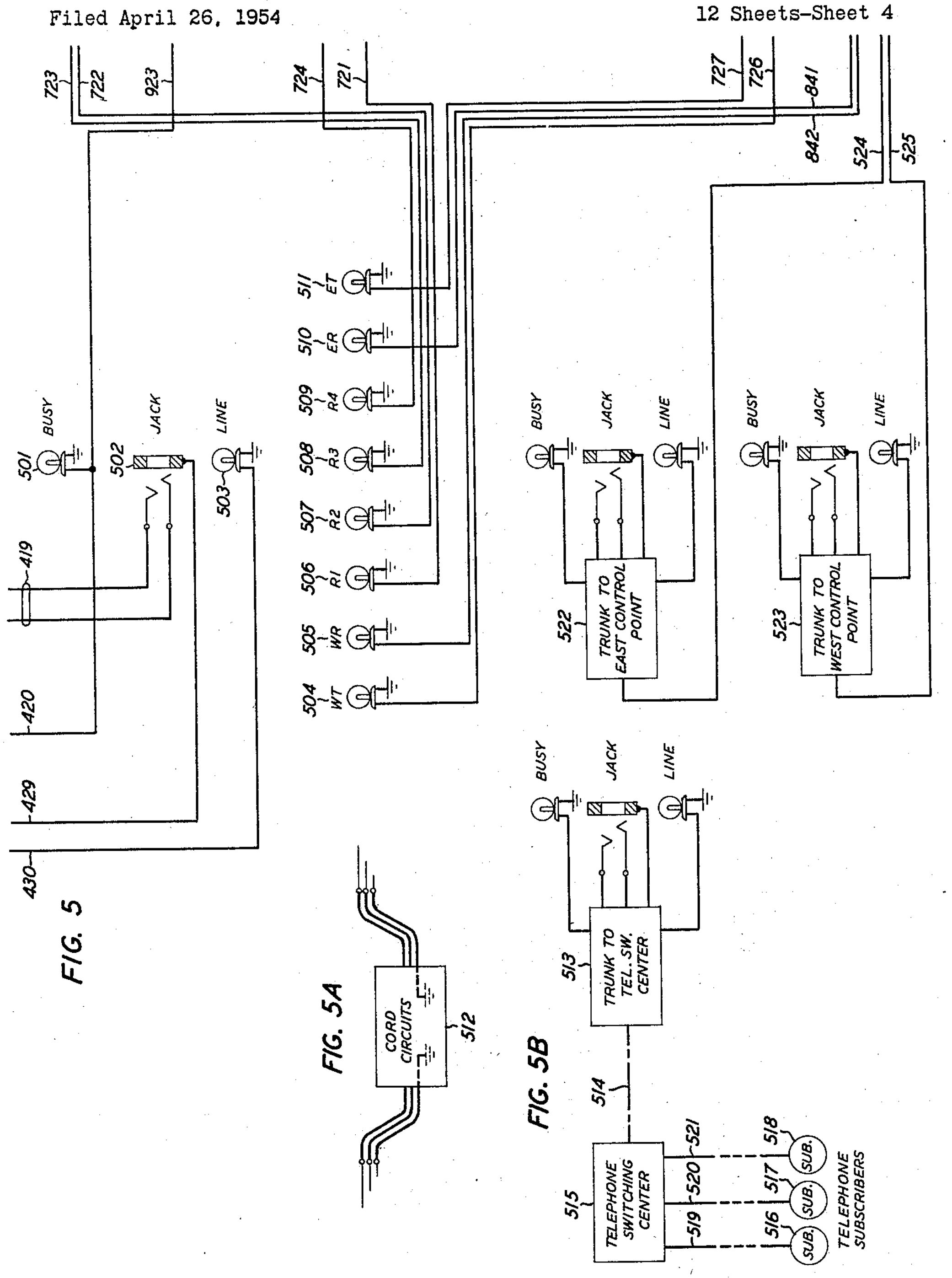
Fig. 5 shows in simplified schematic form the switchboard equipment employed at a control point.
Fig. 5A shows in block diagram form the cord circuits of the switchboard at a control point.
Fig. 5B shows in block diagram form a telephone switching center with telephone subscribers connected thereto and a trunk to the switchboard shown in Fig. 5.

The control terminal equipment shown in simplified schematic form in Fig. 4 includes a four-wire terminating network 417 which combines the one-way radio transmitting leg and the one-way radio receiving leg with the two-way two-wire trunk leading to the switchboard equipment shown in Fig. 5. The transmitting leg leading from the four-wire terminatnig network 417 to radio transmitter 355 associated with Control Point B, includes conductor-pair 408, amplifier 407, conductor-pair 406, transformer 405, conductor-pair 357 and transformer 330. The receiving leg from the four-wire terminating network 417 includes conductor-pair 416, amplifier 415, conductor-pair 720 which leads through the control and switching circuits shown in Fig. 7 to the receiver selector circuit shown in Fig. 6 where a plurality of four receivers are multipled together to form the receiving branch. The two-way trunk to the switchboard equipment extends from the four-wire terminating network 417 over conductor-pair 410 through selective signaling oscillator 418, over conductor-pair 419 to switchboard jack 502 shown in Fig. 5. Over this two-wire trunk, connection is made to the mobile service positions at the switchboard and generally would extend through a two-way operator office trunk. However, for purposes of simplification, this trunk has been omitted and the busy lamp 501, line jack 502 and line lamp 503 at the operator's position are shown wired direct to relays and circuits in the control terminal equipment of Fig. 4. The selective signaling oscillator 418 contains the means for selectively signaling the mobile subscribers and is controlled by a dial at the switchboard operator's position. C relay 425, E relay 426, D relay 427, SL relay 428 and BL relay 409, shown in Fig. 4, perform the various functions required of the control terminal equipment as will be described hereinafter.

The operator's switchboard equipment is shown in simplified schematic form in Fig. 5, Fig. 5A and Fig. 5B and in addition to the busy lamp 501, line jack 502 and line lamp 503 which extend to the control terminal equipment, the switchboard operator's position will have lamps 504 through 511, inclusive. These lamps are controlled by the control and switching circuits shown in Figs. 7, 8 and 9 to give a visual indication to the operator at Control Point B of the traffic which is being carried on at Control Point B and at the adjacent east control point and adjacent west control point. In a manner which will be described in detail below, R1 lamp 506 will be lighted whenever a call is being received over receiver 1 shown in Fig. 3. Similarly, R2 lamp 507, R3 lamp 508 and R4 lamp 509 will be lighted whenever a call is being received over receivers 2, 3 or 4, respectively. In addition to these receiver lamps which are associated with the receivers at Control Point B, the operator at the switchboard of Control Point B has a lamp which is lighted in the manner to be described below when the terminal receiver in the adjacent east control point and the terminal receiver in the adjacent west control point are being used. For example, when receiver 4 shown in Fig. 1 at Control Point A is being utilized on a call, WR lamp 505 at the switchboard operator's position at Control Point B will be lighted. Similarly, when the receiver 1 of Control Point C is being utilized on a call, ER lamp 510 in the switchboard position at Control Point B will be lighted. When the transmitter at the adjacent west control point (Control Point A) is busy, WT lamp 504 at Control Point B will be lighted and similarly, when the transmitter at the adjacent east control point (Control Point C) is busy, ET lamp 511 in the switchboard position at Control B will be lighted. Each switchboard position at the various control points is equipped with a number of cord circuits designated 512 in Fig. 5A. The operator's switchboard at each control point is also equipped with one or more trunks 513 which connect over cable 514 to a telephone switching center 515 which may be either a manual or dial type exchange shown in Fig. 5B. The telephone switching center will have a plurality of telephone subscribers connected thereto, such as subscribers 516, 517 and 518 which are connected to the telephone switching center via cables 519, 520 and 521. Trunk 513 and its associated trunk jack will permit the operator at the switchboard position of each control point to complete the connection of calls to and from mobile subscribers and telephone subscribers in the local exchange area. In addition to the trunk 513 to the telephone switching center 515, the switchboard position at each control point also has a wire trunk leading to the switchboard position at the adjacent east control point and adjacent west control point. For example, trunk 522 in the switchboard position at Control Point B extends over cable 524 to the operator's switchboard position at the adjacent east control point (Control Point C). Similarly, trunk 523 in the switchboard position at Control Point B extends over cable 525 to the operator's switchboard position at the adjacent west control point (Control Point A). Trunks 522 and 523 with their associated jacks and supervisory equipment will enable the operator at Control Point B to communicate with the operators at Control Points A and C for supervisory purposes which will be described below.

The control and switching circuits shown in schematic form in Figs. 7, 8 and 9 control the various switching and control functions required for lighting the receiver and transmitter lamps 504 through 511 at Control Point B and at the adjacent east and west control points (Control Points A and C) as will be described.

Fig. 10 shows in schematic form the signal merit decider which, as will be described, provides a means for assigning a particular merit rating to a signal received over receiver 1 or receiver 4 associated with Control Point B. Referring to Fig. 1, it will be observed that receivers 1 and 4 are the terminal receivers for Control Point B just as are receivers 1 and 4 the terminal receivers for Control Point A and Control Point C. If a mobile subscriber originates a call from a location somewhere between two adjacent control points, his carrier signal may be picked up by the adjacent terminal receivers at both control points. For example, if the mobile subscriber originates a call while located at position Y shown in Fig. 1, his carrier signal will be picked up by receiver 4 associated with Control Point A and receiver 1 associated with Control Point B. The signal merit decider circuit of Fig. 10 at Control Point A and Control Point B will assign a merit rating to the two received signals so that the two signals can be compared to determine which signal is the most desirable.

Figs. 12 and 15 show in schematic form the comparison circuits which, as will be described below, provide a means for comparing the merit rating of a signal received by a terminal receiver at an adjacent control point with the merit rating of a signal simultaneously received by a terminal receiver at Control Point B.

Figs. 11 and 14 show in schematic form the code relays which are operated in response to the operation of the various switching and control circuits shown in Figs. 7, 8 and 9 and the comparison circuits shown in Figs. 12 and 15. The operation of one of the code relays, such as relays 1101 through 1108 shown in Fig. 11, will cause the distributor 1306, shown in Fig. 13, to transmit a permutation code signal corresponding to a letter of the alphabet to the adjacent west control point (Control Point A). Similarly, the operation of one of the code relays, such as relays 1401 through 1408 shown in Fig. 14, will cause the distributor 1606, shown in Fig. 16, to transmit a permutation code signal corresponding to a letter of the alphabet to the adjacent east control point (Control Point C). In the specific embodiment of the invention as disclosed therein, the code signals transmitted between control points are the five-unit permutation printing telegraph codes commonly in use in the printing telephone art to transmit signals representing letters of the alphabet. It is to be understood, however, that the invention is not limited to the use of a five-unit permutation code and that any type code may be used.

The distributor shown within the dotted rectangle 1306 for transmitting permutation code signals to the adjacent west control point, which is similar to the distributor shown within the dotted rectangle 1606 for transmitting permutation code signals to the adjacent east control point, is well known in the telegraph art and comprises five code segments numbered 1 to 5, each of which are connected to one of the code leads 1301 to 1305, respectively, extending to the code relays 1101 to 1108 shown in Fig. 11. Distributor 1306 has a start segment and a stop segment in addition to the five code segments, the stop segment being connected to ground. In addition, distributor 1306 has a ring 1308 which is connected to outgoing line 1307 extending to the adjacent west control point. Brush arm 1309 on distributor 1306 is equipped with a brush for consecutively bridging the start segment, code segments and the stop segment with ring 1308. Brush arm 1309 is mounted on shaft 1310 which is driven by motor 1311 through friction clutch 1312, worm 1314 and worm gear 1315 when switch 1313 is operated.

When one of the code relays 1101 through 1108 shown in Fig. 11 is operated, grounds are applied to the code leads 1301 through 1305 which correspond to the permutation code for a particular letter of the alphabet. For example, if LO1 relay 1101 is operated, grounds will be applied to leads 1301 and 1303 which extend to code segments 1 and 3 of distributor 1306. The operation of LO1 relay 1101 will also apply a ground to conductor 1120 which extends through the winding of G relay 1109 to battery. G relay 1109, in operating, connects a ground through its armature 9 and front contact to conductor 1121 which extends through armature 1 and back contact of STA relay 1110, over start conductor 1122, through the winding of ST1 relay 1320 in distributor 1306 to battery. ST1 relay 1320 is the start magnet for distributor 1306 which, when energized, attracts armature 1319. Armature 1319, upon being operated, is withdrawn from projection 1318 on cam 1317 which is secured to shaft 1310, and shaft 1310 and brush arm 1309 are driven in a clockwise direction by motor 1311 through friction clutch 1312, motor 1311 being continuously operated when start switch 1313 is closed. Brush arm 1309 of distributor 1306 is caused to rotate once over its segments and a ground is applied to line 1307 when the brush of brush arm 1309 passes over segments 1 and 3 to which a ground has been applied. Some time after the start of the rotation of brush arm 1309, cam 1317, which is attached to shaft 1310, will cause auxiliary contacts 1321 to close momentarily and apply ground to conductor 1323. Ground on conductor 1323 is extended through the winding of STB relay 1119 to battery, operating this relay. STB relay 1119, in operating, connects a ground through its front contact and armature 1 to the winding of STA relay 1110 to battery, operating this relay. STA relay 1110, in operating, locks operated through its armature 2 and front contact to ground on conductor 1121 from G relay 1109. STA relay 1110, in operating, also removes the ground from conductor 1322 which extends through the winding of ST1 relay 1320 and allows ST1 relay 1320 to release. The deenergization of ST1 relay 1320 allows armature 1319 to restore so that armature engages projection 1318 on cam 1317 at the end of a complete revolution of shaft 1310 and brush arm 1309. Brush arm 1309 then comes to rest on the stop segment of distributor 1306 after making one complete revolution. During this one revolution, distributor 1306 has transmitted to the adjacent west control point (Control Point A) over conductor 1307 a five-unit permutation code signal for the letter S.

The distributor 1606, shown in Fig. 16, operates in the same manner to transmit permutation code signals to the adjacent east control point (Control Point C).

Fig. 13 also discloses the non-typing selector enclosed within the dotted rectangle 1350 which receives the permutation code signals transmitted from the adjacent west control point (Control Point A) over conductor 1353 to cause the operation of the various switching and control circuits shown in Figs. 7, 8 and 9 and the comparison circuit shown in Fig. 12. The non-typing selector shown within the dotted rectangle 1650 in Fig. 16 in a similar manner will receive the permutation code signals transmitted from the adjacent east control point (Control Point C) to cause the various switching and control circuits shown in Figs. 7, 8 and 9 and the comparison circuit shown in Fig. 15 to operate.

The non-typing selectors 1350, shown in Fig. 13, and 1650, shown in Fig. 16, are provided with numerous contacts which are selectively actuated in response to the various permutation code signals received over conductors 1353 and 1653, respectively, from the adjacent west control point and from the adjacent east control point, respectively. The various contacts of non-typing selectors 1350 and 1650 are designated S, X, Q, G, W, F, C and D to indicate the respective letter of the alphabet which, when received in the five-unit permutation code from the adjacent control point, will cause the operation of these contacts. For example, if the letter S is received in the five-unit permutation code over conductor 1353 from the adjacent west control point (Control Point A), the S contacts of the non-typing selector 1350 will be operated and a ground will be connected through the front contact and armature of the S contacts to conductor 1354 which extends through the winding of A1 relay 1211 to battery. Similarly, the reception of the permutation code representing the letter W by the non-typing selector 1350 will close the W contacts which will connect a ground through the front contact and armature of the W contacts to conductor 1358 which extends through the winding of WT relay 715 shown in Fig. 7 to battery. In like manner, the reception of a five-unit permutation code representing the letter F, for example, by the non-typing selector 1650 shown in Fig. 16 from the adjacent east control point (Control Point C) will operate the F contacts and remove the ground connected through the back contact and armature of the F contacts to conductor 1659 which extends to armature 2 of ET relay 718 shown in Fig. 7.

The manner in which non-typing selectors 1350 and 1650 cause their various contacts to operate in response to five-unit permutation code signals received over their respective lines 1353 and 1653 from their adjacent control points, is described in greater detail in United States Patent 2,112,234, granted to Beattie et al. on March 29, 1938, and United States Patent 2,120,235, granted to Beattie et al. on June 14, 1938. The structure of these non-typing selectors and the mechanism employed in this invention is substantially the same as that disclosed in the above-identified patents to Beattie et al. and operates in substantially the same manner. However, it is to be understood that the switching circuits controlled by the contacts of this equipment are in accordance with the description herein and not as shown in the said above-identified patents.

The manner in which distributor 1306 controls the non-typing selector at the adjacent west control point (Control Point A) will be clearly understood by placing the circuits of Figs. 3 through 16 in the box labeled west control point in Fig. 13. In this manner, distributor 1306 at Control Point B will control non-typing selector 1650 at the adjacent west control point (Control Point A) and for purposes of this illustration, the signals transmitted from distributor 1306 over line 1307 will be received by non-typing selector 1650 at the adjacent west control point over line 1653.

It will be observed that the stop segment of distributor 1306 is connected to ground and, therefore, when the distributor 1306 is at rest position, a ground will be supplied over conductors 1307 and 1653, under the assumed conditions, through the winding of PR relay 1652 to battery. This ground maintains PR relay 1652, which is a polarize relay, with its armature in the position shown against its marking contact. In this position, battery is supplied to the select magnet 1651 of non-typing selector 1650 which causes the driving mechanism of the non-typing selector 1650 to be retained at its stop or rest position. When one of the code relays LO1 through LO8, shown in Fig. 11 at Control Point B, is operated, which in turn causes G relay 1109 to be operated as described above, ST1 relay 1320 will be energized which will cause armature 1319 to be disengaged from projection 1318 on cam 1317. This will allow the motor 1311 through clutch 1312 to drive shaft 1310 and brush arm 1309 in a clockwise direction. When the brush arm 1309 passes over the start segment of distributor 1306, the ground is removed from conductors 1307 and 1653 which will permit PR relay 1652, which under the assumed conditions, is located in the non-typing selector at the adjacent west control point (Control Point A), to release. This will cause the armature of PR relay 1652 to make with its spacing contact and in turn will cause the select magnet 1651 of the non-typing selector 1650 to release and engage the moving means to prepare for the reception of a permutation code signal. As brush arm 1309 at Control Point B continues rotating past code segments 1, 2, 3, 4 and 5, ground pulses will be sent out over conductor 1307 and conductor 1653 in accordance with whichever of the code segments have been grounded by the operation of one of the code relays 1101 through 1108. PR relay 1652 at the adjacent west control point will follow these pulses and in turn energize the select magnet 1651 in the non-typing selector 1650 which in turn will cause the appropriate code bars in the non-typing selector 1650 to become engaged and close the particular contact which corresponds to the letter of the alphabet represented by the received permutation code signal. When brush arm 1309 of distributor 1306 reaches the stop segment, the select magnet 1651 will be engaged to halt any further selecting operation of the non-typing selector.

The manner in which the signal merit decider circuit of Fig. 10 assigns a merit rating to a signal received over receivers 1 or 4 will now be described. As described previously, when the receiver selector circuit of Fig. 6 functions to make a receiver selection, a voltage is developed on conductor 630 across the parallel combination of resistors 1001 through 1004 shown in Fig. 10. The magnitude of this voltage is a function of the desirability of the signal being received. If the received signal is strong, the voltage developed across the parallel resistor combination will be relatively great. If the received signal is weak, the voltage developed across the parallel resistor combination will be relatively small. Resistors 1001 through 1004 are potentiometers which have their movable arms connected to the control grids of triodes 1011 through 1014, respectively. The anode potential for triodes 1011 through 1014 is supplied through the windings of relays 1021 through 1024, respectively. When a discharge is initiated through any one of the triodes 1011 through 1014, the anode-cathode current flowing through the tube will cause one of the associated relays 1021 through 1024 to operate. The movable arms of potentiometers 1001 through 1004 are adjusted so that the bias on triodes 1011 through 1014 is progressively greater, with the bias on triode 1011 being the lowest and the bias on triode 1014 being the greatest.

The voltage developed on conductor 630 across the parallel combination of resistors 1001 through 1004 is assigned four values or four merit ratings. Signal merit one is obtained when the weakest signal is being received over receivers 1 or 4 and causes triode 1011 to conduct which in turn causes CM1 relay 1021 to operate. Signal merit two is obtained when a stronger signal is being received over receivers 1 or 4 which will cause triodes 1011 and 1012 to conduct and in turn operate CM1 relay 1021 and CM2 relay 1022. Similarly, signal merit three is obtained when a still stronger signal is being received over receivers 1 or 4 which will cause triodes 1011, 1012 and 1013 to conduct and in turn operate CM1 relay 1021, CM2 relay 1022 and CM3 relay 1023. Finally, signal merit four is obtained when the strongest signal is being received over receivers 1 or 4 which causes triodes 1011, 1012, 1013 and 1014 to conduct and in turn operate their associated relays, CM1 relay 1021, CM2 relay 1022, CM3 relay 1023 and CM4 relay 1024. If the signal is being received over receiver 1, a ground will be applied to conductor 732 which terminates at armature 2 of CM4 relay 1024. If the signal is being received over receiver 4, a ground will be applied to conductor 733 which terminates at armature 1 of CM4 relay 1024. The manner in which the grounds are applied to conductors 732 and 733 will be described in detail hereinafter.

Assume now that receiver 1 is receiving a signal which is the weakest of the four possible signals that can be received and that a ground has been applied to conductor 732. As described above, the voltage developed on conductor 630, as a consequence of the received signal, will only be of sufficient magnitude to cause triode 1011 to conduct and in turn operate CM1 relay 1021. The operation of CM1 relay 1021 completes a circuit which may be traced from the ground on conductor 732 through back contacts and armatures 2 of CM4 relay 1024, CM3 relay 1023 and CM2 relay 1022, through front contact and armature 2 of CM1 relay 1021, over conductor 1205, through the winding of L1 relay 1201 to battery. L1 relay 1201, in operating locks operated over a circuit which may be traced from battery through the winding of L1 relay 1201, through front contact and armature 3 of L1 relay 1201, through back contact and armature 2 of L2 relay 1202, back contact and armature 1 of L3 relay 1203, through back contact and armature 1 of L4 relay 1204, over conductor 1218, through normal contacts of armature 3 of TBA relay 902, through back contact and armature 1 of AB relay 914, through back contact and armature of TSA relay 908 to ground. The operation of L1 relay 1201 completes a circuit which may be traced from ground through front contact and armature 4 of L1 relay 1201, over conductor 1209, through normal contacts of armature 1 of S1 relay 1111, through the winding of LO1 relay 1101, through back contact and armature 1 of G relay 1109 to battery, thus operating LO1 relay 1101. LO1 relay 1101 is one of the code relays which controls the operation of distributor 1306. The operation of LO1 relay 1101 will, in the manner described above, control distributor 1306 to cause it to transmit to the adjacent west control point (Control Point A) the letter S in the five-unit permutation code.

In a similar manner, if the signal being received over receiver 1 is of sufficient strength to cause the voltage drop across the parallel combination of resistors 1001 through 1004 to cause a discharge to be initiated through triodes 1011 and 1012 and the subsequent operation of relays 1021 and 1022, merit rating two will be assigned this signal and ground on conductor 732 will be extended through back contact and armature 2 of CM4 relay 1024, back contact and armature 2 of CM3 relay 1023, through front contact and armature 2 of CM2 relay 1022, over conductor 1206, through the winding of L2 relay 1202, to battery. L2 relay 1202, in operating, will in turn complete a circuit for the operation of LO2 relay 1102. The operation of LO2 relay 1102 will, in the manner described above, control the distributor 1306 to transmit the letter X to the adjacent west control point (Control Point A) in the five-unit permutation code. Similarly, if CM1 relay 1021, CM2 relay 1022 and CM3 relay 1023 of Fig. 10 are operated indicating a merit three rating, L3 relay 1215 will be operated and in turn cause the operation of LO3 relay 1103. The operation of LO3 relay 1103 will cause distributor 1306 to transmit the letter Q to the adjacent west control point (Control Point A). Finally, if all four of the CM relays of the signal merit decider of Fig. 10 are operated indicating the reception of a signal having a merit four rating, L4 relay 1208 will be operated and in turn cause the operation of LO4 relay 1104. The operation of LO4 relay 1104 will control distributor 1306 to transmit the letter G to the adjacent west control point (Control Point A) in the five-unit permutation code.

It will be observed that the reception of a signal which has a merit rating of one will cause the distributor 1306 to transmit the letter S to the adjacent west control point and the merit rating two signal causes the letter X to be transmitted to the adjacent west control point. Similarly, a merit rating three signal causes the transmission of the letter Q to the adjacent west control point and, lastly, the reception of the merit four rating signal will cause the transmission of the letter G to the adjacent west control point. If the signal is received over receiver 4 and the ground is supplied to conductor 733, similar operation will take place with respect to the L relays in the comparison circuit of Fig. 15. The operation of these relays will, in like manner, cause the operation of the code relays of Fig. 14 to cause distributor 1606 to transmit the required letter in five-unit permutation code to the adjacent east control point (Control Point C).

When a signal from a mobile subscriber is being simultaneously received over the terminal receivers of two adjacent control points, for example, Control Point B and the adjacent west control point (Control Point A), the action above described for Control Point B will also be taking place at Control Point A and a letter will be received at Control Point B from Control Point A in the five-unit permutation code which represents the merit rating of the signal received at Control Point A. For example, if the signal being received at the adjacent west control point (Control Point A) has a merit rating of three, the letter Q will be received over conductor 1353 which will cause the operation of the non-typing selector 1350 in the manner described hereinbefore and the Q contacts of non-typing selector 1350 will be closed to extend a ground over conductor 1356 through the winding of A3 relay 1213 to battery. It will thus be observed that one of the A relays, A1 relay 1211, A2 relay 1212, A3 relay 1213 and A4 relay 1214, respectively, will operate in response to the merit rating of the signal being received at the adjacent west control point and that one of the L relays, L1 relay 1201, L2 relay 1202, L3 relay 1203 and L4 relay 1204, respectively, will be operated in response to the merit rating of the signal received over receiver 1 at Control Point B. If the merit rating of the signal being received at Control Point B is higher than the merit rating of the signal being received at the adjacent west control point (Control Point A), it is desirable to have Control Point B handle the call and to exclude Control Point A from the call. Assume now that the merit rating of a signal being received at Control Point B is three and the merit rating of the signal being received at the adjacent west control point (Control Point A) is one indicating that Control Point B is receiving a stronger signal. Under this assumption, L3 relay 1203 and A1 relay 1211 will be operated. The operation of L3 relay 1203 will complete a circuit which may be traced from ground through front contact and armature 4 of L3 relay 1203, through back contact and armature 4 of A4 relay 1214, over conductor 1217, through the winding of WC relay 815 to battery. The operation of WC relay 815 will, as described hereinafter, cause the line lamp at Control Point B to be lighted to signal the operator at Control Point B.

Assume now that the signal received at the adjacent west control point (Control Point A) has a merit rating of three while the signal received at Control Point B has a merit rating of one indicating that Control Point A is receiving the stronger signal. Under this assumption, L1 relay 1201 and A3 relay 1213 in the comparison circuit of Fig. 12 at Control Point B will be operated and the circuit for the operation of the WC relay 815 at Control Point B is open. Therefore, the line lamp at Control Point B will not be lighted.

The comparison circuit at the adjacent west control point (Control Point A) operates in a similar manner, but causes the line lamp thereat to be lighted. The manner in which this is accomplished will be clearly understood by placing Figs. 3 through 16 in the box labeled west control point in Fig. 13. In this manner, the permutation code signals representing the letters S, X, Q and G, which represent respectively, the merit ratings one, two, three and four, of signals being received at Control Point B will be transmitted by distributor 1306 at Control Point B over conductor 1307 to non-typing selector 1650 at the adjacent west control point (Control Point A) where they will be received over conductor 1653. As assumed above, the merit rating of the signal received at Control Point B is one. Therefore, the letter S will be transmitted to the adjacent west control point from Control Point B which will cause the operation of A1 relay 1511 in the manner described hereinbefore. Furthermore, as assumed above, because the signal being received at the adjacent west control point (Control Point A) has a merit rating of three, the L3 relay 1503 in the comparison circuit at Control Point A will be operated. The operation of L3 relay 1503 completes a circuit which may be traced from ground through front contact and armature 4 of L3 relay 1503, through back contact and armature 3 of A3 relay 1513, through back contact and armature 4 of A4 relay 1514, over conductor 1517, through the winding of EC relay 816 to battery. The operation of EC relay 816 will, as described hereinafter, cause the line lamp at the adjacent west control point (Control Point A) to be lighted to signal the operator thereat. Thus, it is observed that only the line lamp at the control point which is receiving the stronger of two simultaneously received signals will be lighted to signal the operator.

The west comparison circuit of Fig. 12 and east comparison circuit of Fig. 15 at each of the control points are so arranged that in the event the merit ratings of two signals are the same, the control point on the east will assume control of the call. For example, if a signal received over receiver 4 at the adjacent west control point (Control Point A) has the same merit rating as a signal simultaneously received over receiver 1 at Control Point B, the comparison circuits of Fig. 12 at Control Point B and of Fig. 16 at Control Point A are so arranged that Control Point B will assume control of the call. Assume, for example, that the signal received over receiver 4 at Control Point A and receiver 1 at Control Point B both have a merit rating of two which, as described hereinbefore, will cause the operation of L2 relay 1202 and A2 relay 1212 in the comparison circuit of Fig. 12 at Control Point B. As stated above, since both merit ratings are equal, one of the control points must be given a preference and this preference is given to Control Point B. The operation of L2 relay 1202 will complete a circuit from ground through front contact and armature 4 of L2 relay 1202, through back contact and armature 3 of A3 relay 1213, through back contact and armature 4 of A4 relay 1214, over conductor 1217, through the winding of WC relay 815 to battery. WC relay 815, in operating, will, as described hereinafter, cause the line lamp at Control Point B to be lighted. While this action is taking place, the comparison circuit of Fig. 15 located at the adjacent west control point (Control Point A) will also be comparing two signals which have equal merit ratings. Under the assumed conditions, where receiver 4 at Control Point A is receiving a signal which has a merit rating of two while receiver 1 at Control Point B is receiving a signal which also has a merit rating of two, the L2 relay 1502 and the A2 relay 1512 in the comparison circuit of Fig. 15 at Control Point A will be operated. The operation of L2 relay 1502 in this circuit will not complete a circuit for the connection of ground to conductor 1517 because the circuit is completed through a back contact and armature of A2 relay 1512 which, under the assumed conditions, is operated and, therefore, the line lamp at Control Point A will not be lighted.

A similar action takes place with respect to signals simultaneously received by receiver 4 at Control Point B and receiver 1 at the adjacent east control points (Control Point C). If the signals have the same merit ratings the comparison circuits, as described above, are arranged to give a preference to Control Point C and the line lamp at Control Point C will be lighted.

It is thus observed that when signals are simultaneously received by the terminal receivers of adjacent control points, the receiver which is receiving the strongest signal will be connected through to its associated control point and the call will be handled through this receiver. The signal merit decider circuit of Fig. 10 and its associated comparison circuits of Figs. 12 and 15 provide the means for determining which of the two simultaneously received signals is the stronger.

The main features of the present invention will be clearly understood from the following detailed description of the operation of the various circuits for a few specific examples.

*A mobile subscriber picked up by an intermediate receiver, adjacent control points not busy*

When a mobile subscriber's carrier is picked up by an intermediate radio receiver at Control Point B, receiver 2, shown in Fig. 3 for example, the associated receiver selector circuit of Fig. 6 functions in the manner described above to cause a ground to be applied to conductor 646 which extends through the winding of LS2 relay 702 to battery. The operation of LS2 relay 702, in the manner described above, closes a circuit for the connection of the output of receiver 2 to the four-wire terminating network 417 shown in Fig. 4. This connection may be traced from the output of receiver 2 through transformer 332, over conductor-pair 302, through transformer 422, over conductor-pair 402, through front contacts and armatures 2 and 3 of LS2 relay 702, conductors 649 and 650, front contacts and armatures 5 and 6 of SQ relay 618, conductors 639 and 640, back contacts and armatures 1 and 3 of BTC relay 712, over conductor-pair 720, through amplifier 415, over conductor-pair 416 to the four-wire terminating network 417 in Fig. 4. The operation of LS2 relay 702 also connects battery through its armature 6 and front contact to conductor 722 which will light R2 receiver lamp 507 in the switchboard position at Control Point B. This gives a visual indication to the switchboard operator that the receiver 2 has picked up a carrier signal. LS2 relay 702, in operating, locks operated in a circuit which may be traced from battery through the winding of LS2 relay 702, through back contact and armature 9 of LS1 relay 701, through front contact and armature 1 of LS2 relay 702, through back contact and armature 8 to LS3 relay 703, through back contact and armature 1 of LS4 relay 704, over conductor 719, through back contact and armature 1 of AB relay 914, through a back contact and armature of TSA relay 908 to ground. The operation of LS2 relay 702 also completes a circuit for the operation of E relay 426 in the control terminal equipment shown in Fig. 4. This circuit may be traced from ground through armature 2 and back contact of AB relay 914, shown in Fig. 9, over conductor 918, through front contact and armature 5 of LS2 relay 702, over conductor 729, through front contact and armature 8 of SQ relay 618, over conductor 431, through the winding of E relay 426 to battery. SQ relay 618 is operated, as previously described, when a carrier signal which is as strong or stronger than the predetermined minimum is received from the mobile subscriber's transmitter. SQ relay 618 operates and releases each time the push-to-talk button at the mobile subscriber's set is operated and released.

Referring to Fig. 4, it will be noted that C relay 425 is shown in its operated position and that it is locked operated to ground through the back contact and armature of E relay 426. When the circuits and equipment at Control Point B were first installed and power was first applied to the circuits, line lamp 503 in the switchboard position at Control Point B was lighted over a circuit which may be traced from battery through back contact and armature 1 of C relay 425, through back contact and armature 1 of SL relay 428, over conductor 430, through line lamp 503 to ground, thus lighting line lamp 503. The operator at the switchboard position of Control Point B upon seeing that line lamp 503 was lighted, inserted a plug of an answering cord of one of the cord circuits 512 in line jack 502 to answer this call. Ground on the sleeve of line jack 502 as a result of the insertion of a plug into this jack was extended over conductor 429 through the winding of SL relay 428 to battery. SL relay 428 operated and extended a ground through front contact and armature 2 of SL relay 408 through the winding of D relay 427 to battery. D relay 427 then operated and extended a ground through the front contact and armature 2 of D relay 427 through the winding of C relay 425 to battery. C relay 425 operated and locked operated to ground through the back contact and armature of E relay 426. The operation of SL relay 428 and C relay 425 removed battery from line lamp 503. The operator upon learning that this was a false line lamp condition then removed the plug from line jack 502 which caused SL relay 428 to release, the release of SL relay 428 in turn released D relay 427. C relay 425, however, remained operated to ground through the back contact and armature of E relay 426 so that line lamp 503 remained extinguished.

Referring again to the operation of E relay 426, as above-described, the operation of E relay 426 will remove the locking ground from C relay 425 and allow this relay to release. The release of C relay 425 will cause line lamp 503 at the switchboard position to light over a circuit which may be traced from battery through back contact and armature 1 of C relay 425, through back contact and armature 1 of SL relay 428, over conductor 430 to ground through line lamp 503. The lighting of line lamp 503 at the switchboard position gives a visual indication to the operator that a mobile subscriber in the area served by Control Point B has originated a call over one of the receivers associated with Control Point B.

The operator at the switchboard position of Control Point B, upon seeing that line lamp 503 is lighted, will then insert a plug of an answering cord of one of the cord circuits 512 in line jack 502. Ground on the sleeve of line jack 502 as a result of the insertion of a plug into this jack will be extended over conductor 429 through the winding of SL relay 428 to battery. SL relay 428 operates and removes the battery supply from conductor 430 which causes line lamp 503 to be extinguished. SL relay 428, in operating, also supplies battery through its front contact and armature 3 over conductor 420 to light busy lamp 501 at the switchboard position. SL relay 428, in operating, also connects a ground through its front contact and armature 2 through the winding of D relay 427 to battery. D relay 427, in operating, completes a circuit for the reoperation of C relay 425 over an obvious circuit. The operation of C relay 425 at this time assures that line lamp 503 will remain extinguished during the call. D relay 427, in operating, also connects battery through its front contact and armature 1 over conductor 432 through the winding of BL relay 409 to ground. BL relay 409, in operating, extends battery over conductor 431, through the left-hand conductor of conductor-pair 357, over conductor 356 to radio transmitter 355 at Control Point B. This places transmitter 355 in condition for transmitting to the mobile subscriber who is originating a call and permits the operator to carry on a conversation with the mobile subscriber. The operation of BL relay 409 also connects ground through its front contact and armature 2 to conductor 433 which extends through armature 4 and back contact of BTC relay 712, armature 1 and back contact of BTB relay 713, over conductor 725, through the winding of TB relay 901, shown in Fig. 9, to battery causing TB relay 901 to operate.

The operation of TB relay 901 completes a circuit from ground through front contact and armature 3 of TB relay 901 through the winding of TSB relay 909 to battery and TSB relay 909 operates. The operation of TB relay 901 also completes a circuit for the operation of LO5 relay 1405, shown in Fig. 14, and LO5 relay 1105, shown in Fig. 11. LO5 relay 1405 and LO5 relay 1105 are the code relays which will control distributors 1606 and 1306, respectively, to cause them to transmit the letter W in the permutation code signals to the adjacent east control point and the adjacent west control point, respectively.

The circuit for the operation of LO5 relay 1405 may be traced from ground through back contact and armature 2 of TBA relay 902, through front contact and armature 5 of TB relay 901, over conductor 919, through the normal contacts of armature 1 of S5 relay 1415, through the winding of LO5 relay 1405, through back contact and armature 5 of G relay 1409 to battery. LO5 relay 1405, in operating, completes a circuit for the operation of G relay 1409 which may be traced from ground through front contact and armature 6 of LO5 relay 1405, conductor 1420, through the winding of G relay 1409 to battery. LO5 relay 1405, in operating, locks operated to battery through its own front contact and armature 2, thus preventing its release after the operation of G relay 1409. LO5 relay 1405 also partially closes the operating path for S5 relay 1415 through front contact and armature 1 of LO5 relay 1405. LO5 relay 1405, in operating, also connects ground to code leads 1601, 1602 and 1605 which extend to distributor 1606. The grounds applied to these code leads correspond to the five-unit permutation code for the letter W which will be transmitted by distributor 1606 to the adjacent east control point (Control Point C). The operation of G relay 1409 opens the operating path for all of the other LO relays shown in Fig. 14 to guard against a double connection. The operation of G relay 1409 also connects a ground to conductor 1421 through front contact and armature 9 of G relay 1409, which ground is extended through back contact and armature 1 of STA relay 1410 to start lead 1622 which extends through the winding of ST1 relay 1620 to battery. The energization of ST1 relay 1620, as was described hereinbefore, attracts armature 1619. Armature 1619, upon being operated, is withdrawn from projection 1618 on cam 1617 and permits distributor 1606 to start operating.

After distributor 1606 starts to rotate, its auxiliary contacts 1621 are closed momentarily by cam 1616 which causes a ground to be applied to conductor 1623 which extends through the winding of STB relay 1419 to battery. The operation of STB relay 1419 causes the operation of STA relay 1410 and opens the operating circuit for S5 relay 1415. The operation of STA relay 1410 removes the ground supplied through front contact and armature 9 of G relay 1409 over conductor 1421 to start lead 1622. STA relay 1410, in operating, locks operated through its front contact and armature 2 to the ground supplied over conductor 1421 from G relay 1409. STA relay 1410, in operating, also connects the operating path for S5 relay 1415 to STB relay 1419. When auxiliary contacts 1621 on distributor 1606 open, ground is removed from conductor 1623 which will cause STB relay 1419 to release. The release of STB relay 1419 at this time causes the operation of S5 relay 1415 over a circuit which may be traced from ground through back contact and armature 1 of STB relay 1419, through front contact and armature 3 of STA relay 1410, over conductor 1422 which extends through back contact and armature 1 of LO8 relay 1408, back contact and armature 1 of LO7 relay 1407, back contact and armature 1 of LO6 relay 1406, through front contact and armature 1 of LO5 relay 1405, through the winding of S5 relay 1415 to battery. S5 relay 1415, in operating, locks operated to the ground on conductor 919 applied through back contact and armature 2 of TBA relay 902 and front contact and armature 5 of TB relay 901. The operation of S5 relay 1415 removes the operating ground from LO5 relay 1405 and allows this relay to release. LO5 relay 1405, in releasing, removes the operating ground from conductor 1420 which extends through the winding of G relay 1409 and causes the release of G relay 1409. G relay 1409, in releasing, restores the operating circuit of all the LO relays of Fig. 14 and releases STA relay 1410. The release of STA relay 1410 removes the operating ground supplied through back contact and armature 1 of STB relay 1419 and front contact and armature 3 of STA relay 1410 to conductor 1422. The release of STA relay 1410 also reconnects the start lead 1622 through to conductor 1421 and G relay 1409.

In a similar manner, the circuit for the operation of LO5 relay 1105 which, as stated above, operates after TB relay 901 operates, may be traced from ground through back contact and armature 2 of TBA relay 902, through front contact and armature 5 of TB relay 901, over conductor 920 through the normal contacts of armature 1 of S5 relay 1115, through the winding of LO5 relay 1105, through back contact and armature 5 of G relay 1109 to battery. LO5 relay 1105, in operating, completes a circuit for the operation of G relay 1109 which may be traced from ground through front contact and armature 6 of LO5 relay 1105, over conductor 1120, through the winding of G relay 1109 to battery. LO5 relay 1105, in operating, locks operated to battery through its own front contact and armature 2, thus preventing its release after the operation of G relay 1109. LO5 relay 1105 also partially closes the operating path for S5 relay 1115 through front contact and armature 1 of LO5 relay 1105. LO5 relay 1105, in operating, also connects ground to code leads 1301, 1302 and 1305 which extend to distributor 1306. The grounds applied to these code leads correspond to the five-unit permutation code for the letter W which will be transmitted by distributor 1306 to the adjacent west control point (Control Point A3). The operation of G relay 1109 opens the operating path for all of the other LO relays shown in Fig. 11 to guard against a double connection. The operation of G relay 1109 also connects a ground to conductor 1121 through front contact and armature 9 of G relay 1109, which ground is extended through back contact and armature 1 of STA relay 1110 to start lead 1322 which extends through ST1 relay 1320 to battery. The energization of ST1 relay 1320, as was described hereinbefore, attracts armature 1319. Armature 1319, upon being operated, is withdrawn from projection 1318 on cam 1317 and permits the distributor to start operating.

After distributor 1306 starts to rotate, its auxiliary contacts 1321 are closed by cam 1316 which causes a ground to be applied to conductor 1323 which extends through the windings of STB relay 1119 to battery. The operation of STB relay 1119 causes the operation of STA relay 1110 and opens the operating circuit for S5 relay 1115. The operation of STA relay 1110 removes the ground supplied through front contact and armature 9 of G relay 1109 over conductor 1121 to start lead 1322. STA relay 1110, in operating, locks operated through its front contact and armature 2 to the ground supplied over conductor 1121 from G relay 1109. STA relay 1110, in operating, also connects the operating path for S5 relay 1115 to STB relay 1419. When auxiliary contacts 1321 on distributor 1306 open, ground is removed from conductor 1323 which will cause STB relay 1119 to release. The release of STB relay 1119 at this time causes the operation of S5 relay 1115 over a circuit which may be traced from ground through back contact and armature 1 of STB relay 1119, through front contact and armature 3 of STA relay 1110, over conductor 1122 which extends through back contact and armature 1 of LO8 relay 1108, back contact and armature 1 of LO7 relay 1107, back contact and armature 1 of LO6 relay 1106 through front contact and armature 1 of LO5 relay 1105, through the winding of S5 relay 1115 to battery. S5 relay 1115, in operating, locks operated to the ground on conductor 920 applied through back contact and armature 2 of TBA relay 902 and front contact and armature 5 of TB relay 901. The operation of S5 relay 1115 removes the operating ground from LO5 relay 1105 and allows this relay to release. LO5 relay 1105, in releasing, removes the operating ground from conductor 1120 which extends through the winding of G relay 1109 and causes the release of G relay 1109. G relay 1109, in releasing, restores the operating circuit of all LO relays of Fig. 11 and releases STA relay 1110. The release of STA relay 1110 removes the operating ground supplied through back contact and armature 1 of STB relay 1119 and front contact and armature 3 of STA relay 1110 to conductor 1122. The release of STA relay 1110 also reconnects the start lead 1322 through to conductor 1121 and G relay 1109.

It will be observed that as soon as transmitter 355 at Control Point B is turned on by the operation of BL relay 409, the switching and control circuits of Figs. 7, 8 and 9 will cause the operation of the appropriate code relays in Figs. 11 and 14 to cause the distributor 1306 in Fig. 13 and distributor 1606 in Fig. 16 to transmit the letter W to the adjacent west control point and to the adjacent east control point, respectively. The transmission of the letter W to these two control points will be received by the non-typing selectors at each of the control points which in turn will control the switching and control circuits thereat to cause the appropriate transmitter busy lamp to be lighted in their respective switchboard positions.

The manner in which the non-typing selector and switching control circuits at the adjacent east control point (Control Point C) operate in response to the reception of the letter W in permutation code received from Control Point B to cause the WT transmitter busy lamp in the switchboard position at Control Point C to be lighted, will be clearly understood by placing the circuits shown in Figs. 3 through 16 in the box labeled east control point in Fig. 16. In this manner, the letter W transmitted over line 1607 from distributor 1606 at Control Point B will be received over line 1353 by the non-typing selector 1350 at the adjacent east control point (Control Point C). Non-typing selector 1350 operates in the manner described hereinbefore in response to the reception of the five-unit permutation code signal representing the letter W and will operate its W contacts which will apply a ground to conductor 1358. Conductor 1358 extends through the winding of WT relay 715 to battery. WT relay 715, in operating, closes a circuit for the application of battery through front contact and armature 3 of WT relay 715, over conductor 726 which extends to ground through WT lamp 504 in the switchboard position at Control Point C. In this manner, WT lamp 504 in the switchboard position at Control Point C is lighted to give an indication to the operator thereat that the transmitter at the adjacent west control point (in this case Control Point B) is on the air. WT relay 715, in operating, locks operated over a circuit which may be traced from battery through the winding of WT relay 715, through front contact and armature 4 of WT relay 715, over conductor 1359, through back contact and armature of the F contacts of non-typing selector 1350 to ground. In this manner, WT relay 715 locks operated under control of the F contacts of the non-typing selector 1350 and will remain operated until the permutation code representing the letter F is received by the non-typing selector at Control Point C.

In a similar manner, the non-typing selector and switching circuits at Control Point A, which is the adjacent west control point from Control Point B, will operate in response to the permutation code signal representing the letter W and light the ET transmitter busy lamp in the switchboard position at Control Point A. The manner in which this is accomplished will be clearly understood by placing Figs. 3 through 16 in the box labeled west control point in Fig. 13. In this manner, the permutation code signals representing the letter W transmitted by distributor 1306 over conductor 1307 from Control Point B will be received over line 1653 by the non-typing selector 1650 at the adjacent west control point (Control Point A) and will cause the operation of the W contacts of non-typing selector 1650. The operation of the W contacts of non-typing selector 1650 will cause a ground to be applied to conductor 1658 which extends through the winding of ET relay 718 to battery. The operation of ET relay 718 closes a circuit for lighting the ET transmitter busy lamp 511 in the switchboard position at Control Point A which may be traced from battery through front contact and armature 3 of ET relay 718, over conductor 727 through ET lamp 511 to ground. In this manner, the ET lamp 511 in the switchboard position at Control Point A is lighted to give an indication to the operator thereat that the transmitter at the adjacent east control point (in this case Control Point B) is on the air. ET relay 718, in operating, locks operated over a circuit which may be traced from battery through the winding of ET relay 718, through front contact and armature 2 of ET relay 718, over conductor 1659 through back contact and armature of the F contacts of non-typing selector 1650. In this manner, ET relay 718 will remain operated until the non-typing selector 1650 at Control Point A receives the permutation code signal representing the letter F which will remove the ground from this locking circuit.

Referring again to Control Point B and the circuits thereat, the operator at Control Point B, after answering the call from the mobile subscriber which is being received over receiver 2, determines the particular telephone subscriber to which the mobile subscriber desires to be connected. The operator at Control Point B will then complete the desired connection over a trunk 513, cable 514 to the local telephone switching center 515 and from there to the desired telephone subscriber 516, 517 or 518.

When the call between the mobile subscriber and the called telephone subscriber is completed, the carrier signal from the mobile subscriber's transmitter will no longer be received by receiver 2. Therefore, there will no longer be any output voltages from longitudinal balancing unit 622 on conductors 602 and 612. As a consequence of this, A2 relay 652, TH relay 610 and SQ relay 618 will release. The release of SQ relay 618 will open the operating circuit for E relay 426 at front contact and armature 8 of SQ relay 618 and E relay 426 will release. The release of E relay 426 will again close the holding circuit for C relay 425 which was held operated by D relay 427. When the operator at the switchboard position of Control Point B removes the plug from jack 502, ground will be removed from conductor 429, thus allowing SL relay 428 to release. The release of SL relay 428 will in turn release D relay 427 and the release of D relay 427 will in turn cause the release of BL relay 409 which will shut off transmitter 355. C relay 425 will not release when D relay 427 releases because, as described above, its holding circuit through the back contact and armature of E relay 426 has been reestablished by the release of E relay 426. The release of SL relay 428 also extinguishes busy lamp 501 in the switchboard position at Control Point B. The release of BL relay 409 removes ground from conductor 433 which, as described hereinbefore, is the operating ground for TB relay 901 and is extended through back contact and armature 4 of BTC relay 712, back contact and armature 1 of BTB relay 713, over conductor 725 through the winding of TB relay 901 to battery. Therefore, when ground is removed from this circuit, TB relay 901 releases. The release of TB relay 901 removes the ground from conductor 919 which is holding S5 relay 1415 operated and S5 relay 1415 releases. The release of TB relay 901 also removes the ground from conductor 920 which is holding S5 relay 1115 operated and S5 relay 1115 releases. The release of TB relay 901 removes the operating ground which extends through front contact and armature 3 of TB relay 901 to the winding of slow-releasing TSB relay 909 and TSB relay 909 starts to release. The release of TB relay 901 also connects ground through the normal contacts of armature 3 of TB relay 901, through front contact and armature of slow-releasing TSB relay 909 through the winding of TSA relay 908 to operate TSA relay 908.

The operation of TSA relay 908, before the release of TSB relay 909, removes the holding ground for LS2 relay 702 which extended through back contact and armature of TSA relay 908, through back contact and armature 1 of AB relay 914, over conductor 917, over conductor 719, through back contact and armature 1 of LS4 relay 704, through back contact and armature 8 of LS3 relay 703, through front contact and armature 1 of LS2 relay 702, through back contact and armature 9 of LS1 relay 701, through the winding of LS2 relay 702 to battery. Therefore, LS2 relay 702 releases and disconnects the output circuit of receiver 2 from four-wire terminating network 417 by opening this circuit at the front contacts and armatures 2 and 3 of LS2 relay 702. The release of LS2 relay 702 also removes the battery supplied through front contact and armature 6 of LS2 relay 702 to conductor 722 which will extinguish R2 receiver lamp 507 in the switchboard position at Control Point B. Thus, the switchboard operator at Control Point B receives a visual indication that receiver 2 is no longer receiving a carrier signal from a mobile subscriber.

The release of LS2 relay 702, as above described, will also remove the operating ground applied through armature 2 and back contact of AB relay 914, over conductor 918, through front contact and armature 5 of LS2 relay 702, over conductor 727, through the front contact and armature 9 of SQ relay 618 (now released), over conductor 431 to E relay 426.

The operation of TSA relay 908, as above described, also completes a circuit from ground through front contact and armature of TSA relay 908, through back contact and armature 1 of TBA relay 902, over conductor 921 through normal contacts of armature 1 of S6 relay 1416, through the winding of LO6 relay 1406, through back contact and armature 6 of G relay 1409 to battery. In this manner, LO6 relay 1406 operates. Similarly, ground is supplied through front contact and armature of TSA relay 908, through back contact and armature 1 of TBA relay 902, over conductor 922, through normal contacts of armature 1 of S6 relay 1116, through the winding of LO6 relay 1106, through back contact and armature 6 of G relay 1109 to battery. In this manner, LO6 relay 1106 is operated. LO6 relay 1406 and LO6 relay 1106 are the code relays which will control the distributors 1606 and 1306, respectively, to cause them to transmit the letter F in the permutation code signals to the adjacent east control point and the adjacent west control point, respectively. The letter F is transmitted to the adjacent control points as an indication that the transmitter at Control Point B is no longer transmitting.

LO6 relay 1406, operating in the manner described above, completes a circuit for the operation of G relay 1409 which may be traced from ground through front contact and armature 6 of LO6 relay 1406, over conductor 1420, through the winding of G relay 1409 to battery. LO6 relay 1406, in operating, locks operated to battery through its own front contact and armature 2 thus preventing its release after the operation of G relay 1409. LO6 relay 1406, in operating, also partially closes the operating path for S6 relay 1416 through front contact and armature 1 of LO6 relay 1406. LO6 relay 1406, in operating, connects a ground to code leads 1601, 1603 and 1604 which extend to distributor 1606. The grounds applied to these code leads correspond to the five-unit permutation code for the letter F which will be transmitted by distributor 1606 to the adjacent east control point. The operation of G relay 1409 opens the operating path for all of the other LO relays shown in Fig. 14 to guard against a double connection. The operation of G relay 1409 also connects a ground to conductor 1421 through front contact and armature 9 of G relay 1409, which is extended through back contact and armature 1 of STA relay 1410 to start lead 1622 which extends through the winding of ST1 relay 1620 to battery. The energization of ST1 relay 1620, as described hereinbefore, attracts armature 1619 so that it is withdrawn from projection 1618 on cam 1617 and permits distributor 1606 to start operating.

After distributor 1606 starts to rotate, its auxiliary contacts 1621 are closed momentarily by cam 1616 which causes a ground to be applied to conductor 1623 which extends through the winding of STB relay 1419 to battery. The operation of STB relay 1419 causes the operation of ST relay 1410 and opens the operating circuit for S6 relay 1416. The operation of STA relay 1410 removes the ground supplied through front contact and armature 9 of G relay 1409, over conductor 1421, to start lead 1622. STA relay 1410, in operating, locks operated through its front contact and armature 2 to the ground supplied to conductor 1421 to G relay 1409. STA relay 1410, in operating, also connects the operating path for S6 relay 1416 to STB relay 1419. When auxiliary contacts 1621 on distributor 1606 open, ground is removed from conductor 1623 which will cause STB relay 1419 to release. The release of STB relay 1419 at this time causes the operation of S6 relay 1416 over a circuit which may be traced from ground through back contact and armature 1 of STB relay 1419, through front contact and armature 3 of STA relay 1410, over conductor 1422 which extends through back contact and armature 1 of LO8 relay 1408 and back contact and armature 1 of LO7 relay 1407, through armature 1 and front contact of LO6 relay 1406, through the winding of S6 relay 1416 to battery. S6 relay 1416, in operating, locks operated to the ground on conductor 921 applied through front contact and armature of TSA relay 908, back contact and armature 1 of TBA relay 902. The operation of S6 relay 1416 removes the operating ground from LO6 relay 1406 and allows this relay to release. LO6 relay 1406, in releasing, removes the operating ground from conductor 1420 which extends through the winding of G relay 1409 and causes the release of G relay 1409. G relay 1409, in releasing, restores the operating circuit of all of the LO relays of Fig. 14 and releases STA relay 1410. The release of STA relay 1410 removes the operating ground supplied through back contact and armature 1 of STB relay 1419 and front contact and armature 3 of STA relay 1410 to conductor 1422. The release of STA relay 1410 also reconnects the start lead 1622 through to conductor 1421 and G relay 1429.

In a similar manner, the operation of LO6 relay 1106, as previously described, completes a circuit for the operation of G relay 1109 which may be traced from ground through front contact and armature 6 of LO6 relay 1106, conductor 1420, through the winding of G relay 1409 to battery. LO6 relay 1106, in operating, locks operated to battery through its own front contact and armature 2, thus preventing its release after the operation of G relay 1109. LO6 relay 1106, in operating, also partially closes the operating path for S6 relay 1116 through front contact and armature 1 of LO6 relay 1106. LO6 relay 1106, in operating, also connects ground to code leads 1301, 1303 and 1304 which extend to distributor 1306. The grounds applied to these code leads correspond to the five-unit permutation code for the letter F which will be transmitted by distributor 1306 to the adjacent west control point. The operation of G relay 1109 opens the operating path for all of the other LO relays shown in Fig. 11 to guard against a double connection. The operation of G relay 1109 also connects a ground to conductor 1121 through front contact and armature 9 of G relay 1109, which ground is extended through back contact and armature 1 of STA relay 1110 to start lead 1322 which extends through the winding of ST1 relay 1320 to battery. The energization of ST1 relay 1320, as was described hereinbefore, attracts armature 1319 from projection 1318 on cam 1317 and permits distributor 1306 to start operating.

After distributor 1306 starts to rotate, its auxiliary contacts 1321 are closed momentarily by cam 1316 which causes a ground to be applied to conductor 1323 which extends through the winding of STB relay 1119 to battery. The operation of STB relay 1119 causes the operation of STA relay 1110 and opens the operating circuit for S6 relay 1116. The operation of STA relay 1110 removes the ground supplied through front contact and armature 9 of G relay 1109, over conductor 1121, to start lead 1322. STA relay 1110, in operating, locks operated through its front contact and armature 2 to the ground supplied over conductor 1121 to G relay 1109. STA relay 1110, in operating, also connects the operating path for S6 relay 1116 to STB relay 1119. When auxiliary contacts 1321 of distributor 1306 open, ground is removed from conductor 1623 which will cause STB relay 1119 to release. The release of STB relay 1119 at this time causes the operation of S6 relay 1116 over a circuit which may be traced from ground through back contact and armature 1 of STB relay 1119, through front contact and armature 3 of STA relay 1110, over conductor 1122 which extends through back contact and armature 1 of LO8 relay 1108, back contact and armature 1 of LO7 relay 1107, front contact and armature 1 of LO6 relay 1106, through the winding of S6 relay 1116 to battery. S6 relay 1116, in operating, locks operated to the ground on conductor 922 supplied through front contact and armature of TSA relay 908, back contact and armature 1 of TBA relay 902. The operation of S6 relay 1116 removes the operating ground from LO6 relay 1106 and allows this relay to release. LO6 relay 1106, upon releasing, removes the operating ground from conductor 1120 which extends through the winding of G relay 1109 and causes the release of G relay 1109. G relay 1109, in releasing, restores the operating circuit for all of the LO relays of Fig. 11 and releases STA relay 1110. The release of STA relay 1110 removes the operating ground supplied through back contact and armature 1 of STB relay 1119 and front contact and armature 3 of STA relay 1110 to conductor 1122. The release of STA relay 1110 also reconnects the start lead 1322 through to conductor 1121 and G relay 1109.

After the circuit operations described above have been completed and the letter F has been transmitted in the permutation code signals to the adjacent east control point and to the adjacent west control point, slow-releasing TSB relay 909 releases. TSB relay 909 started releasing when TB relay 901 was released by release of BL relay 409 as above described. The release of TSB relay 909 causes the release of TSA relay 908. The release of TSA relay 908 removes the ground supplied through front contact and armature of TSA relay 908, through back contact and armature 1 of TBA relay 902 to conductor 921, which is holding S6 relay 1416 operated, and S6 relay 1416 releases. The release of TSA relay 908 also removes the ground supplied through front contact and armature of TSA relay 908, through back contact and armature 1 of TBA relay 902 to conductor 922 which is holding S6 relay 1116 operated and S6 relay 1116 releases. All of the circuits at Control Point B have now restored to normal and are ready to perform their functions on a new call.

It will be observed that as soon as transmitter 355 at Control Point B is shut off by the release of BL relay 409, the operation of the switching and control circuits of Figs. 7, 8 and 9 will cause the operation of the appropriate code relays in Figs. 11 and 14 to cause distributor 1306 in Fig. 13 and distributor 1606 in Fig. 16 to transmit the letter F to the adjacent west control point and the adjacent east control point, respectively. The transmission of the letter F to these two control points will be received by the non-typing selectors at each of the control points which in turn will control the switching and control circuits thereat to cause the transmitter busy lamps in their respective switchboard positions to be extinguished.

The manner in which the non-typing selector and switching and control circuits at the adjacent east control point (Control Point C) operate in response to the reception of the letter F in permutation code received from Control Point B to cause the WT transmitter busy lamp in the switchboard position at Control Point C to be extinguished will be clearly understood by placing the circuits shown in Figs. 3 through 16 in the box labeled east control point in Fig. 16. In this manner, the letter F transmitted over line 1607 from distributor 1606 at Control Point B will be received over line 1353 by the non-typing selector 1350 at Control Point C. Non-typing selector 1350 operates in the manner described hereinbefore in response to the reception of the five-unit permutation code signal representing the letter F and will operate its F contacts which will remove the ground applied through back contact and armature of the F contacts to conductor 1359. As previously described, WT relay 715 at Control Point C was locked operated to this ground on conductor 1359. Therefore, when the F contacts of the non-typing selector 1350 operate to remove the ground from conductor 1359, WT relay 715 will release. The release of WT relay 715 will remove battery connected to conductor 726 through the front contact and armature 3 of WT relay 715. Removal of battery from conductor 726 will cause the WT transmitter busy lamp 504 in the switchboard position at Control Point C to be extinguished. This gives a visual indication to the operator at Control Point C that the transmitter at Control Point B is no longer in use.

In a similar manner, the non-typing selector and switching and control circuits at the adjacent west control point (Control Point A) will operate in response to the permutation code signal representing the letter F received from Control B to cause the ET tranmitter busy lamp in the switchboard position at Control Point A to be extinguished. The manner in which this is accomplished will be clearly understood by placing Figs. 3 through 16 in the box labeled west control point in Fig. 13. In this manner, the permutation code signals representing the letter F transmitted by distributor 1306 over conductor 1307 from Control Point B will be received over line 1653 by non-typing selector 1650 at Control Point A and will cause the operation of the F contacts of non-typing selector 1650. The operation of the F contacts of the non-typing selector 1650 will remove the ground applied to conductor 1659 through back contact and armature of F contacts. As previously described, ET relay 718 was locked operated to this ground on conductor 1659 and, therefore, when the F contacts of non-typing selector 1650 are operated and ground is removed from conductor 1659, ET relay 718 will release. The release of ET relay 718 will remove the battery applied to conductor 727 through front contact and armature 3 of ET relay 718. The removal of battery from conductor 727 will cause the ET transmitter busy lamp 511 in the switchboard position at Control Point A to be extinguished. This will give a visual indication to the operator at the switchboard position of Control Point A that the transmitter at Control Point B is no longer on the air.

Therefore, when transmitter 355 at Control Point B is shut off and the letter F in permutation code is received from Control Point B by both Control Point A and Control Point C, the switching and control circuits at Control Point A and Control Point C operate to extinguish the transmitter busy lamp in their respective switchboard positions and all of the circuits at these control points are restored to normal and are ready to perform their functions on a new call.

*Mobile subscriber picked up by terminal receivers of adjacent control points—neither control point busy*

Assume now that the mobile subscriber is located at a point somewhere between Control Point B and the adjacent west control point (Control Point A). This corresponds to the position Y on the highway shown in Fig. 1 between Control Points A and B. When the mobile subscriber located at this point originates a call, his carrier will be picked up by receiver 1 associated with Control Point B and receiver 4 associated with Control Point A. When the mobile subscriber's carrier is picked up by receiver 1 at Control Point B, the associated receiver selector circuit of Fig. 6 functions in the manner described hereinbefore to cause a ground to be applied to conductor 645 which extends through the winding of LS1 relay 701 to battery. The operation of LS1 relay 701, in a manner described hereinbefore, completes a circuit for the connection of the output of receiver 1 to the four-wire terminating network 417 at Control Point B. This connection may be traced from the output of receiver 1 through transformer 331, over conductor-pair 301, through transformer 421, over conductor-pair 401, through front contacts and armatures 2 and 3 of LS1 relay 701, over conductors 649 and 650, through front contacts and armatures 5 and 6 of SQ relay 618, over conductors 639 and 640, through back contacts and armatures 1 and 3 of BTC relay 712, over conductor-pair 720, through amplifier 415, over conductor-pair 416 to the four-wire terminating network 417 in Fig. 4. LS1 relay 701, in operating, locks operated over a circuit which may be traced from battery through the winding of LS1 relay 701, through front contact and armature 5 of LS1 relay 701, through back contact and armature 1 of LS2 relay 702, through back contact and armature 8 of LS3 relay 703, through back contact and armature 1 of LS4 relay 704, over conductor 719, through back contact and armature 1 of AB relay 914, through back contact and armature of TSA relay 908 to ground. The operation of LS1 relay 701 completes a circuit for the operation of LSA relay 708 which may be traced from battery through the winding of LSA relay 708, through front contact and armature 7 of LS1 relay 701, over conductor 918, through back contact and armature 2 of AB relay 914 to ground.

LS1 relay 701, in operating, also completes a circuit for the operation of TMC relay 801. This circuit may be traced from battery through the winding of TMC relay 801, over conductor 728, through front contact and armature 8 of LS1 relay 701, through back contact and armature 7 of LS2 relay 702, over conductor 918, through back contact and armature 2 of AB relay 914 to ground.

TMC relay 801, in operating, removes a shunt from around condenser 824 and applies a ground to the winding of TMD relay 802. The circuit consisting of cold cathode tube 820, resistor 823 and condenser 824 comprises a time delay circuit which is interposed between TMC relay 801 and TMD relay 802 so that the operation of TMD relay 802 may be delayed a desired interval after TMC relay 801 operates. When TMC relay 801 operates, condenser 824 charges through resistor 823. When the voltage across condenser 824 reaches the breakdown voltage of cold cathode tube 820, the control gap of cold cathode tube 820 ionizes and transfers the discharge to the main gap of tube 820 which ionizes and operates relay TMD. The interval of delay is determined by the time constant of condenser 824 and resistor 823. Resistor 825, connected to the control anode of cold cathode tube 820, is a current-limiting resistor and resistance 826 and condenser 827 are connected between the control anode of cold cathode tube 820 and ground to prevent momentary surges from causing a discharge through the tube. The purpose of delaying the operation of TMD relay 802 after the operation of TMC relay 801 will be apparent from the description given below.

Assume now that the signal being received over receiver 1 at Control Point B has a merit rating of three while the signal being received by receiver 4 at the adjacent west control point (Control Point A) has a merit rating of two. Therefore, as described hereinbefore, CM1 relay 1021, CM2 relay 1022 and CM3 relay 1023 in the signal merit decider circuit of Fig. 10 at Control Point B will be operated as a result of the discharges initiated through triodes 1011, 1012 and 1013, respectively. The operation of CM3 relay 1023 completes a circuit which may be traced from ground through front contact and armature 1 of LSA relay 708, over conductor 732, through back contact and armature 2 of CM4 relay 1024, through front contact and armature 2 of CM3 relay 1023, over conductor 1207, through the winding of L3 relay 1203 to battery. L3 relay 1203, in operating, locks operated over a circuit which may be traced from battery through the winding of L3 relay 1203, through back contact and armature 2 of L4 relay 1204, through front contact and armature 2 of L3 relay 1203, through back contact and armature 1 of L2 relay 1202, through back contact and armature 2 of L1 relay 1201, over conductor 1218, through normal contacts of armature 3 of TBA relay 902, through back contact and armature 1 of AB relay 914, through back contact and armature of TSA relay 908 to ground.

L3 relay 1203, in operating, completes a circuit for the operation of LO3 relay 1103 which may be traced from ground through front contact and armature 3 of L3 relay 1203, over conductor 1215, through the normal contacts of armature 1 of S3 relay 1113, through the winding of LO3 relay 1103, through back contact and armature 3 of G relay 1109 to battery.

L3 relay 1203 is a relay in the west comparison circuit at Control Point B which, when operated, indicates that the signal being received at Control Point B has a merit rating of three. This merit rating will be compared with the merit rating of the signal received over receiver 4 at Control Point A in the manner hereinbefore described.

The operation of LO3 relay 1103 of the west code relays shown in Fig. 11 at Control Point B causes the operation of distributor 1306 in the manner described hereinbefore to transmit to the adjacent west control point (Control Point A) the five-unit permutation code representing the letter Q. This signal gives an indication to Control Point A that the signal being received over receiver 1 at Central Point B has a merit rating of three. LO3 relay 1103, in operating, completes a circuit for the operation of G relay 1109 which may be traced from ground through front contact and armature 7 of LO3 relay 1103, over conductor 1120, through the winding of G relay 1109 to battery. LO3 relay 1103, in operating, locks operated to battery through its own front contact and armature 2, thus preventing its release after the operation of G relay 1109. LO3 relay 1103 also partially closes the operating path for S3 relay 1113 through front contact and armature 1 of LO3 relay 1103. LO3 relay 1103, in operating, also connects ground to code leads 1301, 1302, 1303 and 1305 which extend to distributor 1306. The grounds applied to these code leads correspond to the five-unit permutation code for the letter Q which will be transmitted by distributor 1306 to the adjacent west control point (Control Point A). The operation of G relay 1109 opens the operating path for all other LO relays shown in Fig. 11 to guard against a double connection. The operation of G relay 1109 also connects a ground to conductor 1121 through front contact and armature 9 of G relay 1109, which ground is extended through back contact and armature 1 of STA relay 1110 to start lead 1322 which extends through the winding of ST1 relay 1320 to battery. The energization of ST1 relay 1320, as described hereinbefore, attracts armature 1319 from projection 1318 on cam 1317 which permits distributor 1306 to start operating.

As described hereinbefore, distributor 1306 rotates through one revolution and transmits the five-unit permutation code signals for the letter Q to the adjacent west control point (Control Point A). As previously described, when auxiliary contacts 1321 momentarily close, STB relay 1119 operates and in turn operates STA relay 1110. STA relay 1110 locks operated to ground supplied through front contact and armature 9 of G relay 1109. When auxiliary contacts 1321 open, STB relay 1119 releases which operates S3 relay 1113. S3 relay 1113, in operating, locks operated to ground supplied over conductor 1215 from L3 relay 1203. S3 relay 1113, in operating, releases LO3 relay 1103. LO3 relay 1103, in releasing, releases G relay 1109. G relay 1109, in releasing, restores the operating circuit for all of the LO relays of Fig. 11 and releases STA relay 1110. The release of STA relay 1110 reconnects the start lead 1322 through to conductor 1121 and G relay 1109 and the west code relays of Fig. 11 are now ready to be operated to control the sending of a new code to the adjacent west control point (Control Point A).

As assumed above, the signal being received over receiver 4 at the adjacent west control point (Control Point A) has a merit rating of two which, in the manner described hereinbefore, will cause the distributor at Control Point A to transmit the five-unit permutation code representing the letter X over conductor 1353 to the non-typing selector 1350 at Control Point B. The reception of this code representing the letter X by non-typing selector 1350 at Control Point B will cause the X contacts to close which will connect a ground to conductor 1355 which extends through the winding of A2 relay 1212 to battery. A2 relay 1212, in operating, locks operated over a circuit which may be traced from battery through the winding of A2 relay 1212, through back contact and armature 1 of A1 relay 1211, through front contact and armature 2 of A2 relay 1212, through back contact and armature 1 of A3 relay 1213, through back contact and armature 2 of A4 relay 1214, over conductor 1218, through normal contacts of armature 3 of TBA relay 902, through back contact and armature 1 of AB relay 914, through back contact and armature of TSA relay 908 to ground.

The comparison between the merit rating of the signal being received over receiver 1 at Control Point B and the signal being received over receiver 4 at Control Point A may now be made by the west comparison circuit of Fig. 12 at Control Point B to determine which of the two signals has the higher merit rating. As stated above, L3 relay 1215 and A2 relay 1212 in the west comparison circuit of Fig. 12 at Control Point B have been operated. Because the merit rating of the signal being received at Control Point B is higher than the merit rating of the signal being received at Control Point A, it is desirable to have the call from the mobile subscriber handled by Control Point B.

When L3 relay 1203 operated, it completed a circuit for the operation of WC relay 815 which may be traced from ground through front contact and armature 4 of L3 relay 1203, through back contact and armature 4 of A4 relay 1214, over conductor 1217, through the winding of WC relay 815 to battery. The operation of WC relay 815 and the operation of TMD relay 802 after the delay interposed by the delay circuit associated with TMD relay 802, above described, completes a circuit for the operation of LA relay 705. This circuit may be traced from battery through the winding of LA relay 705, through front contact and armature 6 of LS1 relay 701, over conductor 730, through back contact and armature 3 of LF relay 905, over conductor 729, over conductor 818, through front contact and armature 1 of WC relay 815, through front contact and armature 2 of TMD relay 802, over conductor 819, through back contact and armature 7 of LS4 relay 704, over conductor 918, through back contact and armature 2 of AB relay 914 to ground. LA relay 705, in operating, completes a circuit for lighting the R1 receiver lamp 506 in the switchboard position at Control Point B. This circuit may be traced from battery through front contact and armature of LA relay 705, over conductor 721, through R1 lamp 506 to ground. The lighting of R1 receiver lamp 506 in the switchboard at Control Point B gives a visual indication to the operator thereat that a call is being received over receiver 1.

The operation of WC relay 815 and TMD relay 802 also completes a circuit for the operation of E relay 426. This circuit may be traced from battery through the winding of E relay 426, over conductor 431, through front contact and armature 8 of SQ relay 618 (this relay is operated in the manner described hereinbefore when a signal of usable strength is being received at Control Point B), over conductor 729, over conductor 818, through front contact and armature 1 of WC relay 815, through front contact and armature 2 of TMD relay 802, over conductor 819, through back contact and armature 7 of LS4 relay 704, over conductor 918, through back contact and armature 2 of AB relay 914 to ground.

The operation of E relay 426 will, as described hereinbefore, remove the locking ground from C relay 425 and allow this relay to release. The release of C relay 425 will cause line lamp 503 in the switchboard position at Control Point B to light over a circuit which may be traced from battery through back contact and armature 1 of C relay 425, through back contact and armature 1 of SL relay 428, over conductor 430 to ground through line lamp 503. The lighting of line lamp 503 in the switchboard position at Control Point B gives a visual indication to the operator that a mobile subscriber in the area served by Control Point B is originating a call over one of the receivers associated with Control Point B. The lighting of line lamp 503 at Control Point B was delayed by the time delay circuit associated with TMD relay 802, as above described, to allow time for the transmission of the signal merit rating from the adjacent west control point (Control Point A) to Control Point B and for the comparison of this merit rating with the merit rating of the signal being received over receiver 1 at Control Point B.

The operation of WC relay 815 as above described also completes a circuit for the operation of LBW relay 714 which may be traced from ground through front contact and armature 2 of WC relay 815, over conductor 734, through front contact and armature 3 of LSA relay 708, through the winding of LBW relay 714 to battery. LBW relay 714, in operating, completes a circuit for the operation of LO7 relay 1107 which may be traced from ground through front contact and armature 2 of LBW relay 714, over conductor 735, through normal contacts of armature 1 of S7 relay 1117, through the winding of LO7 relay 1107, through back contact and armature 7 of G relay 1109 to battery. LO7 relay 1107 is the one of the west code relays which will control distributor 1306 to cause distributor 1306 to transmit the letter C in the five-unit permutation code over conductor 1307 to the adjacent west control point (Control Point A) in the manner hereinbefore described. LO7 relay 1107, in operating, completes a circuit for the operation of G relay 1109 and locks operated to battery through its own front contact and armature 2, thus preventing its release after the operation of G relay 1109. LO7 relay 1107, in operating, partially closes the operating path for S7 relay 1117 and connects ground to code leads 1302, 1303 and 1304 which extend to distributor 1306. The grounds applied to these code leads correspond to the five-unit permutation code for the letter C which will be transmitted by distributor 1306 to the adjacent west control point (Control Point A). The operation of G relay 1109 opens the operating path for all other LO relays shown in Fig. 11 to guard against a double connection and connects ground to conductor 1121 which is extended through back contact and armature 1 of STA relay 1110 to start lead 1322. The ground on start lead 1322 is extended through ST1 relay 1320 to battery. ST1 relay 1320 operates and attracts armature 1319 which is thereupon withdrawn from projection 1318 on cam 1317 which permits distributor 1306 to start operating.

As described hereinbefore, distributor 1306 rotates through one revolution and transmits the five-unit permutation code signals for the letter C to the adjacent west control point (Control Point A). As previously described, when auxiliary contracts 1321 momentarily close, STB relay 1119 operates and in turn operates STA relay 1110. STA relay 1110 locks operated to ground supplied through front contact and armature 9 of G relay 1109. When auxiliary contacts 1321 open, STB relay 1119 releases which operates S7 relay 1117. S7 relay 1117, in operating, locks operated to ground supplied over conductor 735 from LBW relay 714. S7 relay 1117, in operating, releases LO7 relay 1107 which in turn releases G relay 1109. G relay 1109, in releasing, restores the operating circuits for all of the LO relays of Fig. 11 and releases STA relay 1110. The release of STA relay 1110 reconnects the start lead 1322 through to conductor 1121 and G relay 1109 and the west code relays of Fig. 11 are now ready to be operated to control the sending of a new code to the adjacent west control point (Control Point A).

The five-unit permutation code representing the letter C is received by the east non-typing selector at the adjacent west control point (Control Point A) which in turn, in the manner described hereinafter, causes the ER lamp in the switchboard position at Control Point A to be lighted. This gives a visual indication to the operator at Control Point A that receiver 1 at Control Point B is busy.

The operator at the switchboard of Control Point B, upon seeing that line lamp 503 is lighted in response to a call originated over receiver 1 as above described, will insert the plug of an answering cord of one of the cord circuits 512 in line jack 502. This will result, as described hereinbefore, in the operation of SL relay 428 which, when operated, removes the battery from conductor 430 and causes the line lamp 503 to be extinguished. SL relay 428, in operating, also supplies battery to light busy lamp 501 in the switchboard position at Control Point B in the manner hereinbefore described. SL relay 428, in operating, also connects a ground through its front contact and armature 2 to operate D relay 427, and D relay 427, in operating, completes a circuit for the reoperation of C relay 425. D relay 427, in operating, connects battery through its front contact and armature 1 over conductor 432 through the winding of BL relay 409 to ground. BL relay 409, in operating, extends battery over conductor 431 to the left-hand conductor of conductor-pair 357 over conductor 356 to radio transmitter 355 at Control Point B. This places transmitter 355 in condition for transmitting to the mobile subscriber who is originating a call over receiver 1 at Control Point B and permits the operator at Control Point B to converse with the mobile subscriber. The operation of BL relay 409 also connects a ground through its front contact and armature 2 to conductor 433 which extends through armature 4 and back contact of BTC relay 712, through armature 1 and back contact of BTB relay 713, over conductor 725, through the winding of TB relay 901 to battery, causing TB relay 901 to operate. The operation of TB relay 901, as hereinbefore described, completes a circuit for the operation of TSB relay 909 and for the operation of LO5 relay 1405 shown in Fig. 14 and LO5 relay 1105 shown in Fig. 11. As hereinbefore described, LO5 relay 1405 and LO5 relay 1105 are the code relays which control distributors 1606 and 1306, respectively, to cause them to transmit the letter W in the permutation code signals to the adjacent east control point and the adjacent west control point, respectively. The transmission of the letter W to the adjacent control points will, in the manner hereinbefore described, cause the WT transmitter busy lamp at the adjacent east control point (Control Point C) and the ET transmitter busy lamp at the adjacent west control point (Control Point A) to be lighted to give an indication to the operators thereat that the transmitter at Control Point B is on the air. In the manner hereinbefore described, S5 relay 1115 and S5 relay 1415 will be locked operated to ground supplied over conductors 920 and 919, respectively, after the respective distributors 1306 and 1606 have completed transmitting the five-unit permutation code signals representing the letter W to the adjacent control points and all of the LO code relays of Fig. 11 and Fig. 14 are released and returned to normal.

The operator at Control Point B, after determining the identity of the called telephone subscriber from the mobile subscriber, will complete the connection as hereinbefore described over trunk 513 via cable 514 to the local telephone switching center 515 and from there to the called telephone subscriber.

When the call between the mobile subscriber and the called telephone subscriber is completed, the carrier signal from the mobile subscriber's transmitter will no longer be received by receiver 1 at Control Point B and there will be no voltage on conductor 630 across the parallel combination of resistors 1001 through 1004. As a consequence of this, the discharge through triodes 1011, 1012 and 1013 will be extinguished and CM1 relay 1021, CM2 raley 1022 and CM3 relay 1023 will release. Also there will no longer be any output voltages from the longitudinal balancing unit 621 on conductors 601 and 611 and, as a consequence of this, A1 relay 651, TH relay 610 and SQ relay 618 in the receiver selector circuit of Fig. 6 will release. The release of SQ relay 618 will open the operating circuit for E relay 426 in the manner hereinbefore described and E relay 426 will release. The release of E relay 426 will again close the holding circuit for C relay 425 which was held operated by D relay 427. When the operator at the switchboard of Control Point B removes the plug from jack 502, SL relay 428 releases in turn releasing D relay 427 and extinguishing busy lamp 501. The circuits function in the manner similar to that described hereinbefore and the release of D relay 427 causes BL relay 409 to release which in turn releases TB relay 901.

The release of TB relay 901 removes the ground from conductors 919 and 920 which are holding S5 relay 1415 and S5 relay 1115 operated, thus allowing these relays to release. The release of TB relay 901 also removes the operating ground which extended through front contact and armature 3 of TB relay 901, through the winding of slow-releasing TSB relay 909 and TSB relay 909 starts to release. The release of TB relay 901 also connects ground through the normal contacts of armature 3 of TB relay 901, through front contact and armature of slow-releasing TSB relay 909, through the winding of TSA relay 908 to battery, thus operating TSA relay 908. TSA relay 908, in operating, removes the ground which extended through back contact and armature 1 of AB relay 914, through normal contacts of armature 3 of TBA relay 902, over conductor 1218 to the comparison circuit relays of Fig. 12. This ground was the locking ground for the operated relays of Fig. 12 and its removal will cause these relays to release and restore to normal. Under the above-assumed conditions, L3 relay 1203 and A2 relay 1212 were operated and, therefore, these relays release. The release of L3 relay 1215 in the comparison circuit of Fig. 12 will remove the locking ground from conductor 1215 which is holding S3 relay 1113 operated and S3 relay 1113 releases and restores to normal.

The operation of TSA relay 908, as above-described, also removes the ground which was extended through back contact and armature 1 of AB relay 914, over conductor 719, through back contact and armature 1 of LS4 relay 704, through back contact and armature 3 of LS3 relay 703, through back contact and armature 1 of LS2 relay 702, through front contact and armature 5 of LS1 relay 701 to the winding of LS1 relay 701, thus releasing LS1 relay 701. LS1 relay 701, in releasing, releases TMC relay 801, LSA relay 708 and LA relay 705. TMC relay 801, in releasing, will release TMD relay 802. LA relay 705, in releasing, will remove the battery supplied to R1 receiver lamp 506 in the switchboard at Control Point B and R1 receiver lamp 506 in the switchboard at Control Point B and R1 receiver lamp 506 will be extinguished. This will give a visual indication to the operator at the switchboard of Control Point B that receiver 1 is no longer receiving a signal. The release of LSA relay 708 opens the operating circuit for LBW relay 714. LBW relay 714 is a slow-releasing relay and starts releasing when LSA relay 708 releases.

The operation of TSA relay 908, as above-described, also completes a circuit from ground through front contact and armature of TSA relay 908, through back contact and armature 1 of TBA relay 902, over conductor 921, through normal contacts of armature 1 of S6 relay 1416, through the winding of LO6 relay 1406, through back contact and armature 6 of G relay 1409 to battery. In this manner, LO6 relay 1406 operates. Similarly, ground is supplied through front contact and armature of TSA relay 908 through back contact and armature 1 of TBA relay 902, over conductor 922, through normal contacts of armature 1 of S6 relay 1116, through the winding of LO6 relay 1106, through back contact and armature 6 of G relay 1109 to battery. In this manner, LO6 relay 1106 is operated. LO6 relay 1406 and LO6 relay 1106 are the code relays which, as hereinbefore described, will control distributors 1606 and 1306, respectively, to cause them to transmit the letter F in the five-unit permutation code signals to the adjacent east control point and the adjacent west control point, respectively. The reception of the letter F by the non-typing selectors at the adjacent east control point and adjacent west control point will, in the manner described hereinbefore, cause the WT transmitter busy lamp at the adjacent east control point (Control Point C) and the ET transmitter busy lamp at the adjacent west control point (Control Point A) to be extinguished, thus indicating to the operators thereat that the transmitter at Control Point B is again off the air. In the manner hereinbefore described, S6 relay 1116 and S6 relay 1416 will be locked operated to ground supplied over conductors 922 and 921, respectively, after the respective distributors 1306 and 1606 have completed transmitting the five-unit permutation code signal representing the letter F to the adjacent control points and all of the LO code relays of Fig. 11 and Fig. 14 are released and restored to normal.

Returning again to the release of L3 relay 1203 in the comparison circuit of Fig. 12, the release of this relay will remove the operating ground from conductor 1217 which extended through the winding of WC relay 815. WC relay 815 is a slow-releasing relay and starts to release when L3 relay 1203 releases. Before WC relay 815 becomes fully released, however, a circuit is completed from ground through front contact and armature 2 of WC relay 815, over conductor 734, through back contact and armature 3 of LSA relay 708 (this relay released when LS1 relay 701 released), through front contact and armature 1 of LBW relay 714 (this relay is a slow-releasing relay and has not fully released after the release of LSA relay 708), over conductor 736, through normal contacts of armature 1 of S8 relay 1118, through the winding of LO8 relay 1108, through back contact and armature 8 of G relay 1109 to battery, thus operating LO8 relay 1108. LO8 relay 1108 is the one of the west code relays which will control distributor 1306 to cause distributor 1306 to transmit the letter D in the five-unit permutation code over conductor 1307 to the adjacent west control point (Control Point A) in the manner hereinbefore described. LO8 relay 1108, in operating, completes a circuit for the operation of G relay 1109 and locks operated to battery through its own front contact and armature 2, thus preventing its release after the operation of G relay 1109. LO8 relay 1108, in operating, partially closes the operating path of S8 relay 1118 and connects ground to code leads 1301 and 1305 which extend to distributor 1306. The ground supplied to these code leads corresponds to the five-unit permutation code for the letter D which will be transmitted by distributor 1306 to the adjacent west control point (Control Point A). The operation of G relay 1109 opens the operating path for all of the other LO relays shown in Fig. 11 to guard against a double connection and connects ground to conductor 1121 which is extended through back contact and armature 1 of STA relay 1110 to start lead 1322. The ground on start lead 1322 is extended through ST1 relay 1320 to battery. ST1 relay 1320 operates and attracts armature 1319 which is thereupon withdrawn from projection 1318 on cam 1317 and permits distributor 1306 to start operating.

As described hereinbefore, distributor 1306 rotates through one revolution and transmits the five-unit permutation code signals for the letter D to the adjacent west control point (Control Point A). As previously described, when auxiliary contacts 1321 momentarily close, STB relay 1119 operates and in turn operates STA relay 1110. STA relay 1110 locks operated to ground supplied through front contact and armature 9 of G relay 1109. When auxiliary contacts 1321 open, STB relay 1119 releases which operates S8 relay 1118. S8 relay 1118, in operating, locks operated to ground supplied over conductor 736 through front contact and armature 1 of slow-releasing LBW relay 714, through back contact and armature 3 of LSA relay 708, over conductor 734, through front contact and armature 2 of slow-releasing WC relay 815. S8 relay 1118, in operating, releases LO8 relay 1108 which in turn releases G relay 1109. G relay 1109, in releasing, restores the operating circuit for all of the LO relays in Fig. 11 and releases STA relay 1110. The release of STA relay 1110 reconnects the start lead 1322 through to conductor 1121 and G relay 1109 and the west code relays of Fig. 11 are now ready to be operated to control the sending of a new code to the adjacent west control point (Control Point A).

The five-unit permutation code representing the letter D is received by the east non-typing selector at the adjacent west control point (Control Point A) which in turn, in the manner described hereinafter, causes the ER lamp in the switchboard postion at Control Point A to be extinguished. This gives a visual indication to the operator at Control Point A that receiver 1 at Control Point B is no longer receiving a signal.

After the circuit operations described above have been completed and the letter F has been transmitted in the permutation code signals to the adjacent east control point and to the adjacent west control point as an indication that the transmitter at Control Point B is no longer on the air and the letter D has been transmitted to the adjacent west control point as an indication that a signal is no longer being received over receiver 1 at Control Point B, slow-releasing TSB relay 909, slow-releasing WC relay 815 and slow-releasing LBW relay 714 release. The release of TSB relay 909 causes the release of TSA relay 908 and the release of TSA relay 908 removes the ground supplied through front contact and armature of TSA relay 908, through front contact and armature 1 of TBA relay 902 to conductor 921 which is holding S6 relay 1416 operated and S6 relay 1416 releases. The release of TSA relay 908 also removes the ground supplied through front contact and armature of TSA relay 908, through front contact and armature 1 of TBA relay 902 to conductor 922 which is holding S6 relay 1116 operated and S6 relay 1116 releases. The release of WC relay 815 and the release of LBW relay 714 removes the ground supplied over the circuit traced hereinbefore which is holding S8 relay 1118 operated and S8 relay 1118 releases. All of the circuits at Control Point B have now restored to normal and are ready to perform their functions on a new call.

It will be observed, therefore, that as soon as transmitter 355 at Control Point B is shut off by the release of BL relay 409 the operation of the switching and control circuits of Figs. 7, 8 and 9 will cause the appropriate code relays in Figs. 11 and 14 to cause distributor 1306 in Fig. 13 and distributor 1606 in Fig. 16 to transmit the letter F to the adjacent west control point and the adjacent east control point, respectively. The transmission of the letter F to these two control points will be received by the non-typing selectors at each of the control points which in turn will control the switching and control circuits thereat to cause the transmitter busy lamps in their respective switchboard positions to be extinguished. Furthermore, it will be observed that as soon as receiver 1 at Control Point B ceases receiving a signal, the switching and control circuits of Figs. 7, 8 and 9 will cause the operation of the appropriate code relay in Fig. 11 to cause distributor 1306 to transmit the letter D to the adjacent west control point. The transmission of the letter D to this control point will be received by the non-typing selector thereat which in turn will control the switching and control circuits at the adjacent west control point and cause the ER receiver lamp in the switchboard position at the adjacent west control point to be extinguished.

The operation of the circuits at the adjacent west control point (Control Point A), under the previously assumed conditions where a mobile subscriber located somewhere between Control Point A and Control Point B originates a call, will now be described. The manner in which the circuits at Control Point A operate will be clearly understood by placing the circuits shown in Figs. 3 through 16 in the box labeled west control point in Fig. 13. In this manner, distributor 1306 at Control Point B will transmit permutation code signals over conductor 1307 to non-typing selector 1650 at Control Point A and these signals will be received over conductor 1653 at Control Point A. When the mobile subscriber who is located somewhere between Control Point A and Control Point B originates a call, his carrier, in addition to being picked up by receiver 1 at Control Point B, will be picked up by receiver 4 associated with Control Point A.

When the mobile subscriber's carrier is picked up by receiver 4 at Control Point A, the associated receiver selector circuit of Fig. 6 at Control Point A functions in the manner described hereinbefore to cause a ground to be applied to conductor 643 which extends through the winding of LS4 relay 704 to battery. The operation of LS4 relay 704, in the manner described hereinbefore, completes a circuit for the connection of the output of receiver 4 to the four-wire terminating network 417 at Control Point A. This connection may be traced from the output of receiver 4 through transformer 334, over conductor-pair 304, through transformer 424, over conductor-pair 404, through front contacts and armatures 2 and 3 of LS4 relay 704, over conductors 649 and 650, through front contacts and armatures 5 and 6 of SQ relay 618, over conductors 639 and 640, through back contacts and armatures 1 and 3 of BTC relay 712, over conductor-pair 720, through amplifier 415, over conductor-pair 416 to the four-wire terminating network 417 in Fig. 4. LS4 relay 704, in operating, locks operated over a circuit which may be traced from battery through the winding of LS4 relay 704, through front contact and armature 5 of LS4 relay 704, through back contact and armature 1 of LS3 relay 703, through back contact and armature 8 of LS2 relay 702, through back contact and armature 1 of LS1 relay 701, over conductor 719, through back contact and armature 1 of AB relay 914, through back contact and armature of TSA relay 908 to ground. The operation of LS4 relay 704 completes a circuit for the operation of LSB relay 706 which may be traced from battery through the winding of LSB relay 706, through front contact and armature 7 of LS4 relay 704, over conductor 918, through back contact and armature 2 of AB relay 914 to ground.

LS4 relay 704, in operating, also completes a circuit for the operation of TMC relay 801. This circuit may be traced from battery through the winding of TMC relay 801, over conductor 728, through front contact and armature 8 of LS4 relay 704, through back contact and armature 7 of LS2 relay 702, over conductor 918, through back contact and armature 2 of AB relay 914 to ground. TMC relay 801, in operating as described hereinbefore, removes the shunt from around condenser 824 and applies ground to the winding of TMD relay 802. TMD relay 802 will operate after a delay interval governed by the time delay circuit interposed between TMC relay 801 and TMD relay 802 which has been described previously.

As assumed above, receiver 1 at Control Point B is receiving a signal which has a merit rating of three while the signal being received over receiver 4 at Control Point A has a merit rating of two. Therefore, CM1 relay 1021 and CM2 relay 1022 in the signal merit decider circuit of Fig. 10 at Control Point A will be operated as a result of the discharges initiated through triodes 1011 and 1012, respectively. The operation of CM2 relay 1022 completes a circuit which may be traced from ground through front contact and armature 4 of LSB relay 706, over conductor 733, through back contact and armature 1 of CM4 relay 1024, through back contact and armature 1 of CM3 relay 1023, through front contact and armature 1 of CM2 relay 1022, over conductor 1506, through the winding of L2 relay 1502 to battery. L2 relay 1502, in operating, locks operated over a circuit which may be traced from battery through the winding of L2 relay 1502, through back contact and armature 1 of L1 relay 1501, through front contact and armature 2 of L2 relay 1502, through back contact and armature 1 of L3 relay 1503, through back contact and armature 1 of L4 relay 1504, over conductor 1518, through normal contacts of armature 3 of TBA relay 902, through back contact and armature 1 of AB relay 914, through back contact and armature of TSA relay 908 to ground. L2 relay 1502, in operating, completes a circuit for the operation of LO2 relay 1402 which may be traced from ground through front contact and armature 3 of L2 relay 1502, over conductor 1510, through the normal contacts of armature 1 of S2 relay 1412, through the winding of LO2 relay 1402, through back contact and armature 2 of G relay 1409 to battery.

L2 relay 1501 is a relay in the east comparison circuit at Control Point A which, when operated, indicates that the signal being received at Control Point A has a merit rating of two. This merit rating will be compared with the merit rating of the signal being received over receiver 1 at Control Point B.

The operation of LO2 relay 1402 of the east code relays shown in Fig. 14 at Control Point A causes the operation of distributor 1606 in the manner described hereinbefore to transmit to the adjacent east control point (Control Point B) the five-unit permutation code representing the letter X. This signal gives an indication to Control Point B that the signal being received over receiver 4 at Control Point A has a merit rating of two. LO2 relay 1402, in operating, completes a circuit for the operation of G relay 1409 which may be traced from ground through front contact and armature 7 of LO2 relay 1402, over conductor 1420, through the winding of G relay 1409 to battery. LO2 relay 1402, in operating, locks operated to battery through its own front contact and armature 2, thus preventing its release after the operating of G relay 1409. LO2 relay 1402 also partially closes the operating path for S2 relay 1412 through front contact and armature 1 of LO2 relay 1402. LO2 relay 1402, in operating, also connects ground to code leads 1601, 1603, 1604 and 1605 which extend to distributor 1606. The grounds applied to these code leads correspond to the five-unit permutation code for the letter X which will be transmitted by distributor 1606 to the adjacent east control point (Control Point B). The operation of G relay 1409 opens the operating path for all other LO relays shown in Fig. 14 to guard against a double connection. The operation of G relay 1409 also connects a ground to conductor 1421 through front contact and armature 9 of G relay 1409, which ground is extended through back contact and armature 1 of STA relay 1410 to start lead 1622 which extends through the winding of ST1 relay 1620 to battery. The energization of ST1 relay 1620, as described hereinbefore, attracts armature 1619 from projection 1618 on cam 1617 and permits distributor 1606 to start operating.

As described hereinbefore, distributor 1606 rotates through one revolution and transmits the five-unit permutation code signal for the letter X to the adjacent east control point (Control Point B). As previously described, when auxiliary contacts 1621 momentarily close, STB relay 1419 operates and in turn operates STA relay 1410. STA relay 1410 locks operated to ground supplied through front contact and armature 9 of G relay 1409. When auxiliary contacts 1621 open, STB relay 1419 releases which operates S2 relay 1412. S2 relay 1412, in operating, locks operated to ground supplied over conductor 1510 from L2 relay 1502. S2 relay 1412, in operating, releases LO2 relay 1402 which in turn releases G relay 1409. G relay 1409, in releasing, restores the operating circuit for all of the LO relays in Fig. 14 and releases STA relay 1410. The release of STA relay 1410 reconnects start lead 1422 through to conductor 1421 and G relay 1409 and the east code relays of Fig. 14 are now ready to be operated to control the sending of a new code to the adjacent east control point (Control Point B).

As assumed above, the signal being received over receiver 1 at the adjacent east control point (Control Point B) has a merit rating of three which, in the manner described hereinbefore, will cause the distributor at Control Point B to transmit the five-unit permutation code representaing the letter Q over conductor 1653 to non-typing selector 1650 at Control Point A. The reception of this code representing the letter Q by non-typing selector 1650 at Control Point A will cause the Q contacts to close which will connect a ground to conductor 1656 which extends through the winding of A3 relay 1513 to battery. A3 relay 1513, in operating, locks operated over a circuit which may be traced from battery through the winding of A3 relay 1513, through back contact and armature 1 of A4 relay 1514, through front contact and armature 2 of A3 relay 1513, through back contact and armature 1 of A2 relay 1512, through back contact and armature 2 of A1 relay 1511, over conductor 1518, through normal contacts of armature 3 of TBA relay 902 through back contact and armature 1 of AB relay 914, through back contact and armature of TSA relay 908 to ground.

The comparison between the merit rating of the signal being received over receiver 1 at Control Point B and the signal being received over receiver 4 at Control Point A may now be made by the east comparison circuit of Fig. 15 at Control Point A to determine which of the two signals has a higher merit rating. As stated above, L2 relay 1502 and A3 relay 1513 in the east comparison circuit of Fig. 15 at Control Point A have been operated. Because the merit rating of the signal being received at Control Point B is higher than the merit rating of the signal being received at Control Point A, it is desirable to have the call from the mobile subscriber handled by Control Point B. It is, therefore, desirable that the line lamp at Control Point A not be lighted.

If, on the other hand, the signal at Control Point A had been a higher merit rating, it would have been necessary to light the line lamp at Control Point A and not at Control Point B. Assume for the purposes of illustration, that the merit rating of the signal received over receiver 4 at Control Point A is higher than the merit rating of the signal being received at Control Point B and, therefore, it is desirable to light the line lamp at Control Point A. Under this assumption, a circuit will be completed through the operated one of the L relays (assume L3 relay) which may be traced from ground through front contact and armature 4 of L3 relay 1503, through back contact and armature 3 of A3 relay 1513, through back contact and armature 4 of A4 relay 1514, over conductor 1517, through the winding of EC relay 816 to battery. The operation of EC relay 816 and the operation of TMD relay 802 after the delay interposed by the delay circuit associated with TMD relay 802, as described hereinbefore, completes a circuit for the operation of LB relay 709. This circuit may be traced from battery through the winding of LB relay 709, through front contact and armature 6 of LS4 relay 704, over conductor 730, through back contact and armature 3 of LF relay 905, over conductor 729, over conductor 818, through front contact and armature 2 of EC relay 816, through front contact and armature 1 of TMD relay 802, over conductor 846, through back contact and armature 7 of LS1 relay 701, over conductor 918, through back contact and armature 2 of AB relay 914 to ground. LB relay 709, in operating, completes a circuit for lighting the R4 receiver lamp 509 in the switchboard position at Control Point A. This circuit may be traced from battery through front contact and armature 1 of LB relay 709, over conductor 724, through R4 lamp 509 to ground. The operation of EC relay 816 and TMD relay 802 also completes a circuit for the operation of E relay 426. This circuit may be traced from battery through the winding of E relay 426, over conductor 431, through front contact and armature 8 of SQ relay 618 (this relay is operated in the manner described hereinbefore when a signal of usable strength is being received at Control Point A), over conductor 729, over conductor 818, through front contact and armature 2 of EC relay 816, through front contact and armature 1 of TMD relay 802, over conductor 844, through back contact and armature 7 of LS1 relay 701, over conductor 918, through back contact and armature 2 of AB relay 914 to ground. The operation of E relay 426 will, as described hereinbefore, remove the locking ground from C relay 425 and allow this relay to release, and the relays of Fig. 4 will thereupon operate in the manner hereinbefore described to cause line lamp 503 at Control Point A to be lighted.

Under the original assumption above, however, the signal being received at Control Point A is weaker than the signal being received at Control Point B. Therefore, it is desirable to prevent line lamp 503 at Control Point A from being lighted. Under this assumption, A3 relay 1513 and L2 relay 1502 in the east comparison circuit of Fig. 15 at Control Point A are operated. With these relays operated, ground cannot be applied to conductor 1517 by the operated L2 relay 1502 because the circuit is open at armature 3 and back contact of A3 relay 1513 and the circuit for the operation of the line lamp at Control Point A will not function.

As hereinbefore described, the R1 receiver lamp 506 at Control Point B will be lighted and a five-unit permutation code representing the letter C will be transmitted by distributor 1306 at Control Point B to non-typing selector 1650 at Control Point A over conductors 1307 and 1653. The reception of the five-unit permutation code representing the letter C by the non-typing selector 1650 at Control Point A will, in the manner hereinbefore described, cause the operation of the C contacts of non-typing selector 1650. The operation of the C contacts of non-typing selector 1650 will connect a ground to conductor 1660 which extends through the winding of ER relay 717 at Control Point A to battery. ER relay 717, in operating, locks operated over a circuit which may be traced from battery through the winding of ER relay 717, through front contact and armature 3 of ER relay 717, over conductor 1661 to ground through the back contact and armature of the D contacts of non-typing selector 1650. Therefore, the ER relay 717 at Control Point A locks operated under control of the D contacts of non-typing selector 1650. The operation of ER relay 717 completes a circuit which may be traced from ground through front contact and armature 1 of ER relay 717, over conductor 739, through back contact and armature 2 of RF relay 904, over conductor 844, through the winding of LD relay 817 to battery, thus operating LD relay 817. The operation of LD relay 817 completes a circuit for lighting the ER receiver lamp in the switchboard at Control Point A. This circuit may be traced from battery through front contact and armature of LD relay 817, over conductor 841, through the ER receiver lamp 510 to ground. The lighting of ER receiver lamp 510 in the switchboard at Control Point A gives a visual indication to the operator thereat that receiver 1 at Control Point B is receiving a signal.

When the operator at the switchboard of Control Point B inserts a plug into line jack 502 thereat to answer the call when line lamp 503 at the switchboard of Control Point B is lighted, the transmitter at Control Point B is turned on and the circuits at Control Point B operate in the manner described hereinbefore to cause distributor 1306 at Control Point B to transmit the five-unit permutation code representing the letter W to Control Point A. When the non-typing selector 1650 at Control Point A receives this five-unit permutation code representing the letter W, the W contacts are closed and a ground is connected to conductor 1658 which extends through the winding of ET relay 718 to battery. In the manner described hereinbefore, ET relay 718 operates and locks operated through its front contact and armature 2 over conductor 1659 which extends to ground through the back contact and armature of the F contacts of non-typing selector 1650. In this manner, ET relay 718 is locked operated under the control of the F contacts of non-typing selector 1650. The operation of ET relay 718 closes a circuit for lighting the ET transmitter busy lamp 511 in the switchboard position at Control Point A. This circuit may be traced from battery through front contact and armature 3 of ET relay 718, over conductor 727, through ET lamp 511 to ground. In this manner, the ET lamp 511 in the switchboard position at Control Point A is lighted to give a visual indication to the operator at Control Point A that the transmitter at the adjacent east control point (Control Point B) is on the air.

Because the transmitter at Control Point B and the terminal receiver at Control Point B, that is, receiver 1, are both in use, the operator at Control Point A may not receive a call from a mobile subscriber within the area served by Control Point A without the possibility of causing interference. Therefore, the operator must be notified that such a condition exists. This is accomplished as follows: The operation of ER relay 717 and the operation of ET relay 718 at Control Point A complete a circuit which may be traced from ground through front contact and armature 1 of ET relay 718, through front contact and armature 2 of ER relay 717, over conductor 740, over conductor 924, through the winding of AB relay 914 to battery.

AB relay 914, in operating, opens the operating circuit for E relay 426 which has been traced hereinbefore and thus prevents the line lamp 503 at Control Point A from lighting except for emergency calls which will be described later. The operation of AB relay 914 also completes a circuit for lighting busy lamp 501 at Control Point A. This circuit may be traced from battery through front contact and armature 3 of AB relay 914, over conductor 923, through busy lamp 501 to ground. The lighting of busy lamp 501 at this time provides an artificial busy at the switchboard at Control Point A and gives a visual indication to the operator thereat that calls may not be handled except for emergencies because of the possibility of causing interference. The operation of AB relay 914 removes the common ground supplied to conductor 719, from back contact and armature of TSA relay 903 through back contact and armature 1 of AB relay 914. The removal of this ground from conductor 719 will cause the release of LS4 relay 704 when the push-to-talk key at the mobile subscriber's transmitter is released and will prevent any of the other LS relays of Fig. 7 from locking operated. The release of LS4 relay 704 in turn releases TMC relay 801. The operation of AB relay 914 also removes the ground supplied to conductor 918 from back contact and armature 2 of AB relay 914. This is the operating ground for LSB relay 706 and TMC relay 801 and its removal will cause these relays to release. The release of TMC relay 801 in turn releases TMD relay 802. The release of LSB relay 706 removes the operating ground for the L relays of Fig. 15 which extended from ground through front contact and armature 4 of LSB relay 706, over conductor 733, through front contacts and armatures of the CM relays of Fig. 10, over conductors 1505, 1506, 1507 and 1508 depending upon which of the CM relays of Fig. 10 are operated, through the windings of L1 relay 1501, L2 relay 1502, L3 relay 1503 and L4 relay 1504. AB relay 914, in operating, also completes a circuit which may be traced from ground through front contact and armature 10 of LS4 relay 704 (when this relay is operated), over conductor 750, through front contact and armature 4 of AB relay 914, over conductor 917 to armature 1 of CM4 relay 1024 and a circuit which may be traced from ground through front contact and armature 10 of LS1 relay 701 (when this relay is operated), over conductor 751, through front contact and armature 5 of AB relay 914, over conductor 928 to armature 2 of CM4 relay 1024. The completion of these two circuits by AB relay 914 provides the operating grounds for the east comparison relays of Fig. 15 and the west comparison relays of Fig. 12, respectively, and will permit the signal merit decider circuit of Fig. 10 at Control Point A to operate the appropriate relays in the comparison circuits of Fig. 12 and Fig. 15 in accordance with the merit rating of a received signal.

The concurrent operation of ET relay 718 and ER relay 717, as described above, also completes a circuit for the operation of TBA relay 902 which may be traced from ground through front contact and armature 1 of ET 718, through front contact and armature 2 of ER relay 717, over conductor 740, over conductor 925, through the winding of TBA relay 902, through back contact and armature of 1AM relay 913 to battery. The operation of TBA relay 902 at this time opens the operating circuit for LO5 relay 1405 and LO6 relay 1406 in the east code relays of Fig. 14 at Control Point A and the LO5 relay 1105 and LO6 relay 1106 in the west code relays of Fig. 11 at Control Point A. This will prevent distributors 1606 and 1306 at Control Point A from transmitting permutation code signals representing the letters F and W to the adjacent east control point and the adjacent west control point, respectively. The purpose of this will be discussed later. TBA relay 902, in operating, also transfers the holding circuit for the west comparison relays of Fig. 12 and the east comparison relays of Fig. 15 at Control Point A to ground supplied through front contact and armature 3 of TBA relay 902 to conductors 1218 and 1518, respectively. The transfer of the holding ground at front contact and armature 3 of TBA relay 902 thus prevents L2 relay 1502, which was operated in the manner described above in response to the reception of a merit two signal, from releasing. L2 relay 1502 being held operated by the ground supplied through front contact and armature 3 of TBA relay 902 over conductor 1518 in turn holds S2 relay 1412 operated by supplying ground over conductor 1510 through front contact and armature 3 of L2 relay 1502.

When a call from the mobile subscriber which is being handled through Control Point B is completed, the carrier signal from the mobile subscriber's transmitter will no longer be received by receiver 1 at Control Point B and receiver 4 at Control Point A. At Control Point A, there will no longer be any output voltage from longitudinal balancing unit 624 on conductors 604 and 614 and, as a consequence of this, A4 relay 654, TH relay 610 and SQ relay 618 in the receiver selector circuit of Fig. 6 at Control Point A will release. Furthermore, the discharge through triodes 644 will be extinguished and there will be no voltage across the parallel combination of resistors 1001 through 1004. As a consequence of this, the discharge through triodes 1011 and 1012 will be extinguished and CM1 relay 1021 and CM2 relay 1022 will release.

In the manner hereinbefore described, distributor 1306 at Control Point B will transmit the five-unit permutation code signal representing the letter F to Control Point A where this signal will be received by non-typing selector 1650 and will operate the F contacts thereof. The operation of the F contacts of non-typing selector 1650 at Control Point A will remove the locking ground from conductor 1659 to which ET relay 718 is locked operated. Removal of the ground from conductor 1659 will cause ET relay 718 to release which in turn will extinguish ET transmitter busy lamp 511 in the switchboard at Control Point A, thus giving a visual indication to the operator at Control Point A that the transmitter at Control Point B is no longer on the air.

In the manner hereinbefore described, distributor 1306 at Control Point B will also transmit the five-unit permutation code representing the letter D to Control Point A as an indication that receiver 1 at Control Point B is no longer receiving a signal. When these signals are received by non-typing selector 1650 at Control Point A, the D contacts of non-typing selector 1650 will be operated which will remove the ground supplied over conductor 1651 to which ER relay 717 is locked operated. In this manner, ER relay 717 is released which in turn releases LD relay 817. The release of LD relay 817 will extinguish the ER receiver lamp 510 in the switchboard at Control Point A, thus giving a visual indication to the operator thereat that receiver 1 at Control Point B is no longer receiving a signal.

The release of ET relay 718 and ER relay 717, as above described, will in turn cause the release of slow-releasing AB relay 914 and TBA relay 902. Because TBA relay 902 releases immediately, the holding ground for the comparison relays of Fig. 12 and Fig. 15 at Control Point A is removed from conductors 1218 and 1518, respectively. The removal of this holding ground on conductor 1518 will in turn release L2 relay 1502 and A3 relay 1513. The release of L2 relay 1502 in turn releases S2 relay 1412. When slow-releasing AB relay 914 releases, all of the circuits at Control Point A are now released and restored to normal in readiness for the reception of a new call. The release of AB relay 914 extinguishes busy lamp 501 which gives a visual indication to the operator at Control Point A that calls may be initiated or received without causing interference.

*Transfer of mobile subcriber's call to an adjacent control point*

Referring again to the previous example where the mobile subscriber is located at a point somewhere between Control Point B and the adjacent west control point (Control Point A), assume now that the mobile subscriber, after initiating his call in the manner described previously over receiver 1 at Control Point B, moves in a westerly direction toward Control Point A.

This corresponds to the movement from position Y toward position Z on the highway shown in Fig. 1. The operation of the circuits at Control Point A and Control Point B will now be described to illustrate the manner in which the control of the call being made by the mobile subscriber is transferred from Control Point B to Control Point A. As previously assumed, the signal being rereived over receiver 1 at Control Point B had a merit rating of three while the signal being received over receiver 4 at Control Point A had a merit rating of two. The comparison of these merit ratings in the east comparison circuit at Control Point A and the west comparison circuit at Control Point B caused the call to be placed under the supervision and control of the operator at Control Point B in the manner described above.

At Control Point B, LS1 relay 701 is locked operated over the previously traced circuit to the ground supplied to conductor 719 through back contact and armature 1 of AB relay 914 from back contact and armature of TSA relay 908. LSA relay 708, TMC relay 801 and TMD relay 802 are all operated over the circuits previously traced. L3 relay 1203 and A2 relay 1212 in the west comparison circuit at Control Point B are locked operated through back contacts and armatures of the other L relays and A relays, respectively, of Fig. 12 to the ground supplied to conductor 1218 through normal contacts of armature 3 of TBA relay 902, back contact and armature 1 of AB relay 914 and back contact and armature of TSA relay 908. WC relay 815 is locked operated over the circuit traced from ground through front contact and armature 4 of L3 relay 1203, through back contact and armature 3 of A3 relay 1213, through back contact and armature 4 of A4 relay 1214, over conductor 1217, through the winding of WC relay 815 to battery. S3 relay 1113 is locked operated to ground supplied over conductor 1215 from L3 relay 1203. LA relay 705 is held operated through front contacts and armatures of LS1 relay 701, WC relay 815 and TMD relay 802 to the ground supplied to conductor 918 through back contact and armature 2 of AB relay 914. R1 receiver lamp 506 in the switchboard at Control Point B is lighted. LBW relay 714 is operated and held operated through front contacts and armatures of LSA relay 708 and WC relay 815. E relay 426, D relay 427, SL relay 428 and C relay 425 are operated as are BL relay 409, TB relay 901 and TSB relay 909 over the circuits previously traced. S7 relay 1117 is locked operated to ground supplied over conductor 735 from LBW relay 714. S5 relay 1115 and S5 relay 1415 are locked operated to ground supplied over conductors 920 and 919, respectively, through front contact and armature 5 of TB relay 901 and back contact and armature 2 of TBA relay 902. Busy lamp 501 in the switchboard at Control Point B is also lighted.

At Control Point A, ER relay 717, ET relay 718, AB relay 914, LD relay 817 and TBA relay 902 are operated and held operated over the circuits previously traced. L2 relay 1502 and A3 relay 1503 in the east comparison circuit at Control Point A are locked operated to the ground supplied to conductor 1518 through front contact and armature 3 of TBA relay 902. S2 relay 1412 is locked operated to ground supplied to conductor 1510 through front contact and armature 3 of L2 relay 1502. ER receiver lamp 510, ET transmitter lamp 511 and busy lamp 501 are lighted. Because AB relay 914 is operated, LS4 relay 704, when operated in response to the reception of a signal over receiver 4 at Control Point A, will not lock operated and, therefore, LS4 relay 704 operates and releases for each operation and release of the push-to-talk key of the mobile subscriber's transmitter.

When the mobile subscriber who is carrying on his conversation to the called telephone subscriber over receiver 1 at Control Point B, as previously described, continues traveling toward Control Point A, the strength of the signal received over receiver 1 at Control Point B will diminish while the signal simultaneously received over receiver 4 at Control Point A will increase in strength and a point will be reached somewhere between the location of receiver 1 associated with Control Point B and the location of receiver 4 associated with Control Point A where the signal strength received over receiver 4 is greater than that received over receiver 1. It is, therefore, desirable at this point to transfer the control and supervision of the call from Control Point B to Control Point A. The manner in which this is accomplished will now be described.

At Control Point B, each operation of the push-to-talk key of the mobile subscriber's radio transmitter will cause the CM relays of Fig. 10 to operate and assign a merit rating to the signal being received over receiver 1 at Control Point B. Similarly, at Control Point A, each operation of the push-to-talk key of the mobile subscriber's radio transmitter will cause the CM relays of Fig. 10 and LS4 relay 704 to operate. The CM relays of Fig. 10 at Control Point A operate to assign a merit rating to the signal being received over receiver 4 at Control Point A.

Assume now that as the subscriber moves in a westerly direction, the strength of the signal being received over receiver 1 at Control Point B diminishes to a merit rating of two while the strength of the signal being received over receiver 4 at Control Point A remains at a merit rating of two.

When the merit two signal is received by receiver 1 at Control Point B, CM1 relay 1021 and CM2 relay 1022 in the signal merit decider circuit of Fig. 10 at Control Point B operate. The operation of CM1 relay 1021 and CM2 relay 1022 at Control Point B completes a circuit for the operation of L2 relay 1202 which may be traced from ground through front contact and armature 1 of LSA relay 708, over conductor 732, through back contact and armature 2 of CM4 relay 1024, through back contact and armature 2 of CM3 relay 1023, through front contact and armature 2 of CM2 relay 1022, over conductor 1206, through the winding of L2 relay 1202 to battery. L2 relay 1202, in operating, locks operated over a circuit which may be traced from battery through the winding of L2 relay 1202, through back contact and armature 1 of L1 relay 1201, through front contact and armature 2 of L2 relay 1202, through back contact and armature 1 of L3 relay 1203, through back contact and armature 1 of L4 relay 1204, over conductor 1218, through normal contacts of armature 3 of TBA relay 902, through back contact and armature 1 of AB relay 914, through back contact and armature of TSA relay 908 to ground. L2 relay 1202, in operating, opens the holding circuit for L3 relay 1203 and L3 relay 1203 releases. The release of L3 relay 1203 removes ground from conductor 1217 which extends through the winding of WC relay 815 to battery and WC relay 815 which is a slow-releasing relay starts to release. L3 relay 1203, in releasing, also removes ground from conductor 1215 to which S3 relay 1113 is held operated, thus allowing S3 relay 1113 to release. L2 relay 1202, in operating, also completes a circuit for the operation of LO2 relay 1102 which may be traced from ground through front contact and armature 3 of L2 relay 1202, over conductor 1210, through normal contacts of armature 1 of S2 relay 1112, through the winding of LO2 relay 1102, through back contact and armature 2 of G relay 1109 to battery. LO2 relay 1102 is the west code relay at Control Point B which controls distributor 1306 to cause distributor 1306 to transmit the letter X in the five-unit permutation code signals to the adjacent west control point (Control Point A). After the transmission of the letter X which represents a merit rating of two in the five-unit permutation code signals by distributor 1306 to Control Point A, S2 relay 1112 is locked operated to the ground supplied over conductor 1210 from L2 relay 1202 and LO2 relay 1102 releases and restores to normal. The merit two rating of the signal being received over receiver 1 at Control Point B will be compared with the merit rating of the signal simultaneously received over receiver 4 at Control Point A in the west comparison circuit of Fig. 12 at Control Point B. At the same time, the merit two rating of the signal being received over receiver 1 at Control Point B will be compared with the signal simultaneously received over receiver 4 at Control Point A in the east comparison circuit of Fig. 15 at Control Point A.

The signal originally received over receiver 4 at Con-Control Point A had a merit rating of two and this merit rating was registered in the east comparison circuit of Fig. 15 at Control Point A (L2 relay 1502 operated) and was also transmitted to Control Point B where it was registered in the west comparison circuit of Fig. 12 (A2 relay 1212 operated). As assumed above, the signal now being received over receiver 4 at Control Point A continues to have a merit rating of two. Therefore, a new merit rating will not be required in either the east comparison circuit of Fig. 15 at Control Point A or in the west comparison circuit of Fig. 12 at Control Point B because the present merit rating in these two comparison circuits for the signal being received over receiver 4 at Control Point A is still connected. A new registration in these two circuits will not be made until the merit rating of the signal changes. This will be described in more detail hereinafter.

As assumed above, the merit rating of the signal simultaneously received over receiver 4 at Control Point A remains at two during the time the merit rating of the signal being received over receiver 1 at Control Point B changes from three to two. When the merit two signal is again received over receiver 4 at Control Point A, CM1 relay 1021, CM2 relay 1022 and LS4 relay 704 at Control Point A will operate. CM1 relay 1021 and CM2 relay 1022 operate as a result of the reception of a signal having a merit two rating while LS4 relay 704 is operated as described hereinbefore when a signal of usable strength is received over receiver 4 at Control Point A. The operation of these relays will complete a circuit which may be traced from ground through front contact and armature 10 of LS4 relay 704, over conductor 750, through front contact and armature 4 of AB relay 914, over conductor 917, through back contact and armature 1 of CM4 relay 1024, through back contact and armature 1 of CM3 relay 1023, through front contact and armature 1 of CM2 relay 1022, over conductor 1506, through the winding of L2 relay 1502 to battery. L2 relay 1502 was operated previously when the merit two signal was first received over receiver 4 at Control Point A and this relay locked operated over the previously traced circuit. Therefore, the application of ground to conductor 1506, as described above, will have no effect upon L2 relay 1502.

When L2 relay 1502 first operated in response to the reception of a merit two signal, it in turn operated LO2 relay 1402 and the operation of LO2 relay 1402 caused distributor 1606 to transmit the five-unit permutation code representing the letter X to Control Point B. After the transmission of this five-unit permutation code signal to Control Point B, LO2 relay 1402 released and S2 relay 1412 operated and locked to the ground supplied over conductor 1510 from L2 relay 1502. The operation of S2 relay 1412 opened the operating circuit for LO2 relay 1402 which prevents distributor 1606 from retransmitting the permutation code signal representing the letter X to Control Point B. Because a merit two rating has been previously transmitted to Control Point B and registered there in the west comparison circuit of Fig. 12, there is no need for transmitting the merit rating of the signal now being received over receiver 4 at Control Point A to the west comparison circuit at Control Point B until the merit rating of this signal changes.

At Control Point A, the reception of the permutation code signals representing the letter X (which indicates that receiver 1 at Control Point B is receiving a signal having a merit two rating) by non-typing selector 1650 at Control Point A will cause the X contacts of non-typing selector 1650 to operate. The operation of the X contacts of non-typing selector 1650 will connect a ground to conductor 1655 which extends through the winding of A2 relay 1512 to battery. A2 relay 1512, in the east comparison circuit at Control Point A in operating, releases A3 relay 1513 and locks operated over a circuit traced from battery through the winding of A2, relay 1512, through back contact and armature 1 of A1 relay 1511, through front contact and armature 2 of A2 relay 1512, through back contact and armature 1 of A3 relay 1513, through back contact and armature 2 of A4 relay 1514, over conductor 1518, through front contact and armature 3 of TBA relay 902 to ground.

The merit ratings of the signals now being simultaneously received over receiver 1 at Control Point B and receiver 4 at Control Point A are now registered in the west comparison circuit of Fig. 12 at Control Point B and in the east comparison circuit of Fig. 15 at Control Point A.

In the west comparison circuit of Fig. 12 at Control Point B, L2 relay 1202 and A2 relay 1212 are operated and the comparison circuit functions to compare the two merit ratings. As previously described, when the merit ratings of signals simultaneously received by the terminal receivers of two adjacent control points are equal, the control point on the east is given the preference. Therefore, since the merit rating of the signal received over receiver 1 at Control Point B is the same as the merit rating of the signal received over receiver 4 at Control Point A, Control Point B will retain the control and supervision of the call. L2 relay 1202 at Control Point B, in operating as described hereinbefore, completes the circuit for the reenergization of WC relay 815. This circuit may be traced from ground through front contact and armature 4 of L2 relay 1202, through back contact and armature 3 of A3 relay 1213, through back contact and armature 4 of A4 relay 1214, over conductor 1217, through the winding of WC relay 815 to battery. Because WC relay 815 is a slow-releasing relay, it will not have had sufficient time to fully release after it was deenergized by the release of L3 relay 1203, previously described, and because WC relay 815 is not fully released, LA relay 705 remains operated and the R1 receiver lamp 506 in the switchboard at Control Point B remains lighted as an indication to the operator at Control Point B that the call should still be handled through receiver 1 at Control Point B.

Referring to the east comparison circuit of Fig. 15 at Control Point A, L2 relay 1502 and A2 relay 1512 are operated as previously described. However, the operation of L2 relay 1502 at this time does not complete a circuit for the application of ground to conductor 1517 as the circuit is open at armature 3 and back contact of A2 relay 1512. Therefore, the line lamp at Control Point A will not be lighted.

Assume now that the mobile subscriber continues his travel toward Control Point A and that the signal being received over receiver 1 at Control Point B decreases in strength so as to have a merit rating of one while the signal being received over receiver 4 at Control Point A increases in strength so as to have a merit rating of three.

At Control Point A, CM1 relay 1021, CM2 relay 1022 and CM3 relay 1023 operate as a result of the reception over receiver 4 of the signal having a merit three rating and LS4 relay 704 is operated, as described hereinbefore, when a signal of usable strength is received over receiver 4. The operation of these relays will complete a circuit for the operation of L3 relay 1503 which may be traced from ground through front contact and armature 10 of LS4 relay 704, over conductor 750, through front contact and armature 4 of AB relay 914, over conductor 917, through back contact and armature 1 of CM4 relay 1024, through front contact and armature 1 of CM3 relay 1023, over conductor 1507, through the winding of L3 relay 1503 to battery. L3 relay 1503, in operating, opens the holding circuit for L2 relay 1502 previously traced and L2 relay 1502 releases. The release of L2 relay 1502 removes the ground from conductor 1510 to which S2 relay 1412 is held operated, thus allowing S2 relay 1412 to release. L3 relay 1503, in operating, locks operated over a circuit which may be traced from battery through the winding of L3 relay 1503, through back contact and armature 2 of L4 relay 1504, through front contact and armature 2 of L3 relay 1503, through back contact and armature 1 of L2 relay 1502, through back contact and armature 2 of L1 relay 1501, over conductor 1518, through front contact and armature 3 of TBA relay 902 to ground. L3 relay 1503, in operating as above described, also completes a circuit for the operation of LO3 relay 1403 which may be traced from ground through front contact and armature 3 of L3 relay 1503, over conductor 1515, through normal contacts of armature 1 of S3 relay 1413, through the winding of LO3 relay 1403, through back contact and armature 3 of G relay 1409 to battery. LO3 relay 1403 is the east code relay at Control Point A which controls distributor 1606 to cause distributor 1606 to transmit the letter Q in the five-unit permutation code signals to the adjacent east control point (Control Point B). After the transmission of the letter Q which represents a merit rating of three in the five-unit permutation code signals by distributor 1606 to Control Point B, S3 relay 1413 is locked operated to the ground supplied over conductor 1515 from L3 relay 1503 and LO3 relay 1403 releases and restores to normal.

As assumed above, a signal having a merit rating of one will be simultaneously received by receiver 1 at Control Point B which will cause the west distributor 1306 at Control Point B to transmit the letter S in the five-unit permutation code to Control Point A. The reception of the permutation code signals representing the letter S which indicate a merit rating one by non-typing selector 1650 at Control Point A will operate the S contacts of non-typing selector 1650 and cause a ground to be applied to conductor 1654 which extends through the winding of A1 relay 1511 to battery. A1 relay 1511, in operating, opens the holding circuit for A2 relay 1512 which releases and A1 relay 1511 locks operated over a circuit which may be traced from battery through the winding of A1 relay 1511, through front contact and armature 3 of A1 relay 1511, through back contact and armature 2 of A2 relay 1512, through back contact and armature 1 of A3 relay 1513, through back contact and armature 2 of A4 relay 1514, over conductor 1518, through front contact and armature 3 of TBA relay 902 to ground.

The merit ratings of the signals simultaneously received over receiver 1 at Control Point B and receiver 4 at Control Point A are now registered in the east comparison circuit of Fig. 15 at Control Point A and L3 relay 1503 and A1 relay 1511 are operated in the manner described above. The operation of L3 relay 1503 at Control Point A completes a circuit which may be traced from ground through front contact and armature 4 of L3 relay 1503, through back contact and armature 3 of A3 relay 1513, through back contact and armature 4 of A4 relay 1514, over conductor 1517, through the winding of EC relay 816 to battery. EC relay 816, in operating at this time, does not light line lamp 503 at Control Point A because, as previously described, this circuit has been opened by the operation of AB relay 914.

At Control Point B, the reception of the merit one signal over receiver 1 will cause the operation of CM1 relay 1021 in the manner hereinbefore described which will complete a circuit for the operation of L1 relay 1201. This circuit may be traced from battery through the winding of L1 relay 1201, over conductor 1205, through front contact and armature 2 of CM1 relay 1021, through back contacts and armatures 2 of CM2 relay 1022, CM3 relay 1023 and CM4 relay 1024, over conductor 732, through front contact and armature 1 of LSA relay 708 to ground. L1 relay 1201, in operating, releases L2 relay 1202 and L2 relay 1202, in releasing, in turn releases S2 relay 1112. When L relay 1202 releases ground is removed from conductor 1217 which is holding WC relay 815 operated and WC relay 815 starts to release. L1 relay 1201, in operating, locks operated over a circuit which may be traced from battery through the winding of L1 relay 1201, through front contact and armature 3 of L1 relay 1201, through back contact and armature 2 of L2 relay 1202, through back contact and armature 1 of L3 relay 1203, through back contact and armature 1 of L4 relay 1204, over conductor 1218, through normal contacts of armature 3 of TBA relay 902, through back contact and armature 1 of AB relay 914, through back contact and armature of TSA relay 908 to ground. L1 relay 1201, in operating as described above, completes a circuit for the operation of LO1 relay 1101 which may be traced from ground through front contact and armature 4 of L1 relay 1201, over conductor 1209, through normal contacts of armature 1 of S1 relay 1111, through the winding of LO1 relay 1101, through back contact and armature 1 of G relay 1109 to battery. LO1 relay 1101 is the west code relay at Control Point B which controls distributor 1306 to cause distributor 1306 to transmit the letter S in the five-unit permutation code signals to the adjacent west control point (Control Point A). After the transmission of the Letter S which represents a merit rating of one in the five-unit permutation code signals by distributor 1306 to Control Point A, S1 relay 1111 is locked operated to the ground supplied over conductor 1209 from L1 relay 1201 and LO2 relay 1101 releases and restores to normal.

As described above, a signal having a merit rating of three is simultaneously received by receiver 4 at Control Point A which will cause the east distributor 1606 at Control Point A to transmit the letter Q in the five-unit permutation code to Control Point B. The reception of the permutation code signals representing the letter Q which indicate a merit rating three by non-typing selector 1350 at Control Point B will operate the Q contacts of non-typing selector 1350 and cause a ground to be applied to conductor 1356 which extends through the winding of A3 relay 1213 to battery. A3 relay 1213, in operating, opens the holding circuit for A2 relay 1212 which releases and A3 relay 1213 locks operated over a circuit which may be traced from battery through the winding of A3 relay 1213, through back contact and armature 1 of A1 relay 1211, through front contact and armature 2 of A3 relay 1213, through back contact and armature 1 of A2 relay 1212, through back contact and armature 2 of A1 relay 1211, over conductor 1218, through normal contacts of armature 3 of TBA relay 902, through back contact and armature 1 of AB relay 914, through back contact and armature of TSA relay 908 to ground.

The merit ratings of the signals simultaneously received over receiver 4 at Control Point A and receiver 1 at Control Point B are now registered in the west comparison circuit of Fig. 12 at Control Point B and L1 relay 1201 and A3 relay 1213 are operated in the manner described above. The fact that L1 relay 1201 and A3 relay 1213 in the west comparison circuit of Fig. 12 at Control Point B are operated indicates that the signal being received over receiver 1 at Control Point B has a lower merit rating than the signal being received over receiver 4 at Control Point A and that it is, therefore, desirable to transfer the control of the call from Control Point B to Control Point A. The operation of A3 relay 1213 at Control Point A opens the operating circuit for WC relay 815 which extends from ground through front contact and armature 5 of L1 relay 1201, through back contact and armature 3 of A2 relay 1212, through back contact and armature 3 of A3 relay 1213 (A3 relay 1213 is now operated), through back contact and armature 4 of A4 relay 1214, over conductor 1217, through the winding of WC relay 815 to battery. A3 relay 1213, in operating, thus prevents WC relay 815 from being reenergized by the operation of L1 relay 1201 and WC relay 815 will release. The release of WC relay 815 will in turn release LA relay 705 which was held operated over a circuit traced from battery through the winding of LA relay 705, through front contact and armature 6 of LS1 relay 701, over conductor 730, through back contact and armature 3 of LF relay 905, over conductor 729, over conductor 818, through front contact and armature 1 of WC relay 815 (WC relay 815 is now released), through front contact and armature 2 of TMD relay 802, over conductor 819, through back contact and armature 7 of LS4 relay 704, over conductor 918, through back contact and armature 2 of AB relay 914 to ground. The release of LA relay 705 extinguishes the R1 receiver lamp 506 in the switchboard at Control Point B.

The release of WC relay 815 opens the operating circuit for slow-releasing LBW relay 714 and this relay starts to release. However, before LBW relay 714 releases, a circuit is completed for the operation of LO8 relay 1108 which may be traced from ground through back contact and armature 2 of WC relay 815, over conductor 850, through front contact and armature 4 of LSA relay 708, through front contact and armature 1 of LBW relay 714, over conductor 736, through normal contacts of armature 1 of S8 relay 1118, through the winding of LO8 relay 1108, through back contact and armature 8 of G relay 1109 to battery. LO8 relay 1108 is the west code relay at Control Point B which controls distributor 1306 to cause distributor 1306 to transmit the letter D in the five-unit permutation code signals to the adjacent west control point (Control Point A). After the transmission of the letter D in the five-unit permutation code signals by distributor 1306 to Control Point A, S8 relay 1118 locks operated to the ground supplied over conductor 736 and LO8 relay 1108 releases and restores to normal. When LBW relay 714 releases, S8 relay 1118 and S7 relay 1117 release.

The release of WC relay 815 at Control Point B as described above, also opens the operating circuit hereinbefore traced for E relay 426 and this relay releases. The release of E relay 426 will again close the holding circuit for C relay 425 which was held operated by D relay 427. The release of WC relay 815 also completes a circuit for the operation of RF relay 904 which may be traced from battery through the winding of RF relay 904, through front contact and armature 2 of TB relay 901, over conductor 927, through back contact and armature 1 of WC relay 815, through front contact and armature 2 of TMD relay 802, over conductor 819, through back contact and armature 7 of LS4 relay 704, over conductor 918, through back contact and armature 2 of AB relay 914 to ground.

RF relay 904, in operating, completes a circuit for operating LC relay 814 which may be traced from battery through the winding of LC relay 814, over conductor 845, through front contact and armature 3 of RF relay 904, through back contact and armature 1 of 1B relay 907, over conductor 731, through back contact and armature 8 of LS4 relay 704, through back contact and armature 7 of LS2 relay 702, over conductor 918, through back contact and armature 2 of AB relay 914 to ground. LC relay 814, in operating, completes a circuit for lighting the WR receiver lamp 505 in the switchboard at Control Point B. This circuit may be traced from battery through front contact and armature of LC relay 814, over conductor 842, through WR receiver lamp 505 to ground. RF relay 904, in operating, also completes a circuit for the operation of 1B relay 907 which may be traced from battery through the winding of 1B relay 907, through back contact and armature 1 of 1A relay 906, through front contact and armature 1 of RF relay 904 to ground. 1B relay 907, in operating, operates 1A relay 906 and 1A relay 906, in operating, releases 1B relay 907 and the release of 1B relay 907 in turn reoperates 1A relay 906. 1A relay 906 and 1B relay 907 form an interrupter circuit whose continued operation and release will result in the flashing of WR receiver lamp 505. This is accomplished by the repeated opening and closing of the operating circuit for LC relay 814, traced above. Therefore, LC relay 814 will release each time 1B relay 907 operates and will reoperate each time 1B relay 907 releases. The flashing of WR receiver lamp 505 at this time is a visual indication to the operator at Control Point B that the transmission from the mobile subscriber is stronger over receiver 4 at Control Point A than over receiver 1 at Control Point B and that control of the call should be transferred to Control Point A if the mobile subscriber continues his westerly progress.

The operator at Control Point B, upon observing the flashing WR receiver lamp 505, will request the mobile subscriber to either stop and complete the call before proceeding any further in a westerly direction or to continue his westerly progress and complete the call under control of Control Point A after a slight delay. If the mobile subscriber elects to halt his westerly progress and stops while he completes the call, the WR receiver lamp 505 in the switchboard at Control Point B will continue to flash during the remainder of the call. If the mobile subscriber elects to continue his westerly progress, the operator will advise him that there will be a slight delay while the call is transferred to the control of Control Point A. The operator at Control Point B will then contact the operator at Control Point A over wire trunk 523 and cable 525 which extends to Control Point A. The operator at Control Point B will advise the operator at Control Point A that a call is being made between a mobile subscriber who is traveling toward Control Point A and a telephone subscriber connected to the telephone switching center associated with Control Point B. The operator at Control Point B will furnish the operator at Control Point A the necessary information for the control and supervision of this call and will remove the plug from jack 502 and insert it into the jack associated with trunk 523 to Control Point A. This will extend the connection from the called telephone subscriber over trunk 523 and cable 525 to Control Point A and the operator at Control Point A will reestablish the connection to the calling mobile subscriber in the manner described hereinafter.

When the operator at Control Point B removes the plug from line jack 502 and inserts it into the jack associated with trunk 523, SL relay 428 releases and extinguishes busy lamp 501. The release of SL relay 428 also will release D relay 427 which in turn will release BL relay 409. C relay 425 does not release when D relay 427 releases as it is held operated through back contact and armature of E relay 426. The release of BL relay 409 at Control Point B in turn releases TB relay 901.

When TB relay 901 at Control Point B releases, it removes the ground from conductors 919 and 920 which are holding S5 relay 1415 and S5 relay 1115 operated, thus allowing these relays to release. The release of TB relay 901 deenergizes slow-releasing TSB relay 909 and this relay starts to release. TB relay 901, in releasing, also opens the operating circuit for RF relay 904 which releases. The release of RF relay 904 releases 1B relay 907 and 1B relay 907, in releasing, in turn releases 1A relay 906. The release of RF relay 904 also opens the operating circuit for LC relay 814 and releases this relay. The release of LC relay 814 extinguishes WR receiver lamp 505 in the switchboard at Control Point B. The release of TB relay 901 also connects a ground through normal contacts of armature 3 of TB relay 901, through front contact and armature of slow-releasing TSB relay 909 through the winding of TSA relay 908 to battery, thus operating TSA relay 908. TSA relay 908, in operating, will as described hereinbefore, complete circuits for the operation of LO6 relay 1416 and LO6 relay 1106. These circuits may be traced from ground through front contact and armature of TSA relay 908, through back contact and armature 1 of TBA relay 902, over conductor 922, through normal contacts of armature 1 of S6 relay 1116, through the winding of LO6 relay 1106, through back contact and armature 6 of G relay 1109 to battery and from ground through front contact and armature of TSA relay 908, through back contact and armature 1 of TBA relay 902, over conductor 921, through normal contacts of armature 1 of S6 relay 1416, through the winding of LO6 relay 1406, through back contact and armature 6 of G relay 1409 to battery. LO6 relay 1406 and LO6 relay 1106 are the code relays which, as hereinbefore described will control distributors 1606 and 1306, respectively, to cause them to transmit the letter F in the five-unit permutation code signals to the adjacent east control point (Control Point C) and the adjacent west control point (Control Point A), respectively. In the manner hereinbefore described, after the transmission of the letter F to the adjacent control points, LO6 relay 1406 and LO6 relay 1106 are released and restored to normal and S6 relay 1416 and S6 relay 1116 will be locked operated to the ground supplied over conductors 921 and 922, respectively.

TSA relay 908, in operating, removes the ground which extended through back contact and armature 1 of AB relay 914, through normal contacts of armature 3 of TBA relay 902, over conductors 1218 and 1518 to the west comparison circuit relays of Fig. 12 and the east comparison circuit relays of Fig. 15 at Control Point B. The ground on conductor 1218 was the locking ground for the operated relays of Fig. 12 and its removal will cause these relays to release and restore to normal. As described above, L1 relay 1201 and A3 relay 1213 were locked operated to this ground. Therefore, these relays release and restore to normal. The release of L1 relay 1201 in turn removes the holding ground for S1 relay 1211 and S1 relay 1211 releases. The operation of TSA relay 902, as above described, also removes the ground which extended through back contact and armature 1 of AB relay 914, over conductor 719 to hold LS1 relay 701 operated. The removal of this ground will cause LS1 relay 701 to release. The release of LS1 relay 701 in turn releases LSA relay 708 and TMC relay 801. The release of TMC relay 801 in turn releases TMD relay 802. When slow-releasing TSB relay 909 releases, it in turn releases TSA relay 908 and the release of TSA relay 908 removes the ground supplied to conductors 921 and 922 which are holding S6 relay 1416 and S6 relay 1116 operated. The removal of the grounds from conductors 921 and 922 will cause the release of S6 relay 1416 and S6 relay 1116. All of the circuits at Control Point B have now restored to normal and are ready to perform their functions on a new call.

At control Point A, the reception of the five-unit permutation code representing the letter D by non-typing selector 1650 over conductor 1653 from Control Point B will operate the D contacts of non-typing selector 1650 which will remove the ground supplied over conductor 1661. The removal of the ground from conductor 1661 will in turn cause the release of ER relay 717 and the release of ER relay 717 will in turn release LD relay 817. The release of LD relay 817 will extinguish ER receiver lamp 510 in the switchboard at Control Point A which gives a visual indication to the operator at Control Point A that receiver 1 at Control Point B is no longer receiving a signal.

At control Point A, the reception of the five-unit permutation code representing the letter F by non-typing selector 1650 over conductor 1653 from Control Point B will cause the operation of the F contacts of non-typing selector 1650 which will remove the ground supplied over conductor 1659 to ET relay 718. The removal of this ground from conductor 1659 will cause ET relay 718 to release and the release of ET relay 718 will in turn extinguish ET lamp 511 in the switchboard at Control Point A to give a visual indication to the operator at Control Point A that the transmitter at Control Point B is off the air.

The operator at Control Point A, upon being signaled by the operator at Control Point B, will answer the call from the operator at Control Point B by inserting an answering cord of one of the cord circuits 512 in the jack associated with trunk 522 and she knows that as soon as the line lamp in the switchboard at Control Point A lights that she may reestablish the connection between the called telephone subscriber and the mobile subscriber under the control and supervision of the circuits at Control Point A.

The release of ET relay 718 and ER relay 717 at Control Point A, as above-described, opens the operating circuit for AB relay 914 and causes the release of AB relay 914. The release of AB relay 914 in turn restores the common locking circuit for the LS relays of Fig. 7. Therefore, when the mobile subscriber's carrier is picked up by receiver 4 at Control Point A, LS4 relay 704 will lock over the circuit previously traced through back contact and armature 1 of AB relay 914 and back contact and armature of TSA relay 908 to ground. LS4 relay 704, in operating, now completes a circuit for the operation of LSB relay 706 and TMC relay 801. TMC relay 801 in turn causes the operation of TMD relay 802 after the delay interposed by the time delay circuit associated with TMD relay 802.

As described above, the signal now being received over receiver 4 at Control Point A has a merit rating of three which had caused the operation of L3 relay 1503. Also as described above, the signal simultaneously received over receiver 1 at Control Point B had a merit rating of one which in turn caused the operation of A1 relay 1511. The operation of L3 relay 1503 completes the previously traced circuit for the operation of EC relay 816. Because ET relay 718, ER relay 717 and AB relay 914 are now released, the operation of EC relay 816 will complete a circuit for the operation of E relay 426 at Control Point A. This circuit may be traced from battery through the winding of E relay 426, over conductor 431, through front contact and armature 8 of SQ relay 618, over conductor 729, over conductor 818, through front contact and armature 2 of EC relay 816, through front contact and armature 1 of TMD relay 802, over conductor 846, through back contact and armature 7 of LS1 relay 701, over conductor 918, through back contact and armature 2 of AB relay 914 to ground. The operation of E relay 426 at Control Point A will, in the manner hereinbefore described, cause line lamp 503 in the switchboard at Control Point A to light. The operator at Control Point A, upon seeing that line lamp 503 is lighted will then insert the other cord of the cord circuit 512 which has been plugged in the jack associated with trunk 522 in jack 502 which reestablishes the connection from the mobile subscriber to the called telephone subscriber. The circuits at Control Point A function in the manner hereinbefore described and the appropriate five-unit permutation code signals are transmitted to the adjacent control points.

The WT lamp 504 and WR lamp 505 in the switchboard at Control Point B will be lighted. Busy lamp 501 in the switchboard at Control Point B will also be lighted. The lighting of these three lamps at Control Point B gives a visual indication to the operator thereat that receiver 4 at Control Point A is engaged and that the transmitter at Control Point A is on the air. The lighting of busy lamp 501 gives the operator at Control Point B an artificial busy indication to warn her that a call cannot be originated without causing interference with the busy transmitter at Control Point A.

As the mobile subscriber continues his westerly progress, his carrier will be picked up by receiver 3 at Control Point A which in turn will cause LS3 relay 703 at Control Point A to operate. The operation of LS3 relay 703 will in turn release LS4 relay 704 and the five-unit permutation code signal representing the letter D will be transmitted to Control Point B as an indication that receiver 4 at Control Point A is no longer receiving a signal. This will cause the release of WR relay 716 at Control Point A which in turn will release AB relay 914 and in turn extinguish busy lamp 501. As soon as this condition takes place, the operator at Control Point B may then handle traffic in the usual manner without causing interference.

*Mobile subscriber moves from intermediate receiver to a terminal receiver of one control point when radio transmitter at an adjacent control point is busy*

Assume now that the mobile subscriber is located at a point somewhere near receiver 2 which serves Control Point B. This corresponds to the position W shown on the highway in Fig. 1. Assume further that the transmitter at the adjacent west control point (Control Point A) is busy. When the mobile subscriber located at point W near receiver 2 of Control Point B originates a call, his carrier will be picked up by receiver 2 associated with Control Point B and the associated receiver selector circuit of Fig. 6 will function in the manner described hereinbefore to cause a ground to be applied to conductor 646 which extends through the winding of LS2 relay 702 to battery. The operation of LS2 relay 702, in the manner described hereinbefore, completes a circuit for the connection of the output of receiver 2 to the four-wire terminating network 417 at Control Point B. LS2 relay 702, in operating, locks operated over a circuit which may be traced from battery through the winding of LS2 relay 702, through back contact and armature 9 of LS1 relay 701, through front contact and armature 1 of LS2 relay 702, through back contact and armature 8 of LS3 relay 703, through back contact and armature 1 of LS4 relay 704, over conductor 719, through back contact and armature 1 of AB relay 914, through back contact and armature of TSA relay 908 to ground. LS2 relay 702, in operating, completes a circuit for lighting the R2 receiver lamp 507 in the switchboard at Control Point B. This circuit may be traced from battery through front contact and armature 6 of LS2 relay 702, over conductor 722, through R2 receiver lamp 507 to ground. In this manner, R2 lamp 507 is lighted to give a visual indication to the operator at Control Point B that receiver 2 has picked up a carrier signal from a mobile subscriber in the area served by Control Point B. LS2 relay 702, in operating, also completes a circuit for the operation of E relay 426. This circuit may be traced from battery through the winding of E relay 426 over conductor 431, through front contact and armature 8 of SQ relay 618 (SQ relay 618 operated when a usable signal is received), over conductor 729, through front contact and armature 5 of LS2 relay 702, over conductor 918, through back contact and armature 2 of AB relay 914 to ground.

The operation of E relay 426 will, as described hereinbefore, remove the locking ground from C relay 425 and allow this relay to release. The release of C relay 425 will cause line lamp 503 in the switchboard at Control Point B to light in the manner hereinbefore described. The lighting of the line lamp 503 in the switchboard at Control Point B gives a visual indication to the operator thereat that a mobile subscriber in the area served by Control Point B is originating a call over one of the receivers associated with Control Point B.

As assumed above, the transmitter at the adjacent west control point (Control Point A) is on the air, therefore, WT relay 715 at Control Point B will be operated. As described hereinbefore, when the transmitter at the adjacent west control point (Control Point A) is on the air, distributor 1606 at Control Point A operates to transmit the five-unit permutation code representing the letter W to Control Point B. The reception of this permutation code representing the letter W by non-typing selector 1350 at Control Point B will cause the W contacts of non-typing selector 1350 to operate and connect a ground to conductor 1358. This ground applied to conductor 1358 causes the operation of WT relay 715. WT relay 715 locked operated in the manner hereinbefore described to the ground supplied to conductor 1359 through the back contact and armature of the F contacts of non-typing selector 1350. WT relay 715, in operating completes a circuit for the lighting of the WT transmitter lamp 504 in the switchboard at Control Point B which gives a visual indication to the operator at Control Point B that the transmitter at Control Point A is on the air. This circuit may be traced from battery through front contact and armature 3 of WT relay 715, over conductor 726, through WT lamp 504 to ground.

The operator at Control Point B, upon seeing that line lamp 503 is lighted in response to a call originated over receiver 2 as above described, will insert the plug of an answering cord of one of the cord circuits 512 in line jack 502. This will result, as described hereinbefore, in the operation of SL relay 428 which, when operated, removes battery from conductor 430 to cause line lamp 503 to be extinguished. SL relay 428, in operating, also supplies battery to light busy lamp 501 and connects a ground through its front contact and armature 2 to operate D relay 427. D relay 427, in operating, completes a circuit for the reoperation of C relay 425 and connects battery through front contact and armature 1 of D relay 427, over conductor 432, through the winding of BL relay 409 to ground. BL relay 409, in operating in the manner hereinbefore described, places the transmitter at Control Point B in condition for transmitting to the mobile subscriber who is originating the call. The operation of BL relay 409 also connects a ground through its front contact and armature 2 over conductor 433 which extends through back contact and armature 4 of BTC relay 712, through armature 1 and back contact of BTB relay 713, over conductor 725, through the winding of TB relay 901 to battery. The operation of TB relay 901, as hereinbefore described, completes a circuit for the operation of TSB relay 909 and for the operation of LO5 relay 1405 and LO5 relay 1105. LO5 relay 1405 and LO5 relay 1105 are the code relays at Control Point B which control distributors 1606 and 1306, respectively, to cause them to transmit the letter W in the five-unit permutation code signals to the adjacent east control point and adjacent west control point, respectively. The transmission of the letter W to the adjacent control points will, in the manner hereinbefore described, cause the WT transmitter busy lamp at the adjacent east control point (Control Point C) and the ET transmitter busy lamp at the adjacent west control point (Control Point A) to be lighted to give an indication to the operators thereat that the transmitter at Control Point B is on the air.

The operation of TB relay 901, as described above, now completes a circuit for the operation of TS relay 707 which may be traced from battery through the winding of TS relay 707, over conductor 741, through front contact and armature 1 of TB relay 901, over conductor 742, through front contact and armature 2 of WT relay 715, through front contact and armature 7 of LS2 relay 702, over conductor 918, through back contact and armature 2 of AB relay 914 to ground. TS relay 707 locks operated over a circuit which may be traced from battery through the winding of TS relay 707, over conductor 741, through front contact and armature 1 of TB relay 901, over conductor 742, through front contact and armature 2 of WT relay 715, through front contact and armature 2 of TS relay 707, through back contact and armature 7 of LS3 relay 703, over conductor 918, through back contact and armature 2 of AB relay 914 to ground.

The fact that the transmitter at Control Point A is on the air limits the movement of the mobile subscriber in the direction of Control Point A for, if the mobile subscriber were to move into the area served by Control Point A, interference would result. However, in the opposite direction, that is, in the direction of Control Point C, there is no such limitation and the mobile subscriber can move in that direction and will not encounter any interference.

The operator at Control Point B, after determining the identity of the called subscriber from the mobile subscriber, will complete a connection as hereinbefore described over trunk 513 via cable 514 to the local telephone switching center 515 and from there to the called telephone subscriber.

Assume that during the course of the conversation between the mobile subscriber and the called telephone subscriber, the mobile subscriber moves in a westerly direction towards Control Point A to the point X indicated on the highway shown in Fig. 1. As the mobile subscriber approaches the area served by receiver 1 of Control Point B, his carrier will be picked up by receiver 1 and the receiver selector circuits of Fig. 6 will function in the manner described hereinbefore to transfer his call from receiver 2 to receiver 1. When this happens, a ground will be applied to conductor 645 which extends through the winding of LS1 relay 701 to battery and LS1 relay 701 will operate in the manner hereinbefore described and complete a circuit for the connection of the output of receiver 1 to the four-wire terminating network 417 at Control Point B.

The operation of LS1 relay 701 will open the holding circuit for LS2 relay 702 and this relay will release. The release of LS2 relay 702 will cause the R2 receiver lamp 507 in the switchboard at Control Point B to be extinguished. LS1 relay 701, in operating, locks operated over a circuit hereinbefore traced to the ground supplied through back contact and armature of TSA relay 908 and completes a circuit for the operation of LSA relay 708 which was hereinbefore described. LS1 relay 701, in operating, also completes a circuit for the operation of TMC relay 801 which in turn causes the operation of TMD relay 802 after a delay interposed by the time delay circuits associated with TMD relay 802, hereinbefore described.

Assume that the signal being received over receiver 1 at Control Point B has a merit rating of four which, in the manner described hereinbefore, will cause discharges to be initiated through triodes 1011, 1012, 1013 and 1014. As a consequence of these discharges, CM1 relay 1021, CM2 relay 1022, CM3 relay 1023 and CM4 relay 1024 will be operated and a circuit wil be completed from ground through front contact and armature 1 of LSA relay 708, over conductor 732, through front contact and armature 2 of CM4 relay 1024, over conductor 1208, through the winding of L4 relay 1204 in the west comparison circuit at Control Point B. The operation of L4 relay 1204 will, in the manner hereinbefore described, cause a ground to be applied to conductor 1217 which extends through the winding of WC relay 715 to battery. The operation of L4 relay 1204 also completes a circuit for the operation of LO4 relay 1104 which may be traced from ground through front contact and armature 4 of L4 relay 1204, over conductor 1216, through normal contacts of armature 1 of S4 relay 1114, through the winding of LO4 relay 1104, through back contact and armature 4 of G relay 1109 to battery. LO4 relay 1104 is the code relay in the west code relays at Control Point B which will control distributor 1306 to cause it to transmit the letter G in the five-unit permutation code signals to the adjacent west control point (Control Point A) as an indication that the signal being received over receiver 1 at Control Point B has a merit rating of four. Because the carrier signal from the mobile subscriber is not being received over the terminal receiver, that is receiver 4, of Control Point A, there will be no comparison made in the east comparison circuit of Fig. 15 at Control Point A or the west comparison circuit of Fig. 12 at Control Point B and the transmission of the letter G by distributor 1306 at this time performs no useful function.

L4 relay 1204, in operating does, however, in the manner described above, cause the operation of WC relay 815 which in turn completes a circuit for the operation of LA relay 705. This circuit may be traced from battery through the winding of LA relay 705, through front contact and armature 6 of LS1 relay 701, over conductor 730, through back contact and armature 3 of LF relay 905, over conductor 729, over conductor 818, through front contact and armature 1 of WC relay 815, through front contact and armature 2 of TMD relay 802, over conductor 819, through back contact and armature 7 of LS4 relay 704, over conductor 918, through back contact and armature 2 of AB relay 914 to ground. The operation of LA relay 705 completes a circuit for lighting the R1 receiver lamp 506 in the switchboard at Control Point B. This circuit may be traced from battery through front contact and armature of LA relay 705, over conductor 721, through R1 lamp 506 to ground.

The operation of WC relay 815 and TMD relay 802 also completes a circuit for the operation of E relay 426 which was hereinbefore described. The operation of E relay 426 at this time performs no function as C relay 425 is being held operated by D relay 427.

At this point, the operator at Control Point B has had a visual indication that the mobile subscriber has moved in a westerly direction and that his call was first received over receiver 2 and then over receiver 1. The operator knows that the transmitter at Control Point A is busy because WT lamp 504 is lighted and the operator knows that if the mobile subscriber continues in a westerly direction that he will run into interference from the transmitter at Control Point A.

When LSA relay 708 operated as above described after the operation of LS1 relay 701, a circuit was completed for the operation of TG relay 903. This circuit may be traced from battery through the winding of TG relay 903, over conductor 743, through front contact and armature 1 of TS relay 707, through front contact and armature 2 of LSA relay 708 to ground. The operation of TG relay 903 completes a circuit for the operation of 3M relay 910 which may be traced from ground through front contact and armature of TG relay 903, through the winding of 3M relay 910 to battery. The operation of 3M relay 910 completes a circuit for the connection of 110-volt, 60-cycle alternating-current source 916 through closed switch 915 to the winding of 3AM relay 911. 3AM relay 911 is an alternating-current relay which, when energized by 110-volt alternating-current voltage, will operate after a three minute delay. If the telephone conversation between the mobile subscriber and the called subscriber continues for three minutes after 3M relay 910 operates, 3AM relay 911 will operate and start an interrupter circuit by operating LF relay 905. LF relay 905, in operating completes a circuit for the operation of 1B relay 907 which may be traced from ground through front contact and armature 1 of LF relay 905, through back contact and armature 1 of 1A relay 906, through the winding of 1B relay 907 to battery. 1B relay 907, in operating, in turn operates 1A relay 906 and 1A relay 906, in operating, in turn releases 1B relay 907. The release of 1B relay 907 in turn releases 1A relay 906 which in turn reoperates 1B relay 907. The continued operation and release of 1A relay 906 and 1B relay 907 constitutes an interrupter circuit which results in the flashing of the R1 receiver lamp 506. The manner in which this interrupter circuit causes the flashing of R1 receiver lamp 506 will be seen by tracing the circuit for the operation of LA relay 705 which controls, in the manner described above, the lighting of R1 receiver lamp 506. The circuit for the operation of LA relay 705 may now be traced from battery through the winding of LA relay 705, through front contact and armature 6 of LS1 relay 701, over conductor 730, through front contact and armature 3 of LF relay 905, through front contact and armature 2 of 1A relay 906, through front contact and armature 2 of LF relay 905 to ground. Therefore, LA relay 705 wil operate and release each time 1A relay 906 operates and releases and the operation and release of LA relay 705 will in turn cause R1 receiver lamp 506 to flash.

The flash of R1 receiver lamp 506 at this time is a visual signal to the operator at Control Point B to halt the mobile subscriber as the mobile subscriber is heading into the interference or fringe area between Control Point A and Control Point B. R1 receiver lamp 506 will continue to flash during the remainder of the call unless the transmitter at Control Point A goes off the air. The operator will break in on the call between the mobile subscriber and the called telephone subscriber and request the mobile subscriber to halt his westerly progress until he has completed his conversation.

During the three-minute timing interval controlled by 3AM relay 911, if the transmitter at Control Point A goes off the air, WT relay 715 will release because, as described hereinbefore, when the transmitter at Control Point A goes off the air, the circuits at Control Point A function to cause the transmission of the five-unit permutation code for the letter F to Control Point B and the reception of the letter F by non-typing selector 1350 at Control Point B will cause the F contacts of non-typing selector 1350 to operate which will remove the locking ground for WT relay 715. The release of WT relay 715 in turn releases TS relay 707 which in turn releases TG relay 903. The release of TG relay 903 releases 3M relay 910 and stops the timing. If the three minutes had been consumed and 3AM relay 911 had been operated, the release of TS relay 707 would have released TG relay 903 which in turn would release 3M relay 910 and 3AM relay 911. The release of 3AM relay 911 will in turn release LF relay 905. The release of LF relay 905 stops the operation and release of the interrupter circuit consisting of 1A relay 906 and 1B relay 907 which in turn stops R1 receiver lamp from flashing and the lamp is then lighted in a steady fashion over the circuit hereinbefore traced. The change from a flashing lamp to a steady lamp of R1 receiver lamp 506 gives a visual indication to the operator at Control Point B that the mobile subscriber may proceed on into the fringe area between Control Point A and Control Point B without encountering interference because the transmitter of Control Point A is now off the air.

When the call between the mobile subscriber and the called telephone subscriber is completed, the carrier signal from the mobile subscriber's transmitter will no longer be received over receiver 1 at Control Point B and there will be no voltage developed on conductor 630 across the parallel combination of resistors 1001 through 1004. As a consequence of this, the discharges through triodes 1011 through 1014 will be extinguished and CM1 relay 1021, CM2 relay 1022, CM3 relay 1023 and CM4 relay 1024 which, as assumed above, were operated, will release. The release of CM4 relay 1024 will open the operating circuit for L4 relay 1204. Also, there will no longer be any output voltages from the longitudinal balancing unit 621 on conductors 601 and 611 and, as a consequence of this, A1 relay 651, TH relay 610 and SQ relay 618 in the receiver selector circuit of Fig. 6 will release. The release of SQ relay 618 will open the operating circuit for E relay 426 in the manner hereinbefore described and E relay 426 will release. The release of E relay 426 will again close the holding circuit for C relay 425 which was held operated by D relay 427. When the operator at the switchboard of Control Point B removes the plug from jack 502, the circuits function in the manner similar to that described hereinbefore and BL relay 409 releases and in turn releases TB relay 901. The release of TB relay 901 causes the circuits at Control Point B to function in the manner hereinbefore described to transmit disconnect signals consisting of the letter D and the letter F to the adjacent control points as an indication that receiver 1 and the transmitter at Control Point B are no longer busy. The release of TB relay 901 in the manner hereinbefore described restores the circuits at Control Point B to normal and Control Point B is now ready to receive a new call.

*Emergency call*

It will be observed from the description hereinbefore given that when a terminal receiver is engaged and the radio transmitter is on the air at an adjacent control point, no call can be handled at a local office because of the possibility of radio interference between the two transmitters. For example, if receiver 4 at Control Point A is engaged and the transmitter at Control Point A is on the air, a call may not be handled by Control Point B because of the possibility of radio interference. Provision has been made, however, to handle emergency calls under certain operating conditions. Assume now that the transmitter at Control Point A is on the air, that receiver 4 at Control Point A is engaged and that a mobile subscriber located at a point somewhere near receiver 3 which serves Control Point B desires to make an emergency call. The location of the mobile subscriber corresponds to the position U shown on the highway in Fig. 1.

At Control Point B, WR relay 716 has been operated in the manner hereinbefore described and is locked operated to the ground supplied over conductor 1361 through back contact and armature of the D contacts of non-typing selector 1350. WR relay 716, in operating, in turn operated LC relay 814 which in turn completed the circuit for lighting WR receiver lamp 505 in the switchboard at Control Point B. WT relay 715 at Control Point B has also been operated in the manner hereinbefore described and is locked operated to the ground supplied over conductor 1359 through back contact and armature of the F contacts of non-typing selector 1350. The operation of WT relay 715 completed a circuit for lighting WT lamp 504. The lighting of WR lamp 505 and WT lamp 504 gives a visual indication to the operator at Control Point B that the transmitter at Control Point A is on the air and that receiver 4 at Control Point A is engaged. With WT relay 715 and WR relay 716 operated a circuit is completed for the operation of AB relay 914 and TBA relay 902. AB relay 914 operates over the circuit traced from battery through the winding of AB relay 914, over conductor 924, over conductor 740, through front contact and armature 4 of WR relay 716, through front contact and armature 5 of WT relay 715 to ground. AB relay 914, in operating, opens the operating circuit for E relay 426 at Control Point B and thus prevents line lamp 503 at Control Point B from lighting except for emergency calls which will be described. The operation of AB relay 914 also completes a circuit for lighting busy lamp 501 in the manner hereinbefore described. The lighting of busy lamp 501 at this time provides an artificial busy at the switchboard at Control Point B to give a visual indication to the operator thereat that calls may not be handled except for emergencies because of the possibility of causing interference. The operation of AB relay 914 removes the common ground supplied to conductor 719 and thus prevents any of the LS relays of Fig. 7 from locking operated.

The concurrent operation of WT relay 715 and WR relay 716, as above-described, also completes a circuit for the operation of TBA relay 902 which may be traced from ground through front contact and armature 5 of WT relay 715, through front contact and armature 4 of WR relay 716 over conductor 740, over conductor 925, through the winding of TBA relay 902, through back contact and armature of 1AM relay 913 to battery. The operation of TBA relay 902 at this time opens the operating circuit for LO5 relay 1405 and LO6 relay 1406 in the east code relays of Fig. 14 at Control Point B and the LO5 relay 1105 and the LO6 relay 1106 in the west code relays of Fig. 11 at Control Point B. This will prevent distributors 1606 and 1306 at Control Point B from transmitting permutation code signals representing the letters F and W to the adjacent east control point and the adjacent west control point, respectively. The purpose of this will be described later. Assume now that the mobile subscriber who is located at point U on the highway shown in Fig. 1 operates the push-to-talk key on his radio transmitter to originate a call. When this happens, the carrier signal received from the mobile subscriber will be received over receiver 3 at Control Point B which, in the manner hereinbefore described, will cause the operation of LS3 relay 703. LS3 relay 703, in operating, cannot lock operated because, as hereinbefore described, the locking circuit for this relay has been opened by the operation of AB relay 914. LS3 relay 703, in operating, completes a circuit for lighting the R3 receiver lamp 508 in the switchboard at Control Point B. This gives a visual indication to the operator at Control Point B that a carrier signal from a mobile subscriber has been picked up by receiver 3 at Control Point B. The operation of LS3 relay 703 also completes a circuit for the operation of CE relay 807 which may be traced from ground through front contact and armature 4 of LS3 relay 703, over conductor 745, through front contact and armature 1 of WT relay 715, through front contact and armature 2 of WR relay 716, over conductor 847, through back contact and armature 2 of CA relay 808, through the winding of CE relay 807 to battery. CE relay 807, in operating, changes CA relay 808 from an open-circuit condition to a short-circuit condition. When the mobile subscriber releases the push-to-talk key on his radio transmitter, LS3 relay 703 releases and extinguishes R3 receiver lamp 508. The release of LS3 relay 703 will remove the ground supplied over conductor 847 which removes the short-circuit condition from CA relay 808. CA relay 808 then operates in series with CE relay 807 over a circuit which may be traced from battery through the winding of CE relay 807, through the winding of CA relay 808, through front contact and armature of CE relay 807, through back contact and armature of TMF relay 806, through back contact and armature 1 of CD relay 813, over conductor 849, through normal contacts of armature 3 of TB relay 901 to ground.

CA relay 808, in operating, completes a circuit for the operation of TME relay 805 and transfers the operating ground supplied from LS3 relay 703 over conductor 847 from CE relay 807 to CF relay 809. The circuit for operating TME relay 805 may be traced from ground through front contact and armature 1 of CA relay 808, through back contact and armature 2 of CF relay 809, through the winding of TME relay 805 to battery. TME relay 805, in operating, removes a shunt from around condenser 834, applies a ground to the winding of TMF relay 806 and completes a circuit for the operation of TMA relay 803. The circuit consisting of cold cathode tube 822, resistor 833 and condenser 834 comprises a time delay circuit which is interposed between TME relay 805 and TMF relay 806 so that the operation of TMF relay 806 may be delayed a desired interval after TME relay 805 operates. This time delay circuit operates in the same fashion as the time delay circuit hereinbefore described interposed between TMC relay 801 and TMD relay 802. The purpose of delaying the operation of TMF relay 806 after the operation of TME relay 805 will be discussed below. TME relay 805, in operating, completes a circuit which may be traced from ground through normal contacts of armature 3 of TB relay 901, over conductor 849, through back contact and armature 1 of CD relay 813, through front contact and armature 1 of TME relay 805, through the winding of TMA relay 803, thus operating TMA relay 803.

TMA relay 803, in operating, removes the shunt from around condenser 829, applies a ground to the winding of TMB relay 804, completes a circuit for the operation of D relay 427 and completes a circuit for the operation of BTC relay 712. The circuit consisting of cold cathode tube 821, resistor 828 and condenser 829 comprises a time delay circuit which is interposed between TMA relay 803 and TMB relay 804 so that the operation of TMB relay 804 may be delayed a desired interval after the operation of TMA relay 803. This time delay circuit operates in the same fashion as the time delay circuit hereinbefore described interposed between TMC relay 801 and TMD relay 802. The purpose of delaying the operation of TMB relay 804 after the operation of TMA relay 803 will be discussed below. The circuit for the operation of D relay 427 which is completed by the operation of TMA relay 803 may be traced from ground through back contact and armature of TMB relay 804, through front contact and armature 1 of TMA relay 803, over conductor 843, through the winding of D relay 427 to battery. D relay 427, in operating, completes a circuit for the operation of BL relay 409 which may be traced from battery through front contact and armature 1 of D relay 427, over conductor 432, through the winding of BL relay 409 to ground. BL relay 409, in operating, turns on transmitter 355 at Control Point B in the manner hereinbefore described and applies a ground through front contact and armature 2 of BL relay 409 to conductor 433. The circuit completed by the operation of TMA relay 803 for the operation of BTC relay 712 may be traced from ground through back contact and armature of TMB relay 804, through front contact and armature 2 of TMA relay 803, over conductor 848, through the winding of BTC relay 712 to battery. BTC relay 712, in operating, connects BTA relay 711 to interrupter 748 which supplies ground through front contact and armature 2 of BTC relay 712 to the winding of BTA relay 711 at 60 interruptions a minute. In this manner, BTA relay 711 operates and releases at the rate of 60 times a minute. The operation of BTC relay 712 opens the circuit for the operation of TB relay 901 at armature 4 of BTC relay 712 and completes a circuit for the operation of BTB relay 713. BTB relay 713 operates over the circuit traced from battery through the winding of BTB relay 713, through front contact and armature 4 of BTC relay 712 to the ground supplied over conductor 433 from BL relay 409. BTB relay 713, in operating, locks operated to this same ground independently of BTC relay 712. BTC relay 712, in operating also opens the leads from four-wire terminating network 417 to the receiver selector circuit of Fig. 6 and connects these leads to tone supply 747 and ground which causes busy tone interrupted at a rate of 60 interruptions a minute to be supplied to four-wire terminating network 417 which in turn causes transmitter 355 at Control Point B to transmit a busy tone signal to the calling mobile subscriber. The circuit for supplying busy tone to the four-wire terminating network 417 may be traced from tone supply 747, through condenser 746, through front contact and armature of BTA relay 711, through front contact and armature 2 of BTC relay 712 to one of the conductors of conductor-pair 720 and from ground through condenser 749, through front contact and armature 3 of BTC relay 712 to the other conductor of conductor-pair 720, over conductor-pair 720, through amplifier 415, conductor-pair 416 to four-wire terminating network 417. Because BTA relay 711 operates and releases 60 times a minute, the tone supplied from tone supply 720 to four-wire terminating network 417 will be interrupted at this same rate and transmitter 355 at Control Point B will transmit this busy tone to the calling mobile subscriber. This busy tone is transmitted to the calling mobile subscriber for a predetermined interval which is governed by the time delay circuit interposed between TMA relay 803 and TMB relay 804. When TMB relay 804 operates after this predetermined delay, the grounds for holding D relay 427 operated and BTC relay 712 operated are removed and these relays release. The release of D relay 427 in turn releases BL relay 409 which shuts off the transmitter 355 at Control Point B. BL relay 409 in turn removes the ground supplied over conductor 433 to which BTB relay 713 is held operated and BTB relay 713 releases. The removal of the operating ground from BTC relay 712 causes this relay to release which in turn releases BTA relay 711.

When the mobile subscriber hears the busy tone transmitted from transmitter 355 at Control Point B, he knows that the circuits at Control Point B are busy. However, he has been instructed previously that in case of an emergency he may operate the push-to-talk key of his radio transmitter four times in succession which will signal the operator at Control Point B to indicate that he is originating an emergency call. Assume now that the mobile subscriber is originating an emergency call. He will, therefore, operate the push-to-talk key of his radio transmitter a second time. His carrier signal will again be received over receiver 3 at Control Point B which will cause the operation of LS3 relay 703 at Control Point B. The operation of LS3 relay 703 will again light R3 receiver lamp 508 and a circuit will also be completed for the operation of CF relay 809. This circuit may be traced from ground through front contact and armature 4 of LS3 relay 703, over conductor 745, through front contact and armature 1 of WT relay 715, through front contact and armature 2 of WR relay 716, over conductor 847, through front contact and armature 2 of CA relay 808, through back contact and armature 2 of CB relay 810, through the winding of CF relay 809 to battery. CF relay 809, in operating, changes CB relay 810 from an open-circuit condition to a short-circuit condition. CF relay 809, in operating, also releases TME relay 805 and TME relay 805, in releasing, in turn releases TMA relay 803. When the push-to-talk key of the mobile subscriber's radio transmitter is released the second time, LS3 relay 703 releases again and extinguishes R3 receiver lamp 508 in the switchboard at Control Point A. The release of LS3 relay 703 removes the short-circuit condition from CB relay 810 and allows CB relay 810 to operate in series with CF relay 809 over a circuit which may be traced from battery through the winding of CF relay 809, through the winding of CB relay 810, through front contact and armature 1 of CF relay 809, through back contact and armature of TMF relay 806, through back contact and armature 1 of CD relay 813, over conductor 849, through normal contacts of armature 3 of TB relay 901 to ground. CB relay 810, in operating, transfers the operating ground supplied from LS3 relay 703 over conductor 847 from CF relay 809 to CG relay 811. CB relay 810, in operating, also reoperates TME relay 805 over a circuit which may be traced from battery through the winding of TME relay 805, through front contact and armature 2 of CF relay 809, through front contact and armature 1 of CB relay 810, through back contact and armature 2 of CG relay 811 to ground. TME relay 805, in operating, reoperates TMA relay 803, starts the time delay circuit interposed between TME relay 805 and TMF relay 806 and grounds the winding of TMF relay 806. TMA relay 803, in reoperating, in turn reoperates D relay 427 over the circuit previously traced, starts the time delay circuit interposed between TMA relay 803 and TMB relay 804, grounds the winding of TMB relay 804 and operates BTC relay 712. D relay 427, in turn operates BL relay 409 which turns on transmitter 355 at Control Point B. BTC relay 712, in operating, in turn operates BTA relay 711 and completes a circuit for the operation of BTB relay 713. These relays function in the manner hereinbefore described to cause the busy tone to be transmitted to the mobile subscriber by transmitter 355 at Control Point B for the second time. After the busy tone has been transmitted for the predetermined interval determined by the time delay circuit interposed between TMA relay 803 and TMB relay 804, TMB relay 804 operates and causes the release, in the manner hereinbefore described, of D relay 427, BL relay 409, BTC relay 712, BTA relay 711 and BTB relay 713.

When the mobile subscriber hears the busy tone for the second time, he will again operate the push-to-talk key of his radio transmitter. When the carrier signal from the mobile subscriber is received the third time, LS3 relay 703 is again operated and lights R3 receiver lamp 508 in the switchboard at Control Point B. When LS3 relay 703 operates, it completes a circuit for the operation of CG relay 811 which may be traced from ground through front contact and armature 4 of LS3 relay 703, over conductor 745, through front contact and armature 1 of WT relay 715, through front contact and armature 2 of WR relay 716, over conductor 847, through front contact and armature 2 of CA relay 808, through front contact and armature 2 of CB relay 810, through back contact and armature 2 of CC relay 812, through the winding of CG relay 811 to battery. CG relay 811, in operating, changes CC relay 812 from an open-circuit condition to a short-circuit condition and release TME relay 805. TME relay 805, in releasing, in turn releases TMA relay 803. When the mobile subscriber releases the push-to-talk key of his radio transmitter for the third time, LS3 relay 703 releases and extinguishes R3 receiver lamp 508. The release of LS3 relay 703 removes the short-circuit condition on CC relay 812 and CC relay 812 operates in series with CG relay 811 over a circuit which may be traced from battery through the winding of CG relay 811, through the winding of CC relay 812, through front contact and armature 1 of CG relay 811, through back contact and armature of TMF relay 806, through back contact and armature 1 or CD relay 813, over conductor 849, through normal contacts of armature 3 of TB relay 901 to ground. CC relay 812, in operating, transfers the operating ground supplied from LS3 relay 703 over conductor 847 from CG relay 811 to CD relay 813. CC relay 812, in operating, also reoperates TME relay 805. TME relay 805, in operating, reoperates TMA relay 803, starts the time delay circuit interposed between TME relay 805 and TMF relay 806 and grounds the winding of TMF relay 806. TMA relay 803, in reoperating, in turn reoperates D relay 427 over the circuit previously traced, starts the time delay circuit interposed between TMA relay 803 and TMB relay 804, grounds the winding of TMB relay 804 and operates BTC relay 712. D relay 427 in turn operates BL relay 409 which turns on transmitter 355 at Control Point B. BTC relay 712, in operating, in turn operates BTA relay 711 and completes a circuit for the operation of BTB relay 713. These relays function in the manner hereinbefore described to cause the busy tone to be transmitted to the mobile subscriber by transmitter 355 at Control Point B for the third time. After the busy tone has been transmitted for the predetermined interval determined by the time delay circuit interposed between TMA relay 803 and TMB relay 804, TMB relay 804 operates and causes the release, in the manner hereinbefore described, of D relay 427, BL relay 409, BTC relay 712, BTA relay 711 and BTB relay 713. When the mobile subscriber hears the busy tone for the third time, he will again operate the push-to-talk key of his radio transmitter. When the carrier signal from the mobile subscribed is received the fourth time, LS3 relay 703 is again operated and lights R3 receiver lamp 508 in the switchboard at Control Point B. When LS3 relay 703 operates, it now completes a circuit for the operation of CD relay 813 which may be traced from ground through front contact and armature 4 of LS3 relay 703, over conductor 745, through front contact and armature 1 of WT relay 715, through front contact and armature 2 of WR relay 716, over conductor 847, through front contact and armature 2 of CA relay 808, through front contact and armature 2 of CB relay 810, through front contact and armature 2 of CC relay 812, through the winding of CD relay 813 to battery. CD relay 813, in operating, locks operated under control of TB relay 901 over a circuit traced from battery through the winding of CD relay 813, through front contact and armature 1 of CD relay 813, over conductor 849, through normal contacts of armature 3 of TB relay 901 to ground. CD relay 813, in operating, connects ground through its armature 2 and front contact to conductor 729. The ground on conductor 729 is extended through front contact and armature 8 of SQ relay 618, over conductor 431, through the winding of E relay 426 to battery. The operation of E relay 426 will, as described hereinbefore, remove the locking ground from C relay 425 and allow this relay to release. The release of C relay 425 will cause line lamp 503 in the switchboard position at Control Point B to light over a circuit traced from battery through back contact and armature 1 of C relay 425, through back contact and armature 1 of SL relay 428, over conductort 430, to ground through line lamp 503. The lighting of the line lamp 503 in the switchboard position at Control Point B gives a visual indication to the operator that a mobile subscriber is originating an emergency call. The operator at the switchboard position at Control Point B knows that the lighting of line lamp 503 at this time indicates that an emergency call is being initiated by a mobile subscriber in the area served by Control Point B because WT lamp 504 and WR lamp 505 are lighted and the line lamp, under normal circumstances, cannot be lighted during the time that these two lamps are lighted.

CD relay 813, in operating, releases CA relay 808, CB relay 810, CC relay 812, CE relay 807, CF relay 809, CG relay 811 and TMA relay 803. The release of CC relay 812 in turn releases TME relay 805.

The operator at the switchboard of Control Point B, upon seeing that line lamp 503 is lighted in response to the emergency call originated over receiver 3 as above-described, will insert the plug of an answering cord of one of the cord circuits 512 in line jack 502. This will result, as described hereinbefore, in the operation of SL relay 428 which, when operated, removes the battery from conductor 430 and causes line lamp 503 to be extinguished. SL relay 428, in operating, also supplies battery to light busy lamp 501 in the switchboard position at Control Point B in the manner hereinbefore described. SL relay 428, in operating, also connects a ground through its front contact and armature 2 to operate D relay 427 and D relay 427, in operating, completes a circuit for the reoperation of C relay 425. D relay 427, in operating, connects battery through its front contact and armature 1 over conductor 432 through the winding of BL relay 409 to ground. BL relay 409, in operating, turns on transmitter 355 at Control Point B and connects a ground through its front contact and armature 2 through to conductor 433 which extends through armature 4 and back contact of BTC relay 712, through armature 1 and back contact of BTB relay 713, over conductor 725, through the winding of TB relay 901 to battery, causing TB relay 901 to operate. TB relay 901, in operating, releases CD relay 813 which in turn removes the ground connected to conductor 729 which extends through front contact and armature 8 of SQ relay 618, over conductor 431 to E relay 426 and E relay 426 releases. TB relay 901, in operating, also completes a circuit for the operation of TSB relay 909, which serves no useful purpose at this time, and for the operation of 1M relay 912. The circuit for the operation of 1M relay 912 may be traced from battery through the winding of 1M relay 912, through front contact and armature 4 of TB relay 901, over conductor 740, through front contact and armature 4 of WR relay 716, through front contact and armature 5 of WT relay 715 to ground. 1M relay 912, in operating, completes a circuit for the connection of 110-volt 60-cycle alternating-current source 916 through closed switch 915 to the winding of 1AM relay 913. 1AM relay 913 is an alternating-current relay which, when energized by 110-volt alternating-current voltage, will operate after a one-minute delay.

The operator either takes the emergency message from the mobile subscriber or completes a connection, as previously described, to a called telephone subscriber. If the conversation between the mobile subscriber and the called telephone subscriber exceeds one minute in duration, 1AM relay 913 operates which removes the battery from the operating circuit of TBA relay 902 allowing this relay to release. The release of TBA relay 902 closes a circuit which may be traced from ground through back contact and armature 2 of TBA relay 902, through front contact and armature 5 of TB relay 901, over conductor 920, through normal contacts of armature 1 of S5 relay 1115 through the winding of LO5 relay 1105, through back contact and armature 5 of G relay 1109 to battery. The release of TBA relay 902 also completes a circuit from ground through back contact and armature 2 of TBA relay 902, through front contact and armature 5 of TB relay 901, over conductor 919, through normal contacts of armature 1 of S5 relay 1415, through the winding of LO5 relay 1405, through back contact and armature 5 of G relay 1409 to battery. LO5 relay 1105 and LO5 relay 1405 are the code relays which control distributors 1306 and 1606, respectively, to cause them to transmit the letter W in the five-unit permutation code signal to the adjacent west control point and the adjacent east control point, respectively, in the manner hereinbefore described. If the emergency call initiated by the mobile subscriber lasts for longer than one minute, signals are then transmitted to the adjacent control point indicating that the transmitter at Control Point B is on the air. The operator at Control Point B will monitor the call to determine if the transmitter at Control Point A causes interference. If the transmitter at Control Point A does cause interference, the operator at Control Point B will then contact the operator at Control Point A via trunk 523 in cable 525, as hereinbefore described, and request that the operator at Control Point A silence the radio transmitter at Control Point A until the emergency call has been completed. When the transmitter at Control Point A goes off the air, WT relay 715 and WR relay 716 at Control Point B will be released in the manner hereinbefore described, and the release of these two relays will in turn release AB relay 914 and the release of AB relay 914 restores the locking ground to the LS relays of Fig. 7 and the circuits at Control Point B function in the manner hereinbefore described. When the emergency call terminates, the plug of the cord is removed from the line jack 502 releasing all of the relays and extinguishing all of the lamps in the manner hereinbefore described.

When the call originated by the mobile subscriber located at point U on the highway shown in Fig. 1 is not an emergency call, busy tone will be transmitted by transmitter 355 at Control Point B to the mobile subscriber in response to the first operation of the mobile subscriber's radio transmitter and because this is not an emergency call, the mobile subscriber will not repeat the operation of the push-to-talk key on his transmitter four successive times in the manner above described. After the operation of TMB relay 804 hereinbefore described, the timing circuit interposed between TME relay 805 and TMF relay 806 will operate and at the end of a predetermined interval, TMF relay 806 will operate. TMF relay 806, in operating, will release CA relay 808 and CE relay 807 which will time out the call and prevent the line lamp at Control Point B from lighting. To initiate an emergency call, the mobile subscriber must operate his push-to-talk key four times in succession at the predetermined rate in order to complete the chain of operations described above. If too much time elapses between the repeated operations of the push-to-talk key of the mobile subscriber's radio transmitter, TMF relay 806 will operate and release the previously operated relays.

*Outgoing call to mobile subscriber*

When a call is originated from a telephone subscriber, such as subscriber 516 shown in Fig. 5, the mobile radio operator will be signaled by the lighting of the line lamp associated with trunk 513 in a manner well known in the telephone art. The mobile radio operator will, after learning the call designation of the desired mobile subscriber, insert the plug of one of the cord circuits 512 in jack 502 which, in the manner hereinbefore described, will cause the transmitter at that control point to be placed in a transmitting condition. The operator then signals the desired mobile subscriber by dialing the call designation of the called subscriber and selective signaling oscillator 418 functions in the manner well known in the telephone art to transmit a plurality of frequencies to the called mobile subscriber. The reception of these frequencies at the called mobile subscriber's set in turn actuate circuits and operate a signal light and bell thereat. The called mobile subscriber answers by operating the push-to-talk key of his radio transmitter which in turn causes the carrier signal to be transmitted. This carrier signal from the called mobile subscriber is picked up by one of the radio receivers along the highway and results in the operation of one of the LS relays of Fig. 7 in the manner hereinbefore described and the circuits at the control point originating the call function to transmit the appropriate permutation code signals to the adjacent east and west control points as an indication that the transmitter is on the air. At the end of the call, the cord is withdrawn from jack 502 which releases the circuits at the control point, as described hereinbefore, and the circuits restore to normal and are ready to handle a new call.

What is claimed is:

1. In a mobile radio telephone system having a plurality of operator stations, a radio transmitter and a plurality of radio receivers connected to each of said stations, said stations being located at spaced intervals along a route of travel of mobile units equipped with radio sets, receiver indicator means at each of said stations for indicating which of the receivers connected thereto and which of the receivers connected to the stations adjacently located thereto are receiving radio transmission from said mobile units, transmitter indicator means at each of said stations for indicating which of the transmitters connected to said stations adjacently located thereto are transmitting to said mobile units, a control lead extending from each of said stations to each of said stations adjacently located thereto, transmitter control means at each of said stations for controlling the operation of the transmitter connected thereto, means at each of said stations responsive to the reception of radio transmission over the receivers connected thereto for operating the associated receiver indicator means thereat, means at each of said stations responsive to the reception of radio transmission over the receivers connected thereto for operating over the control lead extending to each of said stations adjacently located thereto the associated receiver indicator means thereat, means at each of said stations controlled by said transmitter control means thereat when the transmitter thereat is operated for operating over said control lead extending to each of said stations adjacently located thereto the associated transmitter indicator means thereat, and means at each of said stations responsive to the reception of radio transmission from said mobile units over certain of the receivers thereat and controlled by the transmitter indicator means thereat when operated for intermittently operating the receiver indicator means thereat which is associated with said certain of the receivers thereat.

2. In a mobile radio telephone system having a plurality of operator stations, a radio transmitter and a plurality of radio receivers connected to each of said stations, said stations being located at spaced intervals along a route of travel of mobile units equipped with radio sets, receiver indicator means at each of said stations for indicating which of the receivers connected thereto and which of the receivers connected to the stations adjacently located thereto are receiving radio transmission from said mobile units, transmitter indicator means at each of said stations for indicating which of the transmitters connected to said stations adjacently located thereto are transmitting to said mobile units, a control lead extending from each of said stations to each of said stations adjacently located thereto, transmitter control means at each of said stations for controlling the operation of the transmitter connected thereto, means at each of said stations responsive to the reception of radio transmission over the receivers connected thereto for operating the associated receiver indicator means thereat, means at each of said stations responsive to the reception of radio transmission over the receivers connected thereto for operating over the control lead extending to each of said stations adjacently located thereto the associated receiver indicator means thereat, means at each of said stations controlled by said transmitter control means thereat when the transmitter thereat is operated for operating over said control lead extending to each of said stations adjacently located thereto the associated transmitter indicator means thereat, busy indicator means at each of said stations, means at each of said stations controlled by the transmitter control means thereat for operating the busy indicator means thereat when the transmitter connected thereto is operated, and busy control means at each of said stations responsive to the concurrent operation of certain of the receiver indicator means thereat and certain of the transmitter indicator means thereat for operating said busy indicator means thereat.

3. The system of claim 2 in combination with a line signal indicator means at each of said stations, responsive means at each of said stations responsive to the reception of radio transmission over the receivers connected thereto for operating the line signal indicator means thereat and blocking means at each of said stations controlled by said busy control means thereat for preventing the operation of said responsive means thereat whereby said responsive means is prevented from operating the line signal indicator means thereat when said certain of the receiver indicator means thereat and said certain of the transmitter indicator means thereat are operated.

4. The system of claim 3 in combination with means at each of said stations controlled by said busy control means thereat and responsive to the reception of radio transmission over the receivers connected thereto when said certain of the receiver indicator means thereat and said certain of the transmitter indicator means thereat are operated for controlling the transmitter connected thereto to transmit a busy tone signal.

5. The system of claim 4 in combination with means at each of said stations responsive to the reception of a special emergency signal from any of said mobile units over the receivers connected thereto when the line signal indicator means thereat is prevented from operating by said blocking means thereat for operating the said line signal indicator means thereat to signal the operator that an emergency call is being originated.

6. In a mobile radio telephone system having a plurality of operator stations each of which includes a radio terminal and an operator's switchboard, a radio transmitter and a plurality of radio receivers associated with each of said stations and connected to the terminal thereat, the transmitter and receivers associated with all of said stations being located at spaced intervals along a route of travel of mobile units equipped with radio sets so that the coverage area of each transmitter overlaps the coverage area of the transmitters adjacently located thereto and the coverage area of each receiver overlaps the coverage area of the receivers adjacently located thereto, receiver indicator means at each of said stations for indicating which of the receivers associated therewith and which of the adjacently located receivers associated with other stations of said system adjacently located thereto are receiving radio transmission from said mobile units, transmitter indicator means at each of said stations for indicating which of the transmitters associated with said other stations adjacently located thereto are transmitting to said mobile units, a line signal indicator means in the switchboard at each of said stations for signaling the operator thereat, transmitter control means at each of said stations for controlling the operation of the transmitter associated therewith, means responsive to the reception of radio transmission from one of said mobile units over the receivers associated with any of said stations for operating the associated receiver indicator means thereat and the associated receiver indicator means at the said other stations adjacently located thereto, means controlled by said transmitter control means at any of said stations for operating the associated transmitter indicator means at the said other stations adjacently located thereto, determining means responsive to the concurrent reception of the same radio transmission from one of said mobile units by receivers associated with two adjacently located stations of said system for determining which of the receivers at said two adjacently located stations is receiving the most desirable radio transmission and means controlled by said determining means for operating the line signal indicator means in the switchboard at the one of said two adjacently located stations whose associated receiver is determined to be receiving the most desirable radio transmission.

7. The system of claim 6 in combination with means controlled by said determining means for preventing the operation of the line signal indicator means in the switchboard at the other of said two adjacently located stations whose associated receiver is determined to be receiving the less desirable radio transmission.

8. The system of claim 7 in combination with means controlled by said determining means for releasing the receiver indicator means at the said one of said two adjacently located stations corresponding to the receiver associated therewith when the radio transmission received thereby becomes weaker than the same radio transmission concurrently received by the receiver associated with the said other of the said two adjacently located stations and means controlled by said determining means for intermittently operating the receiver indicator means at the said one of the said two adjacently located stations corresponding to the receiver associated with the said other of the said two adjacently located stations concurrently receiving the stronger radio transmission.

9. The system of claim 8 in combination with means for transferring the supervision of a call from one of said mobile units supervised by the said one of said two adjacently located stations to the said other of the said two adjacently located stations when the radio transmission received by the receiver associated with the said other of the said two adjacently located stations becomes stronger than the same radio transmission received by the receiver associated with the said one of said two adjacently located stations.

10. In a mobile radio telephone system having a plurality of fixed stations each of which includes a radio transmitter, a plurality of radio receivers and a communication channel to a telephone switching center, said fixed stations being located at spaced intervals along a route of travel of mobile units equipped with radio sets, the transmitters and receivers of all fixed stations of said system being located so that the service area of each transmitter overlaps that of the adjacently located transmitter and the service area of each receiver overlaps that of the adjacently located receiver, automatic receiver selecting means at each of said stations for selecting the receiver thereat receiving the most desirable transmission of a signal simultaneously received by other receivers at the same station, means at each of said stations controlled by said receiver selecting means for connecting the selected one of said receivers to said communication channel and rejecting the other receivers at the same station, signal display lamps at each of said stations associated with each receiver and transmitter thereat, other signal display lamps at each of said stations associated with the transmitters and certain of the receivers at adjacently located stations, means at each of said stations controlled by the said selecting means thereat and responsive to the reception of a signal by any of the receivers thereat for lighting the associated one of said signal display lamps thereat, means at each of said stations responsive to the release of any of the receivers thereat when signals cease to be received thereby for extinguishing the associated lighted one of said signal display lamps thereat, a control network interconnecting said stations, control means at each of said stations for transmitting controlling signals to adjacently located stations of said system, means at each of said stations controlled by the said selecting means thereat and responsive to the reception of a signal by certain of the receivers thereat for operating said control means whereby controlling signals are transmitted over said network to adjacently located stations to selectively light the associated said other signal display lamps at adjacently located stations to identify the particular operated one of said certain receivers, means at each of said stations controlled by the operation of the transmitter thereat for operating said control means whereby controlling signals are transmitted over said network to adjacently located stations of said system to selectively light the associated said other signal display lamps at adjacently located stations to identify the particular operated transmitter, means at each of said stations responsive to the release of certain of the receivers thereat when signals cease to be received thereby for operating said control means whereby controlling signals are transmitted over said network to adjacently located stations to extinguish the associated lighted one of said other signal display lamps at adjacently located stations and means at each of said stations responsive to the release of the transmitter thereat for operating said control means whereby controlling signals are transmitted over said control network to adjacently located stations to extinguish the associated lighted one of said other signal display lamps at adjacently located stations.

11. A mobile radio telephone system comprising a plurality of telephone switching centers each having a plurality of telephones connected thereto, a plurality of control centers located at spaced intervals along a route of travel of mobile units equipped with radio sets, each of said control centers being equipped with a radio transmitter, a plurality of radio receivers and an operator's switchboard, means at each of said control centers including the radio transmitter, the radio receivers and the switchboard thereat for establishing through said switching centers a communication channel between said mobile units and said telephones, indicator means at each of said control centers associated with each receiver and the transmitter thereat, other indicator means at each of said control centers associated with the transmitters and certain of the receivers at adjacently located control centers, means at each of said control centers responsive to the reception of a signal by any of the receivers thereat for operating the associated one of said indicator means thereat, means at each of said control centers responsive to the release of any of the receivers thereat when signals cease to be received thereby for releasing the associated operated one of said indicator means thereat, a control network interconnecting said control centers, impulse transmitting means at each of said control centers for transmitting coded signal impulses over said network to adjacently located control centers, means at each of said control centers responsive to the reception of a signal by certain of the receivers thereat for controlling said impulse transmitting means whereby said impulse transmitting means transmits coded signal impulses to adjacently located control centers to indicate that a signal is being received by said certain of said receivers, means at each of said control centers responsive to the release of said certain of the receivers thereat when signals cease to be received thereby for controlling said impulse transmitting means whereby said impulse transmitting means transmits coded signal impulses to adjacently located control centers to indicate that certain of said receivers have ceased receiving a signal, means at each of said control centers controlled by the operation of the transmitter thereat for controlling said impulse transmitting means whereby said impulse transmitting means transmits coded signal impulses to adjacently located control centers to indicate that the transmitter is operating, means at each of said control centers responsive to the release of the transmitter thereat for controlling said impulse transmitting means whereby said impulse transmitting means transmits coded signal impulses to adjacently located control centers to indicate that the transmitter is released, impulse receiving means at each of said control centers responsive to the coded signal impulses received over said network from adjacently located control centers and means at each of said control centers controlled by said impulse receiving means thereat for selectively operating said other indicator means thereat whereby said other indicator means at each of said control centers which are associated with the transmitters at adjacently located control centers are operated when these transmitters are operating and whereby said other indicator means at each of said control centers which are associated with certain of the receivers at adjacently located control centers are operated when these receivers are receiving a signal.

12. A mobile radio telephone system comprising a plurality of telephone switching centers each having a plurality of telephones connected thereto, a plurality of control centers located at spaced intervals along a route of travel of mobile units equipped with radio sets, each of said control centers being equipped with a radio transmitter, a plurality of radio receivers and an operator's switchboard, means at each of said control centers including the radio transmitter, the radio receivers and the switchboard thereat for establishing through said switching centers a communication channel between said mobile units and said telephones, indicator means at each of said control centers associated with each receiver and the transmitter thereat, other indicator means at each of said control centers associated with the transmitters and certain of the receivers at adjacently located control centers, means at each of said control centers responsive to the reception of a signal by any of the receivers thereat for operating the associated one of said indicator means thereat, means at each of said control centers responsive to the release of any of the receivers thereat when signals cease to be received thereby for releasing the associated operated one of said indicator means thereat, a control network interconnecting said control centers, impulse transmitting means at each of said control centers for transmitting coded signal impulses over said network to adjacently located control centers, means at each of said control centers responsive to the reception of a signal by certain of the receivers thereat for controlling said impulse transmitting means whereby said impulse transmitting means transmits coded signal impulses to adjacently located control centers to indicate that a signal is being received by said certain of said receivers, means at each of said control centers responsive to the release of said certain of the receivers thereat when signals cease to be received thereby for controlling said impulse transmitting means whereby said impulse transmitting means transmits coded signal impulses to adjacently located control centers to indicate that certain of said receivers have ceased receiving a signal, means at each of said control centers controlled by the operation of the transmitter thereat for controlling said impulse transmitting means whereby said impulse transmitting means transmits coded signal impulses to adjacently located control centers to indicate that the transmitter is operating, means at each of said control centers responsive to the release of the transmitter thereat for controlling said impulse transmitting means whereby said impulse transmitting means transmits coded signal impulses to adjacently located control centers to indicate that the transmitter is released, impulse receiving means at each of said control centers responsive to the coded signal impulses received over said network from adjacently located control centers and means at each of said control centers controlled by said impulse receiving means thereat for selectively operating and releasing said other indicator means thereat whereby said other indicator means at each of said control centers which are associated with the transmitters at adjacently located control centers are operated when these transmitters are operating and whereby said other indicator means at each of said control centers which are associated with certain of the receivers at adjacently located control centers are operated when these receivers are receiving a signal.

13. The combination according to claim 12 in which the indicator means at each of the control centers comprises signal lamps, each of said signal lamps being associated with each of the receivers and the transmitter thereat and the transmitter and certain of the receivers at the adjacently located control centers.

14. The combination according to claim 12 in which the impulse transmitting means at each of said control centers comprises teletypewriter distributors which transmit teletypewriter permutation code signals over said control network to adjacently located control centers.

15. The combination according to claim 12 in which the impulse receiving means at each of said control centers comprises teletypewriter non-typing selectors which receive coded signal impulses transmitted over said network from the adjacently located control centers.

16. In a mobile radio telephone system having a plurality of stations each of which includes a radio transmitter and a plurality of radio receivers, indicator means at each of said stations for indicating when a call to be handled thereat is received over the receivers thereat, rating means at each of said stations responsive to the reception of signals over the receivers thereat for assigning merit ratings to said received signals, said merit ratings being indicative of the desirability of said received signals, a control network interconnecting said stations, transmitting means at each of said stations controlled by the rating means thereat for transmitting signal codes representing the merit ratings of the signals received thereat over said control network to other stations of said system, comparison means at each of said stations controlled by the rating means thereat and the transmitting means at said other stations of said system for comparing the merit rating of a signal received thereat with the merit rating of the same signal simultaneously received at said other stations of said system, means at each of said stations controlled by the comparison means thereat for operating the indicator means thereat when the merit rating of a signal received over one of the receivers thereat is higher than the merit rating of the same signal simultaneously received over the receivers at said other stations of said system and means at each of said stations controlled by the comparison means thereat for preventing the operation of the indicator means thereat when the merit rating of a signal received over one of the receivers thereat is lower than the merit rating of the same signal simultaneously received over one of the receivers at said other stations of said system.

17. In a mobile radio telephone system having a plurality of fixed stations each of which includes a radio transmitter and a plurality of radio receivers, a signal indicator lamp at each of said stations the lighting of which is a visual indication that a call to be handled thereat is being received over one of the receivers thereat, rating means at each of said stations responsive to the reception of signals received over certain of the receivers thereat for assigning merit ratings to said received signals, said merit ratings being indicative of the quality of transmission of said received signals, a control network interconnecting said stations, transmitting means at each of said stations controlled by the rating means thereat for transmitting coded signal impulses representing the merit rating of the signals received thereat over said control network to the adjacently located stations of said system, comparison means at each of said stations controlled by the rating means thereat and the transmitting means at said adjacently located stations of said system for comparing the merit rating of a signal received thereat with the merit rating of the same signal simultaneously received at said adjacently located stations of said system, means at each of said stations controlled by the comparison means thereat for lighting the signal indicator lamp thereat when the merit rating of a signal received over said certain of said receivers thereat is higher than the merit rating of the same signal simultaneously received over said certain of the receivers at said adjacently located stations of said system and means to each of said stations for giving a visual indica- means thereat for preventing the lighting of the signal indicator lamp thereat when the merit rating of a signal received over said certain of the receivers thereat is lower than the merit rating of the same signal simultaneously received over said certain of the receivers at said adjacently located stations of said system.

18. In a mobile radio telephone system, a plurality of fixed stations each of which includes a radio transmitter, a plurality of radio receivers and an operator's switchboard, said fixed stations being arranged to communicate by radio with mobile units equipped with radio sets, a signal indicator lamp in the switchboard at each of said stations for giving a visual indication to the operator thereat when a calling signal requiring the attention of the operator is received over any of the receivers thereat from a mobile unit, automatic receiver selecting means at each of said stations responsive to the reception of calling signals over the receivers thereat for selecting the one receiver thereat receiving the most desirable transmission of calling signals simultaneously received over more than one of the receivers thereat, means at each of said stations controlled by the selecting means thereat and responsive to the reception of calling signals over certain of the receivers thereat for lighting the signal indicator lamp in the switchboard thereat, rating means at each of said stations controlled by the selecting means thereat and responsive to the reception of calling signals over others of the receivers thereat for assigning merit ratings to the calling signals received over said other receivers thereat, said merit ratings being indicative of the desirability of said received signals, a control network interconnecting said stations, impulse transmitting means at each of said stations controlled by the rating means thereat for transmitting over said control network coded signal impulses representing the merit ratings of the signals received by said other receivers thereat to the adjacently located stations of said system, impulse receiving means at each of said stations responsive to the coded signal impulses received over said network from adjacently located stations of said system, comparison means at each of said stations controlled by the rating means thereat and the impulse receiving means thereat for comparing the merit rating of calling signals received over said other receivers thereat with the merit rating of the same calling signals simultaneously received over the said other receivers at said adjacently located stations of said system, means at each of said stations controlled by the comparison means thereat for lighting the signal indicator lamp in the switchboard thereat when the merit rating of said calling signals received over said other receivers thereat is higher than the merit rating of the same calling signals simultaneously received over said other receivers at said adjacently located stations of said system and means at each of said stations controlled by the comparison means thereat for preventing the lighting of the signal indicator lamp in the switchboard thereat when the merit rating of calling signals received over said other receivers thereat is lower than the merit rating of the same calling signals simultaneously received over said other receivers at said adjacently located stations of said system.

19. In a mobile radio telephone system having a plurality of fixed stations each of which includes a radio transmitter, a plurality of radio receivers and an operator's switchboard, said fixed stations being arranged to communicate by radio with mobile units equipped with radio sets, a first signal indicator lamp in the switchboard at each of said stations for giving a visual indication to the operator thereat when a calling signal requiring the attention of the operator is received over any of the receivers thereat from one of said mobile units, a second signal indicator lamp in the switchboard at each of said stations for giving a visual indication to the operator thereat when the radio transmission received from one of said mobile units whose call is being handled thereat becomes better at an adjacently located station of said system, automatic receiver selecting means at each of said stations responsive to the reception of the same radio transmission from one of said mobile units by more than one of the receivers thereat for determining which of said receivers is receiving the most desirable radio transmission, means at each of said stations controlled by the selecting means thereat and responsive to the reception of radio transmission from one of said mobile units over certain of the receivers thereat for lighting the first signal indicator lamp in the switchboard thereat, rating means at each of said stations controlled by the selecting means thereat and responsive to the reception of radio transmission from one of said mobile units over others of the receivers thereat for assigning merit ratings to the radio transmission received over said other receivers thereat, said merit ratings being indicative of the desirability of said received radio transmission, a control network interconnecting said stations, teletypewriter distributors at each of said stations controlled by the rating means thereat for transmitting over said control network permutation code signals representing the merit rating of the radio transmission from said one of said mobile units received over said other receivers thereat to adjacently located stations of said system, said teletypewriter distributors at each of said stations operating to transmit permutation code signals to adjacently located stations each time the merit rating of the transmission received thereat increases or decreases, teletypewriter non-typing selectors at each of said stations responsive to the permutation code signals transmitted over said network from adjacently located stations of said system, comparison means at each of said stations controlled by the rating means thereat and the teletypewriter non-typing selectors thereat for comparing the merit rating of the radio transmission from one of said mobile units received over said other receivers thereat with the merit rating of the same radio transmission simultaneously received over the said other receivers at said adjacently located stations of said system, said comparison means at each of said stations operating to make a new comparison each time the merit rating of the radio transmission received over said other of the receivers at each of said stations or over said other of the receivers at said adjacently located stations increases or decreases, means at each of said stations controlled by the comparison means thereat for lighting the first signal indicator lamp in the switchboard thereat when the merit rating of the radio transmission received from said one of said mobile units over said other of the receivers thereat is higher than the merit rating of the same radio transmission simultaneously received over said other receivers at said adjacently located stations of said system, means at each of said stations controlled by the comparison means thereat for preventing the lighting of the first signal indicator lamp in the switchboard thereat when the merit rating of the radio transmission from said one of said mobile units received over said other receivers thereat is lower than the merit rating of the same radio transmission simultaneously received over said other receivers at said adjacently located stations of said system and means at each of said stations controlled by the comparison means thereat for operating the second signal indicator lamp in the switchboard thereat when during the course of the call from said one of said mobile units which is being handled thereat the comparison means thereat determines that the transmission over said other receivers at said adjacently located stations has a higher merit rating.

References Cited in the file of this patent

UNITED STATES PATENTS

| | | |
|---|---|---|
| 2,490,061 | Jensen et al. | Dec. 6 1949 |
| 2,575,782 | Bartelink | Nov. 20, 1951 |
| 2,589,158 | Staples | Mar. 11, 1952 |
| 2,590,234 | Coxhead | Mar. 25, 1952 |
| 2,599,904 | Evans | June 10, 1952 |
| 2,636,982 | Young | Apr. 28, 1953 |
| 2,706,286 | Wheeler | Apr. 12, 1955 |
| 2,734,131 | Magnuski | Feb. 7, 1956 |
| 2,737,578 | Bartelink | Mar. 6, 1956 |